US009159188B2

(12) United States Patent
Okada et al.

(10) Patent No.: US 9,159,188 B2

(45) Date of Patent: Oct. 13, 2015

(54) DATA GENERATING METHOD, GAMING METHOD, AND GAMING MACHINE

(75) Inventors: Kazuo Okada, Hong Kong (HK); Kenta Kitamura, Tokyo (JP); Hiroatsu Ike, Tokyo (JP); Yuki Terada, Tokyo (JP); Toshihiko Miyazaki, Tokyo (JP)

(73) Assignee: ARUZE GAMING (HONG KONG) LIMITED, Hong Kong (HK)

( * ) Notice: Subject to any disclaimer, the term of this patent is extended or adjusted under 35 U.S.C. 154(b) by 46 days.

(21) Appl. No.: 13/596,277

(22) Filed: Aug. 28, 2012

(65) Prior Publication Data

US 2014/0066164 A1 Mar. 6, 2014

(51) Int. Cl.
*A63F 13/10* (2006.01)
*G07F 17/32* (2006.01)
*G07F 17/34* (2006.01)

(52) U.S. Cl.
CPC ........ *G07F 17/3211* (2013.01); *G07F 17/3213* (2013.01); *G07F 17/34* (2013.01)

(58) Field of Classification Search
CPC ....... G07F 17/3213; G07F 17/32; G06F 8/60; G06F 8/665
USPC ................................................ 463/20, 16, 31
See application file for complete search history.

(56) References Cited

U.S. PATENT DOCUMENTS

| | | | | |
|---|---|---|---|---|
| 5,102,137 | A * | 4/1992 | Ekiert | 273/143 R |
| 7,363,541 | B2 * | 4/2008 | Haagens et al. | 714/20 |
| 2003/0122872 | A1 * | 7/2003 | Chiang et al. | 345/763 |
| 2004/0229678 | A1 * | 11/2004 | Onuki et al. | 463/20 |
| 2004/0254013 | A1 * | 12/2004 | Quraishi et al. | 463/29 |
| 2011/0092288 | A1 * | 4/2011 | Pryzby et al. | 463/35 |
| 2012/0028699 | A1 * | 2/2012 | Isaac et al. | 463/20 |
| 2012/0034967 | A1 * | 2/2012 | Owen et al. | 463/20 |
| 2012/0172105 | A1 * | 7/2012 | Huynh et al. | 463/18 |

* cited by examiner

*Primary Examiner* — James S McClellan
*Assistant Examiner* — Syvila Weatherford
(74) *Attorney, Agent, or Firm* — Lex IP Meister, PLLC

(57) ABSTRACT

A method of generating data for controlling an operation of a gaming machine is provided. The gaming machine includes a reel, a first driver for driving the reel, a rendering device, and a second driver for driving the rendering device. A data sheet including a plurality of rows and a plurality of columns is provided. Columns include a trigger field, a reel field being predefined to be associated with the first driver, and an effect field being predefined to be associated with the second driver. When a first command for controlling the first driver is input to in the reel field of the first set of rows, and at least one second command for controlling the second driver is input to the effect field of the first set of rows, the second command is executed in synchronization with the first command.

10 Claims, 68 Drawing Sheets

FIG.6A

| CODE | 1st REEL SYMBOL | 2nd REEL SYMBOL | 3rd REEL SYMBOL | 4th REEL SYMBOL | 5th REEL SYMBOL |
|---|---|---|---|---|---|
| 00 | BAR | 2BAR | BAR | 2BAR | BAR |
| 01 | BLANK | BLANK | BLANK | BLANK | BLANK |
| 02 | 7 | 7 | 7 | 7 | 7 |
| 03 | BLANK | BLANK | BLANK | BLANK | BLANK |
| 04 | 3BAR | 3BAR | 3BAR | 3BAR | 3BAR |
| 05 | BLANK | BLANK | BLANK | BLANK | BLANK |
| 06 | BAR | 2BAR | BAR | 2BAR | BAR |
| 07 | BLANK | BLANK | BLANK | BLANK | BLANK |
| 08 | 2BAR | BAR | 2BAR | BAR | 2BAR |
| 09 | BLANK | BLANK | BLANK | BLANK | BLANK |
| 10 | 3BAR | 3BAR | CHANCE | 3BAR | 3BAR |
| 11 | BLANK | BLANK | BLANK | BLANK | BLANK |
| 12 | 2BAR | BAR | 2BAR | BAR | 2BAR |
| 13 | BLANK | BLANK | BLANK | BLANK | BLANK |
| 14 | 7 | 7 | 7 | 7 | 7 |
| 15 | BLANK | BLANK | BLANK | BLANK | BLANK |
| 16 | 2BAR | BAR | 2BAR | BAR | 2BAR |
| 17 | BLANK | BLANK | BLANK | BLANK | BLANK |
| 18 | BAR | 2BAR | BAR | 2BAR | BAR |
| 19 | BLANK | BLANK | BLANK | BLANK | BLANK |
| 20 | 7 | 7 | 7 | 7 | 7 |
| 21 | BLANK | BLANK | BLANK | BLANK | BLANK |

FIG.6B

| | 1st REEL | 2nd REEL | 3rd REEL | 4th REEL | 5th REEL |
|---|---|---|---|---|---|
| CODE | SYMBOL | SYMBOL | SYMBOL | SYMBOL | SYMBOL |
| 00 | BAR | 2BAR | BAR | 2BAR | BAR |
| 01 | BLANK | BLANK | BLANK | BLANK | BLANK |
| 02 | 7 | 7 | 7 | 7 | 7 |
| 03 | BLANK | BLANK | BLANK | BLANK | BLANK |
| 04 | 3BAR | 3BAR | 3BAR | 3BAR | 3BAR |
| 05 | BLANK | BLANK | BLANK | BLANK | BLANK |
| 06 | BAR | 2BAR | BAR | 2BAR | BAR |
| 07 | BLANK | BLANK | BLANK | BLANK | BLANK |
| 08 | 2BAR | BAR | 2BAR | BAR | 2BAR |
| 09 | BLANK | BLANK | BLANK | BLANK | BLANK |
| 10 | 3BAR | 3BAR | CHANCE | 3BAR | 3BAR |
| 11 | BLANK | BLANK | BLANK | BLANK | BLANK |
| 12 | 2BAR | BAR | 2BAR | BAR | 2BAR |
| 13 | WILD | WILD | WILD | WILD | WILD |
| 14 | WILD | WILD | WILD | WILD | WILD |
| 15 | WILD | WILD | WILD | WILD | WILD |
| 16 | 2BAR | BAR | 2BAR | BAR | 2BAR |
| 17 | BLANK | BLANK | BLANK | BLANK | BLANK |
| 18 | BAR | 2BAR | BAR | 2BAR | BAR |
| 19 | BLANK | BLANK | BLANK | BLANK | BLANK |
| 20 | 7 | 7 | 7 | 7 | 7 |
| 21 | BLANK | BLANK | BLANK | BLANK | BLANK |

FIG.18

| Expected value | Weights |
|---|---|
| High | 1 |
| Middle | 3 |
| Low | 6 |

FIG.19

Rendering mode lottery table (1)

| No. | Rendering mode | | | | | Result of symbol determining process | | | | | | | |
|---|---|---|---|---|---|---|---|---|---|---|---|---|---|
| | Mode 1 | Mode 2 | Mode 3 | Mode 4 | Mode 5 | A | B | C | D | E | F | G | H |
| 1 | - | - | - | - | - | 764 | 726 | 709 | 865 | 1665 | 1080 | 1440 | 1000 |
| 2 | 1-1 | - | - | - | - | 70 | 45 | 60 | 65 | 90 | 60 | 60 | 0 |
| 3 | 1-2 | - | - | - | - | 0 | 35 | 35 | 35 | 0 | 0 | 0 | 0 |
| 4 | 1-3 | - | - | - | - | 550 | 0 | 0 | 0 | 0 | 0 | 0 | 0 |
| 5 | 1-4 | - | - | - | - | 100 | 30 | 25 | 60 | 65 | 0 | 0 | 0 |
| 6 | - | 2-1 | - | - | - | 100 | 45 | 60 | 65 | 75 | 90 | 90 | 1000 |
| 7 | - | 2-2 | - | - | - | 100 | 45 | 60 | 65 | 75 | 90 | 90 | 1000 |
| 8 | - | 2-3 | - | - | - | 100 | 55 | 55 | 55 | 65 | 250 | 250 | 0 |
| 9 | - | 2-4 | - | - | - | 100 | 55 | 55 | 55 | 65 | 250 | 250 | 0 |
| 10 | - | 2-5 | - | - | - | 30 | 32 | 90 | 55 | 15 | 0 | 0 | 0 |
| 11 | - | 2-6 | - | - | - | 30 | 32 | 90 | 55 | 15 | 0 | 0 | 0 |
| 12 | - | - | 3-1 | - | - | 80 | 45 | 60 | 60 | 55 | 180 | 230 | 0 |
| 13 | - | - | 3-2 | - | - | 80 | 45 | 60 | 60 | 55 | 180 | 230 | 0 |
| 14 | - | - | 3-3 | - | - | 0 | 45 | 50 | 55 | 0 | 0 | 0 | 0 |
| 15 | - | - | - | 4-1 | - | 0 | 150 | 0 | 0 | 0 | 400 | 0 | 0 |
| 16 | - | - | - | 4-2 | - | 400 | 0 | 0 | 0 | 0 | 0 | 0 | 0 |
| 17 | - | - | - | - | 5-1 | 0 | 90 | 90 | 75 | 65 | 0 | 0 | 0 |
| 18 | 1-1 | - | - | 4-1 | - | 0 | 90 | 0 | 0 | 0 | 20 | 0 | 0 |
| 19 | 1-1 | - | - | 4-1 | 5-1 | 0 | 90 | 0 | 0 | 0 | 0 | 0 | 0 |
| 20 | 1-1 | - | - | 4-2 | - | 120 | 0 | 0 | 0 | 0 | 0 | 0 | 0 |
| 21 | 1-1 | - | - | - | 5-1 | 0 | 45 | 70 | 70 | 55 | 0 | 0 | 0 |
| 22 | 1-2 | - | - | - | 5-1 | 0 | 35 | 55 | 50 | 0 | 0 | 0 | 0 |
| 23 | 1-3 | - | - | - | 5-1 | 0 | 15 | 25 | 40 | 0 | 0 | 0 | 0 |
| 24 | - | 2-1 | - | - | 5-1 | 0 | 35 | 85 | 75 | 55 | 0 | 0 | 0 |
| 25 | - | 2-2 | - | - | 5-1 | 0 | 35 | 85 | 75 | 55 | 0 | 0 | 0 |
| 26 | - | 2-3 | - | - | 5-1 | 0 | 45 | 70 | 55 | 25 | 0 | 0 | 0 |
| 27 | - | 2-4 | - | - | 5-1 | 0 | 45 | 65 | 55 | 25 | 0 | 0 | 0 |
| 28 | - | 2-5 | - | - | 5-1 | 0 | 35 | 40 | 25 | 5 | 0 | 0 | 0 |
| 29 | - | 2-6 | - | - | 5-1 | 0 | 35 | 35 | 25 | 5 | 0 | 0 | 0 |
| 30 | - | - | 3-1 | - | 5-1 | 0 | 20 | 30 | 20 | 10 | 0 | 0 | 0 |
| 31 | - | - | 3-1 | 4-1 | - | 0 | 80 | 0 | 0 | 0 | 0 | 0 | 0 |
| 32 | - | - | 3-1 | 4-1 | 5-1 | 0 | 40 | 0 | 0 | 0 | 0 | 0 | 0 |
| 33 | - | - | 3-1 | 4-2 | - | 100 | 0 | 0 | 0 | 0 | 0 | 0 | 0 |

FIG.20

Rendering mode lottery table (2)

| | Rendering mode | | | | | Result of symbol determining process | | | | | | | |
|---|---|---|---|---|---|---|---|---|---|---|---|---|---|
| No. | Mode 1 | Mode 2 | Mode 3 | Mode 4 | Mode 5 | A | B | C | D | E | F | G | H |
| 34 | - | - | 3-2 | - | 5-1 | 0 | 10 | 30 | 20 | 10 | 0 | 0 | 0 |
| 35 | - | - | 3-2 | 4-1 | - | 0 | 90 | 0 | 0 | 0 | 0 | 0 | 0 |
| 36 | - | - | 3-2 | 4-1 | 5-1 | 0 | 40 | 0 | 0 | 0 | 0 | 0 | 0 |
| 37 | - | - | 3-2 | 4-2 | - | 100 | 0 | 0 | 0 | 0 | 0 | 0 | 0 |
| 38 | - | - | 3-3 | - | 5-1 | 0 | 35 | 40 | 20 | 0 | 0 | 0 | 0 |
| 39 | - | - | - | 4-1 | 5-1 | 0 | 45 | 0 | 0 | 0 | 0 | 0 | 0 |
| 40 | - | - | - | - | 5-2 | 0 | 15 | 25 | 30 | 35 | 0 | 0 | 0 |
| 41 | - | - | - | - | 5-3 | 0 | 15 | 25 | 30 | 35 | 0 | 0 | 0 |
| 42 | - | 2-1 | 3-1 | - | - | 35 | 15 | 15 | 15 | 10 | 80 | 80 | 0 |
| 43 | - | 2-1 | 3-1 | - | 5-1 | 0 | 5 | 15 | 10 | 10 | 0 | 0 | 0 |
| 44 | - | 2-1 | 3-1 | - | 5-2 | 0 | 5 | 10 | 10 | 5 | 0 | 0 | 0 |
| 45 | - | 2-1 | 3-1 | - | 5-3 | 0 | 5 | 10 | 10 | 5 | 0 | 0 | 0 |
| 46 | - | 2-1 | 3-2 | - | - | 35 | 15 | 5 | 5 | 5 | 80 | 80 | 0 |
| 47 | - | 2-1 | 3-2 | - | 5-1 | 0 | 5 | 5 | 15 | 10 | 0 | 0 | 0 |
| 48 | - | 2-1 | 3-2 | - | 5-2 | 0 | 5 | 10 | 10 | 5 | 0 | 0 | 0 |
| 49 | - | 2-1 | 3-2 | - | 5-3 | 0 | 5 | 10 | 10 | 5 | 0 | 0 | 0 |
| 50 | - | 2-2 | 3-1 | - | - | 35 | 15 | 15 | 5 | 10 | 80 | 80 | 0 |
| 51 | - | 2-2 | 3-1 | - | 5-1 | 0 | 5 | 15 | 15 | 10 | 0 | 0 | 0 |
| 52 | - | 2-2 | 3-1 | - | 5-2 | 0 | 5 | 10 | 10 | 5 | 0 | 0 | 0 |
| 53 | - | 2-2 | 3-1 | - | 5-3 | 0 | 5 | 10 | 10 | 5 | 0 | 0 | 0 |
| 54 | - | 2-2 | 3-2 | - | - | 35 | 15 | 15 | 5 | 10 | 80 | 80 | 0 |
| 55 | - | 2-2 | 3-2 | - | 5-1 | 0 | 5 | 15 | 15 | 10 | 0 | 0 | 0 |
| 56 | - | 2-2 | 3-2 | - | 5-2 | 0 | 5 | 10 | 10 | 5 | 0 | 0 | 0 |
| 57 | - | 2-2 | 3-2 | - | 5-3 | 0 | 5 | 10 | 10 | 5 | 0 | 0 | 0 |
| 58 | - | 2-3 | 3-1 | - | - | 7 | 5 | 15 | 5 | 5 | 10 | 10 | 0 |
| 59 | - | 2-3 | 3-1 | - | 5-1 | 0 | 5 | 15 | 10 | 5 | 0 | 0 | 0 |
| 60 | - | 2-3 | 3-1 | - | 5-2 | 0 | 5 | 10 | 10 | 5 | 0 | 0 | 0 |
| 61 | - | 2-3 | 3-1 | - | 5-3 | 0 | 5 | 10 | 10 | 5 | 0 | 0 | 0 |
| 62 | - | 2-3 | 3-2 | - | - | 7 | 5 | 12 | 15 | 5 | 10 | 10 | 0 |
| 63 | - | 2-3 | 3-2 | - | 5-1 | 0 | 5 | 10 | 15 | 5 | 0 | 0 | 0 |
| 64 | - | 2-3 | 3-2 | - | 5-2 | 0 | 5 | 10 | 10 | 5 | 0 | 0 | 0 |
| 65 | - | 2-3 | 3-2 | - | 5-3 | 0 | 5 | 10 | 10 | 5 | 0 | 0 | 0 |
| 66 | - | 2-4 | 3-1 | - | - | 7 | 5 | 12 | 15 | 5 | 10 | 10 | 0 |

FIG.21

Rendering mode lottery table (3)

| | Rendering mode | | | | | Result of symbol determining process | | | | | | | |
|---|---|---|---|---|---|---|---|---|---|---|---|---|---|
| No. | Mode 1 | Mode 2 | Mode 3 | Mode 4 | Mode 5 | A | B | C | D | E | F | G | H |
| 67 | - | 2-4 | 3-1 | - | 5-1 | 0 | 5 | 12 | 25 | 5 | 0 | 0 | 0 |
| 68 | - | 2-4 | 3-1 | - | 5-2 | 0 | 5 | 20 | 20 | 5 | 0 | 0 | 0 |
| 69 | - | 2-4 | 3-1 | - | 5-3 | 0 | 5 | 20 | 20 | 5 | 0 | 0 | 0 |
| 70 | - | 2-4 | 3-2 | - | - | 2 | 5 | 15 | 15 | 5 | 10 | 10 | 0 |
| 71 | - | 2-4 | 3-2 | - | 5-1 | 0 | 5 | 15 | 15 | 5 | 0 | 0 | 0 |
| 72 | - | 2-4 | 3-2 | - | 5-2 | 2 | 5 | 10 | 10 | 5 | 0 | 0 | 0 |
| 73 | - | 2-4 | 3-2 | - | 5-3 | 0 | 5 | 10 | 10 | 5 | 0 | 0 | 0 |
| 74 | - | 2-5 | 3-1 | - | - | 2 | 5 | 5 | 5 | 0 | 0 | 0 | 0 |
| 75 | - | 2-5 | 3-1 | - | 5-1 | 0 | 5 | 5 | 5 | 0 | 0 | 0 | 0 |
| 76 | - | 2-5 | 3-2 | - | - | 2 | 5 | 5 | 5 | 0 | 0 | 0 | 0 |
| 77 | - | 2-5 | 3-2 | - | 5-1 | 0 | 5 | 5 | 5 | 0 | 0 | 0 | 0 |
| 78 | - | 2-6 | 3-1 | - | - | 0 | 5 | 5 | 5 | 0 | 0 | 0 | 0 |
| 79 | - | 2-6 | 3-1 | - | 5-1 | 0 | 5 | 5 | 5 | 0 | 0 | 0 | 0 |
| 80 | - | 2-6 | 3-2 | - | - | 0 | 5 | 5 | 5 | 0 | 0 | 0 | 0 |
| 81 | - | 2-6 | 3-2 | - | 5-1 | 0 | 5 | 5 | 5 | 0 | 0 | 0 | 0 |
| 82 | 1-1 | - | - | - | 5-2 | 0 | 25 | 20 | 20 | 15 | 0 | 0 | 0 |
| 83 | 1-1 | - | - | - | 5-3 | 0 | 25 | 20 | 20 | 15 | 0 | 0 | 0 |
| 84 | - | 2-1 | - | - | 5-2 | 0 | 25 | 20 | 20 | 20 | 0 | 0 | 0 |
| 85 | - | 2-1 | - | - | 5-3 | 0 | 25 | 20 | 20 | 20 | 0 | 0 | 0 |
| 86 | - | 2-2 | - | - | 5-2 | 0 | 25 | 20 | 20 | 20 | 0 | 0 | 0 |
| 87 | - | 2-2 | - | - | 5-3 | 0 | 25 | 20 | 20 | 20 | 0 | 0 | 0 |
| 88 | - | 2-3 | - | - | 5-2 | 0 | 30 | 20 | 20 | 20 | 0 | 0 | 0 |
| 89 | - | 2-3 | - | - | 5-3 | 0 | 30 | 20 | 20 | 20 | 0 | 0 | 0 |
| 90 | - | 2-4 | - | - | 5-2 | 0 | 30 | 20 | 20 | 20 | 0 | 0 | 0 |
| 91 | - | 2-4 | - | - | 5-3 | 0 | 30 | 20 | 20 | 20 | 0 | 0 | 0 |
| 92 | - | 2-5 | - | - | 5-2 | 0 | 15 | 15 | 15 | 5 | 0 | 0 | 0 |
| 93 | - | 2-5 | - | - | 5-3 | 0 | 15 | 15 | 15 | 5 | 0 | 0 | 0 |
| 94 | - | 2-6 | - | - | 5-2 | 0 | 15 | 15 | 15 | 5 | 0 | 0 | 0 |
| 95 | - | 2-6 | - | - | 5-3 | 0 | 15 | 15 | 15 | 5 | 0 | 0 | 0 |
| 96 | - | - | 3-1 | - | 5-2 | 0 | 15 | 25 | 25 | 10 | 0 | 0 | 0 |
| 97 | - | - | 3-1 | - | 5-3 | 0 | 15 | 25 | 25 | 10 | 0 | 0 | 0 |
| 98 | - | - | 3-2 | - | 5-2 | 0 | 15 | 25 | 25 | 10 | 0 | 0 | 0 |
| 99 | - | - | 3-2 | - | 5-3 | 0 | 15 | 25 | 25 | 10 | 0 | 0 | 0 |

FIG.37A

| | | | | Symbol Positions | | | | |
|---|---|---|---|---|---|---|---|---|
| | Scene No | Trigger 1 | Trigger 2 | Trigger 3 | Reel 1 | Reel 2 | Reel 3 | Reel 4 | Reel 5 |
| #SCENE_ST | | | | | | | | | |
| #SCENE_ST | | | | | | | | | |
| #SCENE_ST | | | | | | | | | |
| #SCENE_ST | | | | | | | | | |
| | | | | | | | | | |
| #SCENE_TR | | | | | | | | | |
| #SCENE_TR | | | | | | | | | |
| #SCENE_TR | | | | | | | | | |
| #SCENE_TR | | | | | | | | | |
| | | | | | | | | | |
| #SCENE_TR | | | | | | | | | |
| #SCENE_TR | | | | | | | | | |
| #SCENE_TR | | | | | | | | | |
| #SCENE_TR | | | | | | | | | |
| | | | | | | | | | |
| #SCENE_TR | | | | | | | | | |
| #SCENE_TR | | | | | | | | | |
| #SCENE_TR | | | | | | | | | |
| #SCENE_TR | | | | | | | | | |
| | | | | | | | | | |
| #SCENE_TR | | | | | | | | | |
| #SCENE_TR | | | | | | | | | |
| #SCENE_TR | | | | | | | | | |
| #SCENE_TR | | | | | | | | | |
| | | | | | | | | | |
| #SCENE_TR | | | | | | | | | |
| #SCENE_TR | | | | | | | | | |
| #SCENE_TR | | | | | | | | | |
| #SCENE_TR | | | | | | | | | |
| | | | | | | | | | |
| #SCENE_END | | | | | | | | | |
| #SCENE_END | | | | | | | | | |
| #SCENE_END | | | | | | | | | |
| #SCENE_END | | | | | | | | | |
| | | | | | | | | | |

FIG.37B

| Reel | Reel Light of Reel 1 | | | Reel Light of Reel 2 | | |
|---|---|---|---|---|---|---|
| Filename | Type | Filename | Attribute | Type | Filename | Attribute |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |

FIG.37C

| Reel Light of Reel 3 | | | Reel Light of Reel 4 | | | Reel Light of Reel 5 | | |
|---|---|---|---|---|---|---|---|---|
| Type | Filename | Attribute | Type | Filename | Attribute | Type | Filename | Attribute |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |

FIG.37D

| Sound | | | | Image | | Background Light | | Line Light | |
|---|---|---|---|---|---|---|---|---|---|
| Filename | Volume | Time | Attribute | Filename | Attribute | Filename | Attribute | Filename | Attribute |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |

FIG.38A

| | | | | | Symbol Positions | | | | |
|---|---|---|---|---|---|---|---|---|---|
| | Scene No | Trigger 1 | Trigger 2 | Trigger 3 | Reel 1 | Reel 2 | Reel 3 | Reel 4 | Reel 5 |
| #SCENE_ST | 0 | | | START | 9 | 3 | 3 | 9 | 9 |
| #SCENE_ST | 0 | | | START | | | | | |
| #SCENE_ST | 0 | | | START | | | | | |
| #SCENE_ST | 0 | | | START | | | | | |
| | | | | | | | | | |
| #SCENE_TR | 0 | r1_STOP | | START | | | | | |
| #SCENE_TR | 0 | r1_STOP | | START | | | | | |
| #SCENE_TR | 0 | r1_STOP | | START | | | | | |
| #SCENE_TR | 0 | r1_STOP | | START | | | | | |
| | | | | | | | | | |
| #SCENE_TR | 0 | r2_STOP | | START | | | | | |
| #SCENE_TR | 0 | r2_STOP | | START | | | | | |
| #SCENE_TR | 0 | r2_STOP | | START | | | | | |
| #SCENE_TR | 0 | r2_STOP | | START | | | | | |
| | | | | | | | | | |
| #SCENE_TR | 0 | r3_STOP | | START | | | | | |
| #SCENE_TR | 0 | r3_STOP | | START | | | | | |
| #SCENE_TR | 0 | r3_STOP | | START | | | | | |
| #SCENE_TR | 0 | r3_STOP | | START | | | | | |
| | | | | | | | | | |
| #SCENE_TR | 0 | r4_STOP | | START | | | | | |
| #SCENE_TR | 0 | r4_STOP | | START | | | | | |
| #SCENE_TR | 0 | r4_STOP | | START | | | | | |
| #SCENE_TR | 0 | r4_STOP | | START | | | | | |
| | | | | | | | | | |
| #SCENE_TR | 0 | r5_STOP | | START | | | | | |
| #SCENE_TR | 0 | r5_STOP | | START | | | | | |
| #SCENE_TR | 0 | r5_STOP | | START | | | | | |
| #SCENE_TR | 0 | r5_STOP | | START | | | | | |
| | | | | | | | | | |
| #SCENE_END | 0 | | | END | | | | | |
| #SCENE_END | 0 | | | END | | | | | |
| #SCENE_END | 0 | | | END | | | | | |
| #SCENE_END | 0 | | | END | | | | | |
| | | | | | | | | | |

FIG.38B

| Reel | Reel Light of Reel 1 | | | Reel Light of Reel 2 | | |
|---|---|---|---|---|---|---|
| Filename | Type | Filename | Attribute | Type | Filename | Attribute |
| ReelAllSpeed70.csv | OBI_B_00 | W.csv | START | OBI_B_00 | W.csv | START |
| | OBI_B_01 | B1.csv | START | OBI_B_01 | B1.csv | STOP |
| | OBI_B_02 | B2.csv | STOP | OBI_B_02 | B2.csv | STOP |
| | OBI_B_03 | N.csv | STOP | OBI_B_03 | N.csv | STOP |
| | | | | | | |
| | OBI_B_00 | W.csv | START | | | |
| | OBI_B_01 | B1.csv | START | | | |
| | OBI_B_02 | B2.csv | STOP | | | |
| | OBI_B_03 | N.csv | START | | | |
| | | | | | | |
| | | | | OBI_B_00 | W.csv | START |
| | | | | OBI_B_01 | B1.csv | STOP |
| | | | | OBI_B_02 | B2.csv | STOP |
| | | | | OBI_B_03 | N.csv | START |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | OBI_B_00 | W.csv | START | OBI_B_00 | W.csv | START |
| | OBI_B_01 | B1.csv | START | OBI_B_01 | B1.csv | STOP |
| | OBI_B_02 | B2.csv | STOP | OBI_B_02 | B2.csv | STOP |
| | OBI_B_03 | N.csv | START | OBI_B_03 | N.csv | START |
| | | | | | | |

FIG.38C

| Reel Light of Reel 3 | | | Reel Light of Reel 4 | | | Reel Light of Reel 5 | | |
|---|---|---|---|---|---|---|---|---|
| Type | Filename | Attribute | Type | Filename | Attribute | Type | Filename | Attribute |
| OBI_B_00 | W.csv | START | OBI_B_00 | W.csv | START | OBI_B_00 | W.csv | START |
| OBI_B_01 | B1.csv | START | OBI_B_01 | B1.csv | STOP | OBI_B_01 | B1.csv | START |
| OBI_B_02 | B2.csv | STOP | OBI_B_02 | B2.csv | STOP | OBI_B_02 | B2.csv | START |
| OBI_B_03 | N.csv | STOP | OBI_B_03 | N.csv | STOP | OBI_B_03 | N.csv | STOP |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| OBI_B_00 | W.csv | START | | | | | | |
| OBI_B_01 | B1.csv | START | | | | | | |
| OBI_B_02 | B2.csv | STOP | | | | | | |
| OBI_B_03 | N.csv | START | | | | | | |
| | | | | | | | | |
| | | | OBI_B_00 | W.csv | START | | | |
| | | | OBI_B_01 | B1.csv | STOP | | | |
| | | | OBI_B_02 | B2.csv | STOP | | | |
| | | | OBI_B_03 | N.csv | START | | | |
| | | | | | | | | |
| | | | | | | OBI_B_00 | W.csv | START |
| | | | | | | OBI_B_01 | B1.csv | START |
| | | | | | | OBI_B_02 | B2.csv | START |
| | | | | | | OBI_B_03 | N.csv | START |
| | | | | | | | | |
| OBI_B_00 | W.csv | START | OBI_B_00 | W.csv | START | OBI_B_00 | W.csv | START |
| OBI_B_01 | B1.csv | START | OBI_B_01 | B1.csv | STOP | OBI_B_01 | B1.csv | START |
| OBI_B_02 | B2.csv | STOP | OBI_B_02 | B2.csv | STOP | OBI_B_02 | B2.csv | START |
| OBI_B_03 | N.csv | START | OBI_B_03 | N.csv | START | OBI_B_03 | N.csv | START |
| | | | | | | | | |

FIG.38D

| Sound | | | | Image | | Background Light | | Line Light | |
|---|---|---|---|---|---|---|---|---|---|
| Filename | Volume | Time | Attribute | Filename | Attribute | Filename | Attribute | Filename | Attribute |
| | | | | | | R1.csv | START | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |

FIG.39

| Reel No. | Reel Rotation | Rotating Pattern | Rotating Direction | Highest Speed | Lowest Speed | Number of Acceleration Steps | Number of Deceleration Steps | Stop Interval | Lowest Rotating Time |
|---|---|---|---|---|---|---|---|---|---|
| #Reel1 | 0 | STEPPER_PAT_NORMAL | 1 | 90 | 80 | 0 | 0 | 0 | 500000 |
| #Reel2 | 0 | | 1 | 90 | 80 | 0 | 0 | 400000 | 500000 |
| #Reel3 | 0 | | 1 | 90 | 80 | 0 | 0 | 800000 | 500000 |
| #Reel4 | 0 | | 1 | 90 | 80 | 0 | 0 | 1200000 | 500000 |
| #Reel5 | 0 | | 1 | 90 | 80 | 0 | 0 | 1600000 | 500000 |

FIG.40A

| | | | | | Symbol Positions | | | | |
|---|---|---|---|---|---|---|---|---|---|
| | Scene No | Trigger 1 | Trigger 2 | Trigger 3 | Reel 1 | Reel 2 | Reel 3 | Reel 4 | Reel 5 |
| #SCENE_ST | 0 | | | START | 9 | 3 | 3 | 9 | 9 |
| #SCENE_ST | 0 | | | START | | | | | |
| #SCENE_ST | 0 | | | START | | | | | |
| #SCENE_ST | 0 | | | START | | | | | |
| | | | | | | | | | |
| #SCENE_TR | 0 | r1_STOP | | START | | | | | |
| #SCENE_TR | 0 | r1_STOP | | START | | | | | |
| #SCENE_TR | 0 | r1_STOP | | START | | | | | |
| #SCENE_TR | 0 | r1_STOP | | START | | | | | |
| | | | | | | | | | |
| #SCENE_TR | 0 | r2_STOP | | START | | | | | |
| #SCENE_TR | 0 | r2_STOP | | START | | | | | |
| #SCENE_TR | 0 | r2_STOP | | START | | | | | |
| #SCENE_TR | 0 | r2_STOP | | START | | | | | |
| | | | | | | | | | |
| #SCENE_TR | 0 | r3_STOP | | START | | | | | |
| #SCENE_TR | 0 | r3_STOP | | START | | | | | |
| #SCENE_TR | 0 | r3_STOP | | START | | | | | |
| #SCENE_TR | 0 | r3_STOP | | START | | | | | |
| | | | | | | | | | |
| #SCENE_TR | 0 | r4_STOP | | START | | | | | |
| #SCENE_TR | 0 | r4_STOP | | START | | | | | |
| #SCENE_TR | 0 | r4_STOP | | START | | | | | |
| #SCENE_TR | 0 | r4_STOP | | START | | | | | |
| | | | | | | | | | |
| #SCENE_ST | 1 | | | START | 9 | 3 | 3 | 9 | 9 |
| | | | | | | | | | |
| #SCENE_TR | 1 | r5_STOP | | START | | | | | |
| #SCENE_TR | 1 | r5_STOP | | START | | | | | |
| #SCENE_TR | 1 | r5_STOP | | START | | | | | |
| #SCENE_TR | 1 | r5_STOP | | START | | | | | |
| | | | | | | | | | |
| #SCENE_END | 1 | | | END | | | | | |
| #SCENE_END | 1 | | | END | | | | | |
| #SCENE_END | 1 | | | END | | | | | |
| #SCENE_END | 1 | | | END | | | | | |
| | | | | | | | | | |

FIG.40B

| Reel | Reel Light of Reel 1 | | | Reel Light of Reel 2 | | |
|---|---|---|---|---|---|---|
| Filename | Type | Filename | Attribute | Type | Filename | Attribute |
| 5ReelReech70.csv | OBI_B_00 | W.csv | START | OBI_B_00 | W.csv | START |
| | OBI_B_01 | B1.csv | START | OBI_B_01 | B1.csv | STOP |
| | OBI_B_02 | B2.csv | STOP | OBI_B_02 | B2.csv | STOP |
| | OBI_B_03 | N.csv | STOP | OBI_B_03 | N.csv | STOP |
| | | | | | | |
| | OBI_B_00 | W.csv | START | | | |
| | OBI_B_01 | B1.csv | START | | | |
| | OBI_B_02 | B2.csv | STOP | | | |
| | OBI_B_03 | N.csv | START | | | |
| | | | | | | |
| | | | | OBI_B_00 | W.csv | START |
| | | | | OBI_B_01 | B1.csv | STOP |
| | | | | OBI_B_02 | B2.csv | STOP |
| | | | | OBI_B_03 | N.csv | START |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| 1234Stop5Slow.csv | | | | | | |
| | | | | | | |
| | | | | | | |
| | | | | | | |
| | | | | | | |
| | | | | | | |
| | | | | | | |
| | OBI_B_00 | W.csv | START | OBI_B_00 | W.csv | START |
| | OBI_B_01 | B1.csv | START | OBI_B_01 | B1.csv | STOP |
| | OBI_B_02 | B2.csv | STOP | OBI_B_02 | B2.csv | STOP |
| | OBI_B_03 | N.csv | START | OBI_B_03 | N.csv | START |
| | | | | | | |

FIG.40C

| Reel Light of Reel 3 | | | Reel Light of Reel 4 | | | Reel Light of Reel 5 | | |
|---|---|---|---|---|---|---|---|---|
| Type | Filename | Attribute | Type | Filename | Attribute | Type | Filename | Attribute |
| OBI_B_00 | W.csv | START | OBI_B_00 | W.csv | START | OBI_B_00 | W.csv | START |
| OBI_B_01 | B1.csv | START | OBI_B_01 | B1.csv | STOP | OBI_B_01 | B1.csv | START |
| OBI_B_02 | B2.csv | STOP | OBI_B_02 | B2.csv | STOP | OBI_B_02 | B2.csv | START |
| OBI_B_03 | N.csv | STOP | OBI_B_03 | N.csv | STOP | OBI_B_03 | N.csv | STOP |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| OBI_B_00 | W.csv | START | | | | | | |
| OBI_B_01 | B1.csv | START | | | | | | |
| OBI_B_02 | B2.csv | STOP | | | | | | |
| OBI_B_03 | N.csv | START | | | | | | |
| | | | | | | | | |
| | | | OBI_B_00 | W.csv | START | | | |
| | | | OBI_B_01 | B1.csv | STOP | | | |
| | | | OBI_B_02 | B2.csv | STOP | | | |
| | | | OBI_B_03 | N.csv | START | | | |
| | | | | | | | | |
| | | | | | | OBI_B_00 | W.csv | START |
| | | | | | | | | |
| | | | | | | OBI_B_00 | W.csv | START |
| | | | | | | OBI_B_01 | B1.csv | START |
| | | | | | | OBI_B_02 | B2.csv | START |
| | | | | | | OBI_B_03 | N.csv | START |
| | | | | | | | | |
| OBI_B_00 | W.csv | START | OBI_B_00 | W.csv | START | OBI_B_00 | W.csv | START |
| OBI_B_01 | B1.csv | START | OBI_B_01 | B1.csv | STOP | OBI_B_01 | B1.csv | START |
| OBI_B_02 | B2.csv | STOP | OBI_B_02 | B2.csv | STOP | OBI_B_02 | B2.csv | START |
| OBI_B_03 | N.csv | START | OBI_B_03 | N.csv | START | OBI_B_03 | N.csv | START |
| | | | | | | | | |

FIG.40D

| Sound | | | | Image | | Background Light | | Line Light | |
|---|---|---|---|---|---|---|---|---|---|
| Filename | Volume | Time | Attribute | Filename | Attribute | Filename | Attribute | Filename | Attribute |
| bgm.ogg | | | REPEAT | Fadeout | | | | | |
| se.ogg | | | ONCE | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| slw.ogg | SE | 1 | ONCE | | | R5.csv | START | | |
| | | | | | | | | | |
| slw.ogg | SE | 1 | STOP | | | R5.csv | STOP | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |

FIG.41A

| | | | | | Symbol Positions | | | | |
|---|---|---|---|---|---|---|---|---|---|
| | Scene No | Trigger 1 | Trigger 2 | Trigger 3 | Reel 1 | Reel 2 | Reel 3 | Reel 4 | Reel 5 |
| #SCENE_ST | 0 | | | START | 9 | 3 | 3 | 9 | 9 |
| #SCENE_ST | 0 | | | START | | | | | |
| #SCENE_ST | 0 | | | START | | | | | |
| #SCENE_ST | 0 | | | START | | | | | |
| | | | | | | | | | |
| #SCENE_TR | 0 | r1_STOP | | START | | | | | |
| #SCENE_TR | 0 | r1_STOP | | START | | | | | |
| #SCENE_TR | 0 | r1_STOP | | START | | | | | |
| #SCENE_TR | 0 | r1_STOP | | START | | | | | |
| | | | | | | | | | |
| #SCENE_TR | 0 | r2_STOP | | START | | | | | |
| #SCENE_TR | 0 | r2_STOP | | START | | | | | |
| #SCENE_TR | 0 | r2_STOP | | START | | | | | |
| #SCENE_TR | 0 | r2_STOP | | START | | | | | |
| | | | | | | | | | |
| #SCENE_ST | 1 | | | START | 9 | 3 | 3 | 9 | 9 |
| | | | | | | | | | |
| #SCENE_TR | 1 | r3_STOP | | START | | | | | |
| #SCENE_TR | 1 | r3_STOP | | START | | | | | |
| #SCENE_TR | 1 | r3_STOP | | START | | | | | |
| #SCENE_TR | 1 | r3_STOP | | START | | | | | |
| | | | | | | | | | |
| #SCENE_ST | 2 | | | START | 9 | 3 | 3 | 9 | 9 |
| | | | | | | | | | |
| #SCENE_TR | 2 | r4_STOP | | START | | | | | |
| #SCENE_TR | 2 | r4_STOP | | START | | | | | |
| #SCENE_TR | 2 | r4_STOP | | START | | | | | |
| #SCENE_TR | 2 | r4_STOP | | START | | | | | |
| | | | | | | | | | |
| #SCENE_ST | 3 | | | START | 9 | 3 | 3 | 9 | 9 |
| | | | | | | | | | |
| #SCENE_TR | 3 | r5_STOP | | START | | | | | |
| #SCENE_TR | 3 | r5_STOP | | START | | | | | |
| #SCENE_TR | 3 | r5_STOP | | START | | | | | |
| #SCENE_TR | 3 | r5_STOP | | START | | | | | |
| | | | | | | | | | |
| #SCENE_END | 3 | | | END | | | | | |
| #SCENE_END | 3 | | | END | | | | | |
| #SCENE_END | 3 | | | END | | | | | |
| #SCENE_END | 3 | | | END | | | | | |
| | | | | | | | | | |

FIG.41B

| Reel | Reel Light of Reel 1 | | | Reel Light of Reel 2 | | |
|---|---|---|---|---|---|---|
| Filename | Type | Filename | Attribute | Type | Filename | Attribute |
| 3ReelReech70.csv | OBI_B_00 | W.csv | START | OBI_B_00 | W.csv | START |
| | OBI_B_01 | B1.csv | START | OBI_B_01 | B1.csv | STOP |
| | OBI_B_02 | B2.csv | STOP | OBI_B_02 | B2.csv | STOP |
| | OBI_B_03 | N.csv | STOP | OBI_B_03 | N.csv | STOP |
| | | | | | | |
| | OBI_B_00 | W.csv | START | | | |
| | OBI_B_01 | B1.csv | START | | | |
| | OBI_B_02 | B2.csv | STOP | | | |
| | OBI_B_03 | N.csv | START | | | |
| | | | | | | |
| | | | | OBI_B_00 | W.csv | START |
| | | | | OBI_B_01 | B1.csv | STOP |
| | | | | OBI_B_02 | B2.csv | STOP |
| | | | | OBI_B_03 | N.csv | START |
| | | | | | | |
| 12Stop3Slow.csv | | | | | | |
| | | | | | | |
| | | | | | | |
| | | | | | | |
| | | | | | | |
| | | | | | | |
| | | | | | | |
| 123Stop4Slow.csv | | | | | | |
| | | | | | | |
| | | | | | | |
| | | | | | | |
| | | | | | | |
| | | | | | | |
| | | | | | | |
| 1234Stop5Slow.csv | | | | | | |
| | | | | | | |
| | | | | | | |
| | | | | | | |
| | | | | | | |
| | | | | | | |
| | | | | | | |
| | OBI_B_00 | W.csv | START | OBI_B_00 | W.csv | START |
| | OBI_B_01 | B1.csv | START | OBI_B_01 | B1.csv | STOP |
| | OBI_B_02 | B2.csv | STOP | OBI_B_02 | B2.csv | STOP |
| | OBI_B_03 | N.csv | START | OBI_B_03 | N.csv | START |
| | | | | | | |

FIG.41C

| Reel Light of Reel 3 | | | Reel Light of Reel 4 | | | Reel Light of Reel 5 | | |
|---|---|---|---|---|---|---|---|---|
| Type | Filename | Attribute | Type | Filename | Attribute | Type | Filename | Attribute |
| OBI_B_00 | W.csv | START | OBI_B_00 | W.csv | START | OBI_B_00 | W.csv | START |
| OBI_B_01 | B1.csv | START | OBI_B_01 | B1.csv | STOP | OBI_B_01 | B1.csv | START |
| OBI_B_02 | B2.csv | STOP | OBI_B_02 | B2.csv | STOP | OBI_B_02 | B2.csv | START |
| OBI_B_03 | N.csv | STOP | OBI_B_03 | N.csv | STOP | OBI_B_03 | N.csv | STOP |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| OBI_B_00 | W.csv | START | | | | | | |
| | | | | | | | | |
| OBI_B_00 | W.csv | START | | | | | | |
| OBI_B_01 | B1.csv | START | | | | | | |
| OBI_B_02 | B2.csv | STOP | | | | | | |
| OBI_B_03 | N.csv | START | | | | | | |
| | | | | | | | | |
| | | | OBI_B_00 | W.csv | START | | | |
| | | | | | | | | |
| | | | OBI_B_00 | W.csv | START | | | |
| | | | OBI_B_01 | B1.csv | STOP | | | |
| | | | OBI_B_02 | B2.csv | STOP | | | |
| | | | OBI_B_03 | N.csv | START | | | |
| | | | | | | | | |
| | | | | | | OBI_B_00 | W.csv | START |
| | | | | | | | | |
| | | | | | | OBI_B_00 | W.csv | START |
| | | | | | | OBI_B_01 | B1.csv | START |
| | | | | | | OBI_B_02 | B2.csv | START |
| | | | | | | OBI_B_03 | N.csv | START |
| | | | | | | | | |
| OBI_B_00 | W.csv | START | OBI_B_00 | W.csv | START | OBI_B_00 | W.csv | START |
| OBI_B_01 | B1.csv | START | OBI_B_01 | B1.csv | STOP | OBI_B_01 | B1.csv | START |
| OBI_B_02 | B2.csv | STOP | OBI_B_02 | B2.csv | STOP | OBI_B_02 | B2.csv | START |
| OBI_B_03 | N.csv | START | OBI_B_03 | N.csv | START | OBI_B_03 | N.csv | START |
| | | | | | | | | |

FIG.41D

| Sound | | | | Image | | Background Light | | Line Light | |
|---|---|---|---|---|---|---|---|---|---|
| Filename | Volume | Time | Attribute | Filename | Attribute | Filename | Attribute | Filename | Attribute |
| bgm.ogg | | | REPEAT | Fadeout | | | | | |
| se.ogg | | | ONCE | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| slw.ogg | SE | 1 | ONCE | | | R5.csv | START | | |
| | | | | | | | | | |
| slw.ogg | SE | 1 | STOP | | | R5.csv | STOP | | |
| | | | | | | | | | |
| | | | | | | | | | |
| | | | | | | | | | |
| | | | | | | | | | |
| slw.ogg | SE | 1 | ONCE | | | R5.csv | START | | |
| | | | | | | | | | |
| slw.ogg | SE | 1 | STOP | | | R5.csv | STOP | | |
| | | | | | | | | | |
| | | | | | | | | | |
| | | | | | | | | | |
| | | | | | | | | | |
| slw.ogg | SE | 1 | ONCE | | | R5.csv | START | | |
| | | | | | | | | | |
| slw.ogg | SE | 1 | STOP | | | R5.csv | STOP | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |

DATA GENERATING METHOD, GAMING METHOD, AND GAMING MACHINE

BACKGROUND (a) Field

The present invention generally relates to a data generating method, a gaming method, and a gaming machine.

(b) Description of the Related Art

A gaming machine executes a game to rearrange symbols marked on a plurality of reels, and awards a benefit to the player according to a result of the rearranged symbols. Various gaming machines have been developed to meet players' various preferences, so various features such as symbol patterns, side effects such as background sound and additional visual display, and reel spinning schemes have been varied.

The gaming machine should synchronize the various features to efficiently provide the various features. That is, when a particular reel spinning scheme is rendered, the background sound should be output or an image should be displayed in synchronization with the particular reel spinning scheme. However, it is difficult to synchronize the various features since the various features are rendered in various objects of the gaming machine such as the reels, backlight units of the reels, a speaker, and a display. Accordingly, a user that is not a programming expert cannot program and debug the various features. Further, since the various features are rendered by a single complied program, the user cannot reuse some of the various features in other gaming machines.

SUMMARY

Aspects of the present invention provide a data generating method, a gaming method, and a gaming machine for efficiently synchronizing various features.

According to an aspect of the present invention, a method of generating data for controlling an operation of a gaming machine is provided by a processor of a gaming machine development system. The gaming machine includes a reel, a first driver for driving the reel, a rendering device for rendering a rendering effect, and a second driver for driving the rendering device. The method includes providing a data sheet including a plurality of rows and a plurality of columns for defining a plurality of cells. At least some of the plurality of cells receives commands, and the plurality of columns include a trigger field, a reel field being predefined to be associated with the first driver, and an effect field being predefined to be associated with the second driver. The method further includes receiving a first command for controlling the first driver in the reel field of a first set of rows including at least one row corresponding to a start of a first scene, and receiving at least one second command for controlling the second driver and being executed in synchronization with the first command, in the effect field of the first set of rows. The method further includes receiving a triggering condition of an event in the trigger field of a second set of rows including at least one row, and receiving at least one third command for controlling the second driver in the effect field of the second set of rows.

Commands of the second set of rows may be executed after commands of the first set of rows, in the gaming machine.

Commands of the same set of rows may be simultaneously executed in the gaming machine.

The first command may be a filename of a file including information for controlling the reel.

The commands of the data sheet may be defined as data types of a programming language for generating a program that is generated based on the data sheet.

A program generated based on the data sheet may be stored in a memory of the gaming machine.

The method may further include encrypting the data sheet by an identification key.

The method may further include receiving a scene number of the first scene in the first set of rows.

The method may further include receiving a fourth command for controlling the first driver in the reel field of a third set of rows including at least one row corresponding to a start of a second scene that occurs after the first scene, and receiving at least one fifth command for controlling the second driver in the effect field of the third set of rows.

The rendering device may include a backlight unit corresponding to the reel, a speaker for outputting an effect sound, or a display for displaying an effect image. The backlight unit may include a plurality of light sources partitioned by a plurality of partitions corresponding to a plurality of symbols.

According to another aspect of the present invention, a gaming method is provided by a controller of a gaming machine. The gaming machine includes a reel, a first driver for driving the reel, a rendering device for rendering a rendering effect, and a second driver for driving the rendering device. The method includes receiving a program generated based on a plurality of data sheets. Each of the data sheets includes a plurality of rows and a plurality of columns for defining a plurality of cells, and at least some of the plurality of cells receives commands. The plurality of columns includes a trigger field, a reel field being predefined to be associated with the first driver, and an effect field being predefined to be associated with the second driver. The method further includes determining symbols to be rearranged in the reel, and selecting at least one of the plurality of data sheets according to the symbols to be rearranged. The method further includes controlling the first driver by a first command of the reel field, in a first set of rows including at least one row corresponding to a start of a first scene among the plurality of rows of the selected data sheet, and controlling the second driver by at least one second command of the effect field in the first set of rows, the second command being executed in synchronization with the first command. The method further includes, when an event of the first scene is triggered in the reel, controlling the second driver by at least one third command of the effect field, in a second set of rows including at least one row to which a triggering condition of the event is input among the plurality of rows of the selected data sheet. The method further includes rearranging the symbols of the reel.

Commands of the same set of rows may be simultaneously executed.

The commands of the plurality of data sheets may be defined as data types of a programming language for generating the program.

The method may further include determining at least one row having a scene number of the first scene and no triggering condition as the first set of rows.

The gaming machine may further include a body printed circuit board (PCB) configured to the control the first driver and the second driver according to the commands and the program.

According to yet another aspect of the present invention, a gaming machine including a reel, a first driver, a rendering device, a second driver, a memory, and a controller is provided. The first driver drives the reel. The rendering device renders rendering effects, and the second driver drives the rendering device. The memory stores a program generated based on a plurality of data sheets. Each of the data sheets includes a plurality of rows and a plurality of columns for defining a plurality of cells, and at least some of the plurality of cells receives commands. The plurality of columns includes a trigger field, a reel field being predefined to be associated with the first driver, and an effect field being predefined to be associated with the second driver. The controller executes the game process using the program.

The controller may determine symbols to be rearranged in the reel, and select at least one of the plurality of data sheets according to the symbols to be rearranged. The controller may further control the first driver by a first command of the reel field, in a first set of rows including at least one row corresponding to a start of a first scene among the plurality of rows of the selected data sheet. The controller may further control the second driver by at least one second command of the effect field in the first set of rows, and the second command may be executed in synchronization with the first command. When an event of the first scene is triggered in the reel, the controller may further control the second driver by at least one third command of at least one of the effect field, in a second set of rows including at least one row to which a triggering condition of the event is input among the plurality of rows of the selected data sheet. The controller may further rearrange the symbols of the reel.

The controller may simultaneously execute commands of the same set of rows.

The game controller may determine at least one row having a scene number of the first scene and no triggering condition as the first set of rows.

The gaming machine may further include a body PCB configured to the control the first driver and the second driver according to the commands and the program.

According to yet another aspect of the present invention, a method of generating data for controlling an operation of a gaming machine is provided by a processor of a gaming machine development system. The gaming machine includes a reel, a first driver for driving the reel, a rendering device for rendering a rendering effect, and a second driver for driving the rendering device. The gaming machine randomly determines position where the reel to be stopped when a game is started, determines a magnitude of a prize to be provided according to the determined positions, and provides an effect for a notification of the prize according to the magnitude of the prize before the reel is stopped. The method includes providing a data sheet including a plurality of rows and a plurality of columns for defining a plurality of cells. At least some of the plurality of cells receives commands. The plurality of columns include a trigger field, a reel field being predefined to be associated with the first driver, and an effect field being predefined to be associated with the second driver. The method further includes receiving a first command for controlling the first driver to move the reel in the reel field of the first set of rows including at least one row corresponding to a start of a scene for notifying the prize according to the magnitude of the prize. The method further includes receiving at least one second command for controlling the second driver to render the effect for notification of the prize and being executed in synchronization with the first command, in the effect field of the first set of rows.

The method may further include receiving a triggering condition of an event as a stop of the reel, in the trigger field of a second set of rows including at least one row, and receiving at least one third command for controlling the second driver when the triggering condition is satisfied, in the effect field of the second set of rows.

The rendering device may include at least one of a backlight unit corresponding to the reel, a speaker for outputting an effect sound, or a display for displaying an effect image. The backlight units may include a plurality of light sources partitioned by a plurality of partitions corresponding to a plurality of symbols.

According to yet another aspect of the present invention, a gaming machine including a reel, a first driver, a rendering device, a second driver, a memory, and a controller is provided. The first driver drives the reel. The rendering device renders a rendering effect, and the second driver drives the rendering device. The memory stores a program generated based on a plurality of data sheets. Each of the data sheets include a plurality of rows and a plurality of columns for defining a plurality of cells, at least some of the plurality of cells receives commands. The plurality of columns includes a trigger field, a reel field being predefined to be associated with the first driver, and an effect field being predefined to be associated with the second driver. The controller randomly determines position where the reel to be stopped when a game is started, determines a magnitude of a prize to be provided according to the determined position, and selects at least one of the plurality of data sheets according to the determined position. Further, the controller controls the first driver to move the reel, by a first command of the reel field in a first set of rows including at least one row corresponding to a start of a scene among the plurality of rows of the selected data sheet. Furthermore, the controller controls the second driver to render an effect for notifying the prize according to the magnitude of the prize, by at least one second command of the effect field in the first set of rows, the second command being executed in synchronization with the first command. Next, the controller rearranges the symbols of the reel according to the determined position.

When the reel is stopped, the controller may further control the second driver, by at least one third command of the effect field in a second set of rows including at least one row among the plurality of rows of the selected data sheet.

The rendering device may include at least one of a backlight unit corresponding to the reel, a speaker for outputting an effect sound, or a display for displaying an effect image. The backlight unit may include a plurality of light sources partitioned by a plurality of partitions corresponding to a plurality of symbols.

According to yet another aspect of the present invention, a method of developing a gaming machine is provided by a gaming machine development system including an input device and a storage device. The gaming machine includes a reel, a first driver for driving the reel, a rendering device for rendering a rendering effect, and a second driver for driving the rendering device. The method includes storing a data sheet having an editable format in the storage device, inputting, by the input device, commands for controlling the reel and the rendering device to the data sheet stored in the storage device, and generating a program for controlling the first driver and the second driver based on the commands that are input to the data sheet.

The gaming machine may further include a main CPU for executing the program and a body PCB. The body PCB may control the first driver and the second driver according to the commands and the program.

The commands may be input based on an order of execution. The order of execution may be defined by a priority for each of the commands and a triggering condition for each of the commands. The commands may be executed in the order of execution at the gaming machine.

Some of the commands may include a control file for controlling the reel or the rendering device, and the method may further include defining the control file.

According to yet another aspect of the present invention, a gaming machine development system for developing a gaming machine is provided. The gaming machine includes a reel, a first driver for driving the reel, a rendering device for rendering a rendering effect, and a second driver for driving the rendering device. The gaming machine development system includes a storage device, an input device, and a processor. The storage device stores a data sheet having an editable format. The input device inputs commands for controlling the reel and the rendering device to the data sheet that is stored in the storage device. The processor generates a program for controlling the first driver and the second driver based on the commands that are input to the data sheet.

The gaming machine may further include a main CPU for executing the program and a body PCB. The body PCB may control the first driver and the second driver according to the commands and the program.

The commands may be input based on an order of execution. The order of execution may be defined by a priority for each of the commands and a triggering condition for each of the commands. The commands may be executed in the order of execution at the gaming machine.

Some of the commands may include a control file for controlling the reel or the rendering device. The processor may define the control file by an input of the input device.

According to yet another aspect of the present invention, a gaming machine a reel, a first driver, a rendering device, a second driver, and a memory is provided. The first driver drives the reel. The rendering device renders a rendering effect, and the second driver drives the rendering device. The memory stores a program that is generated based on commands, which is input to a data sheet, for controlling the reel and the rendering device are input, the program controlling the first driver and the second driver.

The gaming machine may further include a main CPU configured to execute the program and the commands, and a body PCB configured to control the first driver and the second driver according to the commands and the program.

The commands may be input to the data sheet based on an order of execution. The order of execution may be defined by a priority for each of the commands and a triggering condition for each of the commands. The main CPU may execute the commands in the order of execution.

Some of the commands may include a control file for controlling the reel or the rendering device.

According to yet another aspect of the present invention, a method of generating data of a program for controlling an operation of a gaming machine is provided by a processor of a gaming machine development system. The gaming machine includes a reel, a first driver for driving the reel, a rendering device for rendering a rendering effect, and a second driver for driving the rendering device. The method includes providing a data sheet including a plurality of rows and a plurality of columns for defining a plurality of cells on a monitor. An index that is associated with a plurality of commands for controlling the first driver and the second driver is set to the plurality of second drivers. Each of the rows of the data sheet includes a trigger field for defining a driving timing, a reel field being predefined to be associated with the first driver, and an effect field being predefined to be associated with the second driver. The method further includes generating, by the processor, a program for extracting the plurality of commands based on the index of each of the cells and controlling sequentially the first driver and the second driver by using the commands, according to an order defined by information of the trigger field.

BRIEF DESCRIPTION OF THE DRAWINGS

FIG. 6A is an example of a symbol code table according to an embodiment of the present invention.

FIG. 6B is another example of symbol code tables according to an embodiment of the present invention.

FIG. 18 is a table showing a relationship between an expected value of a chance mode game and a weight.

FIG. 19 is an example of a rendering mode lottery table according to an embodiment of the present invention.

FIG. 20 is an example of a rendering mode lottery table subsequent to an example shown in FIG. 19.

FIG. 21 is an example of a rendering mode lottery table subsequent to an example shown in FIG. 20.

FIG. 37A to FIG. 37D are a schematic diagram of a data sheet provided by a development tool according to an embodiment of the present invention.

FIG. 38A to FIG. 38D are a schematic diagram of an example data sheet for a general rendering mode provided by a development tool according to an embodiment of the present invention.

FIG. 39 is a schematic diagram of an example reel control file according to an embodiment of the present invention.

FIG. 40A to FIG. 40D are a schematic diagram of an example data sheet for a rendering mode for a low speed spin provided by a development tool according to an embodiment of the present invention.

FIG. 41A to FIG. 41D are a schematic diagram of another example data sheet for a rendering mode for a low speed spin provided by a development tool according to an embodiment of the present invention.

DETAILED DESCRIPTION

Figure 1A:
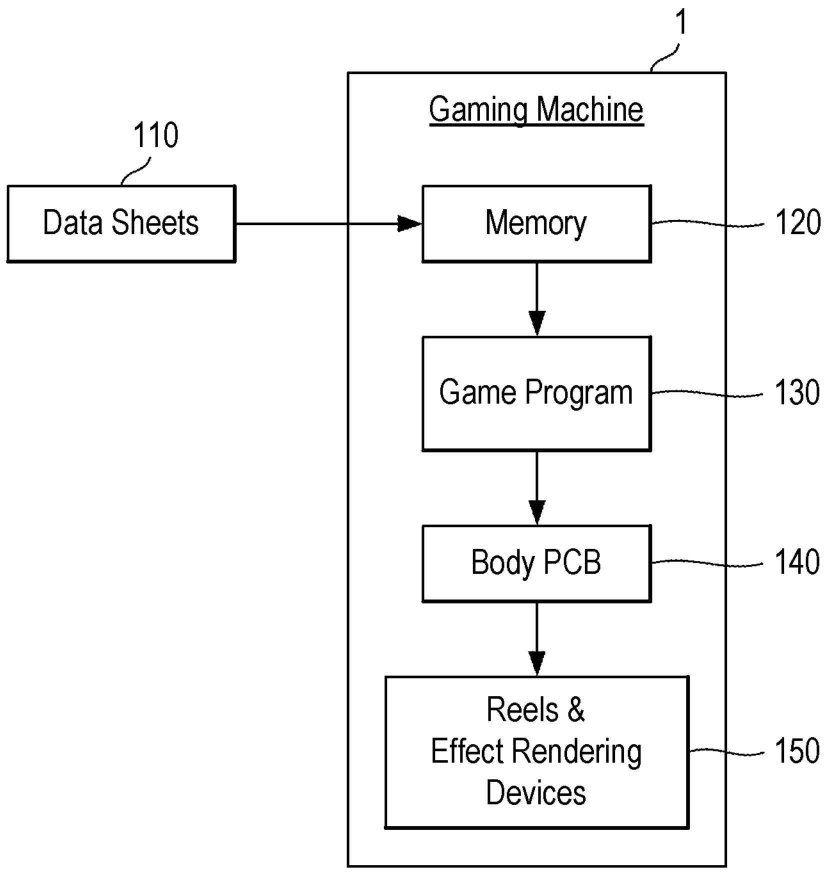
FIG. 1A is a schematic diagram of a data generating method according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A gaming machine, and a data processing method thereof according to embodiments of the present invention are described in detail with reference to the accompanying drawings.

Outline for Data Processing Method

Figure 1B:
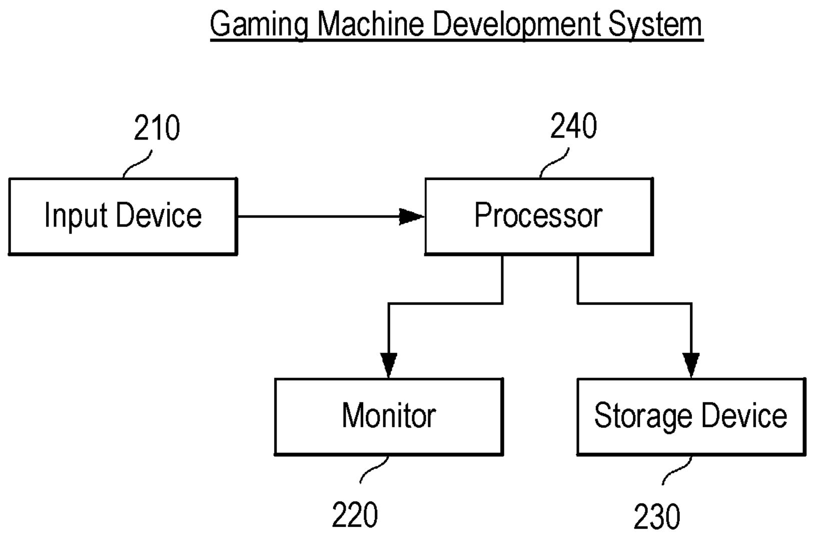
FIG. 1B is a schematic diagram of a gaming machine development system according to an embodiment of the present invention.

FIG. 1A is a schematic diagram of a data generating method according to an embodiment of the present invention, and FIG. 1B is a schematic diagram of a gaming machine development system according to an embodiment of the present invention.

Referring to FIG. 1A, a gaming machine development system generates data sheets 110 by using a development tool. A game program is generated by the generated data sheets 110. For example, the data sheets 110 may be combined with a basic program such that the game program may be generated. In this case, the basic program may be a program including a plurality of subroutines for interpreting the data sheets. That is, the data sheets may be compiled by the basic program. The game program is provided to a gaming machine 1 such that the game program is stored to a memory 120 of the gaming machine 1. Referring to FIG. 1B, the gaming machine development system includes an input device 210 for receiving an input from a user, a monitor 220 for displaying an interface for the development tool, a storage device 230 for storing data sheet for an editable format, and a processor 240. The editable format may be, for example, comma-separated values (CSV) format. The input device 210 inputs commands to the data sheet stored in the storage device 230. The processor 240 loads the development tool to provide a data sheet stored in the storage device 230, and the data sheet. Further, the processor 240 generates a game program based on the data sheet to which the commands are input. The gaming machine development system may be a computer for developing a program operating the gaming machine 1.

Each of the data sheets includes a plurality of row and a plurality of columns defining a plurality of cells. At least some of the cells is editable, and receive commands for operations of drivers for controlling objects of a gaming machine 1. The objects of the gaming machine 1 may include a plurality of reels for rearranging a plurality of symbols and rendering devices for a rendering effect such as a visual effect or a sound effect according to operations of the plurality of reels. The rendering devices may include backlight units for controlling lighting of the plurality of symbols, a speaker for outputting an effect sound, and/or a display for displaying an effect image. In this case, the columns of the data sheet are predefined to be associated with corresponding drivers, and commands that are input to a set of rows of the data sheet are simultaneously executed.

A game program corresponding to data sheets 110 is provided to the gaming machine 1 and is stored to a memory 120 of the gaming machine 1. The gaming machine 1 executes a game using the gaming program 130, and randomly determines symbols to be rearranged on the plurality of reels, i.e., a game result. Alternatively, the gaming machine 1 may receive the data sheets and store the data sheets to the memory 120. Then, the gaming machine 1 may read the data sheets from the memory 120 when executing the game, and may be continuously interpreting the commands of the data sheets 110 using the game program 130 while executing the game.

Further, the gamine machine 1 may select a data sheet corresponding to a type of the game result among the data sheets 110. Drivers connected to a body printed circuit board (PCB) 140 of the gaming machine 1 controls the plurality of reels and the rendering devices 150 according to the commands, by using the gaming program 130. Because the columns of the data sheet are predefined to be associated with corresponding drivers and commands that are input to the set of rows of the data sheet are simultaneously executed, operations of the drivers can be synchronized. Accordingly, various features can be effectively rendered on various objects of the gaming machine, and can be synchronized with each other.

Overall Configuration of Gaming Machine

An example of a gaming machine according to embodiments of the present invention is described in detail.

First, a mechanical structure of an example of a gaming machine according to embodiments of the present invention is described in detail with reference to FIG. 2 to FIG. 8.

Figure 2:
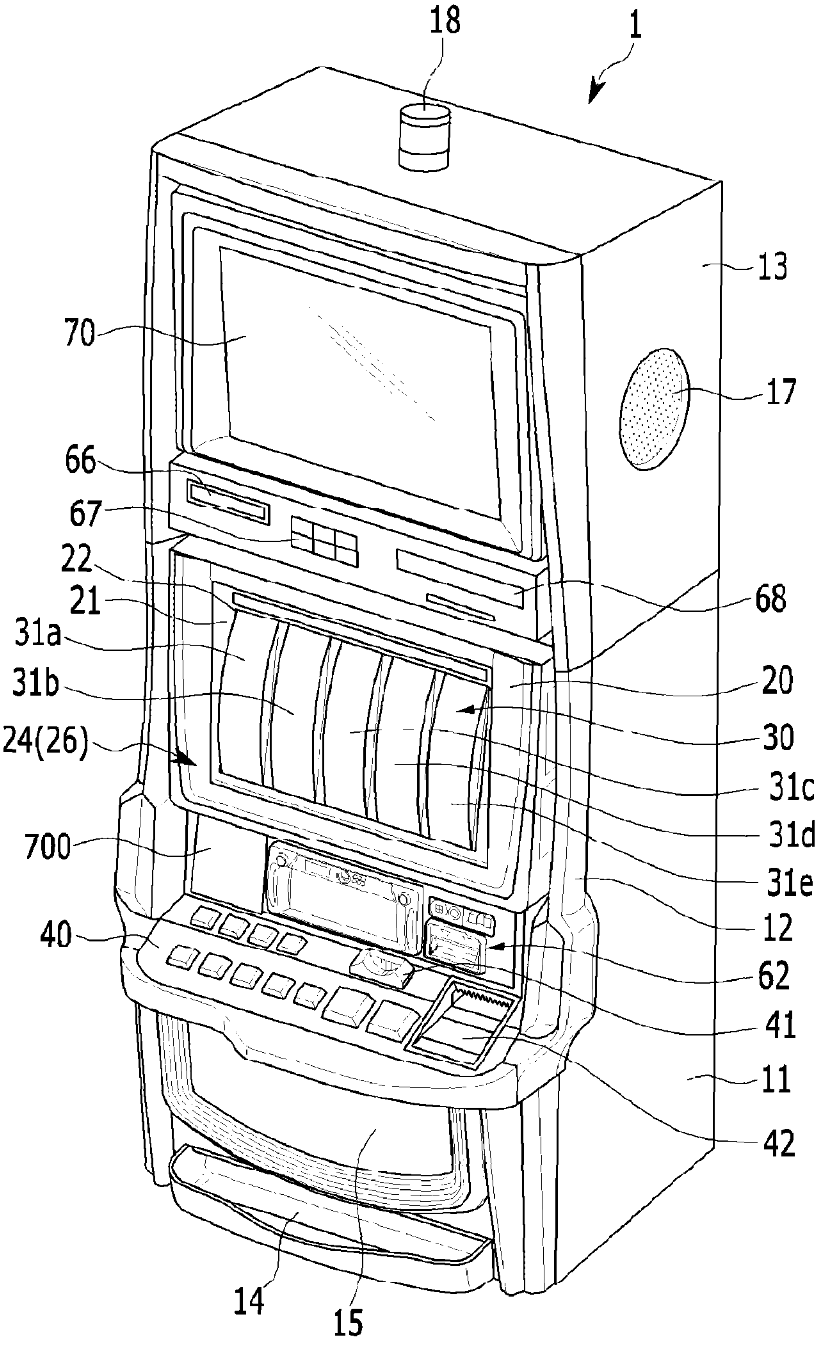
FIG. 2 is a schematic perspective view of an example of a gaming machine according to an embodiment of the present invention.
Figure 3:
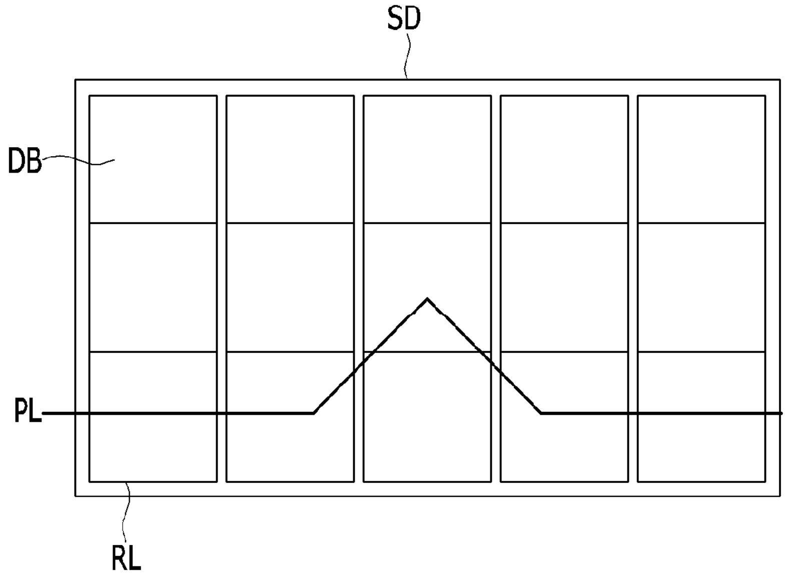
FIG. 3 is a schematic front view of a display window of a primary display in the gaming machine shown in FIG. 2 according to an embodiment of the present invention.
Figure 4:
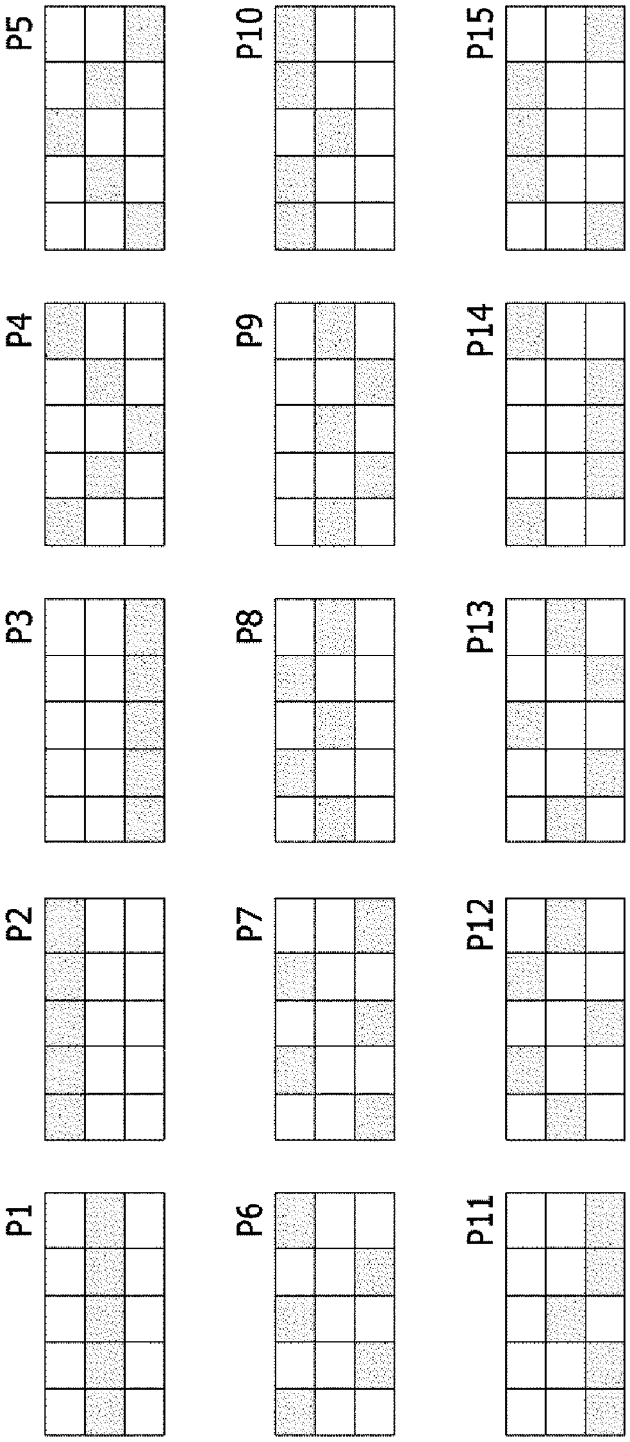
FIG. 4 is a schematic diagram showing examples of paylines according to an embodiment of the present invention.
Figure 5:
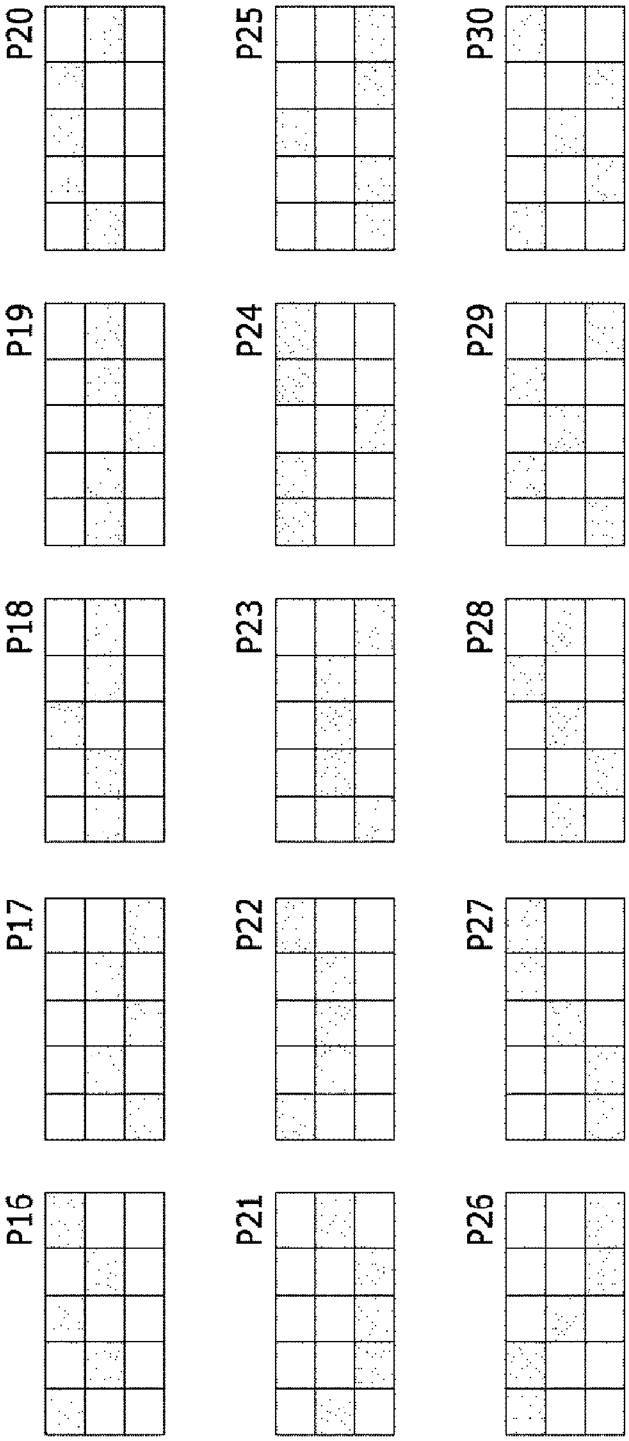
FIG. 5 is a schematic diagram showing examples of paylines subsequent to examples shown in FIG. 4.
Figure 8:
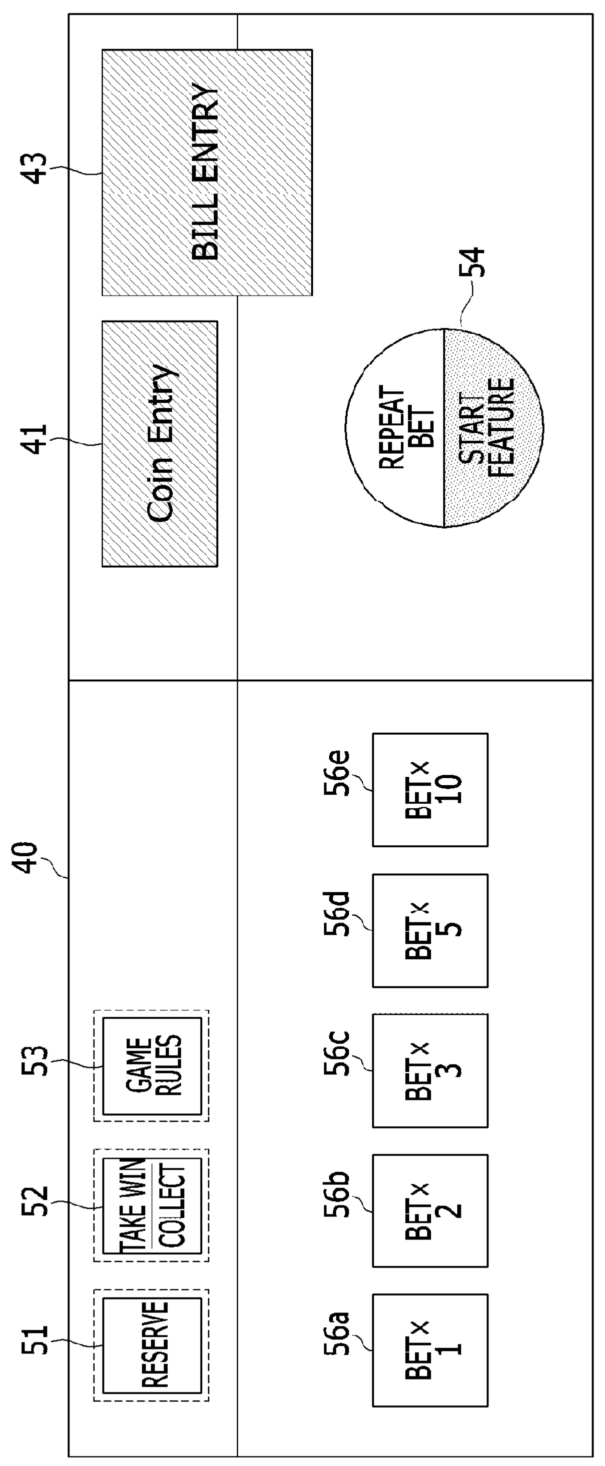
FIG. 8 is a layout view of a control panel in the gaming machine shown in FIG. 2 according to an embodiment of the present invention.

FIG. 2 is a schematic perspective view of an example of a gaming machine according to an embodiment of the present invention, FIG. 3 is a schematic front view of a display window of a primary display in the gaming machine shown in FIG. 2 according to an embodiment of the present invention, FIG. 4 and FIG. 5 are schematic diagrams showing examples of paylines according to an embodiment of the present invention, FIG. 6A and FIG. 6B are examples of symbol code tables according to an embodiment of the present invention, and FIG. 8 is a layout view of a control panel in the gaming machine shown in FIG. 2 according to an embodiment of the present invention.

Referring to FIG. 2, a gaming machine, for example, a slot machine 1 may include a cabinet 11, a top box 13 disposed on the cabinet 11, and a main door 12 disposed in front of the cabinet 11.

A primary display 20 including a reel assembly 30 is provided in the main door 12. According to an embodiment of the present embodiment, the reel assembly 30 may include five reels 31*a* to 31*e*. Each of the reels 31*a* to 31*e* may include a drum (not shown) that has a peripheral surface bearing plural types of symbols. The primary display 20 further includes a reel cover 21 disposed in front of the reel assembly 30 and having a display window 22 that exposes a portion of the reels 31*a* to 31*e*. The reel cover 21 is provided with a display panel 24 that may include a transparent liquid crystal display panel (not shown). The primary display 20 may further include a touch panel (not shown) for receiving touch input instruction of a game player.

Referring to FIG. 3, a given number of symbols, for example, three symbols on each of the reels 31*a* to 31*e* may be shown on the display window 22 when the reels 31*a* to 31*e* are at rest. Therefore, a symbol matrix including five columns and three rows is shown on the display window 22, where a pair of a column and a row define a symbol block DB.

FIG. 3 also shows an example of a payline PL that may be displayed on the display panel 24 and may pass through a display block DB in each column. When a combination of the symbols on the payline PL in a game satisfies a predetermined condition, a player wins the game. For example, if all the symbols in a combination are the same, the gaming machine 1 awards a prize to the player. Such a combination of the symbols that provides a win is referred to as a "winning combination." The payline PL shown in FIG. 3 is merely an example, and various paylines may be drawn and two or more paylines may be selected by a player.

FIG. 4 and FIG. 5 show a variety of paylines PL1-PL30. A play line P1, P2 or P3 shown in FIG. 4 connects five blocks in the second, first, or third row, respectively, and another payline P11 shown in FIG. 4 connects four lower blocks in the first, second, fourth, and fifth columns and a middle block in the third column. Another payline P21 shown in FIG. 5 connects lower blocks in the second, third, and fourth columns and middle blocks in the first and fifth columns at the second row.

In addition to a win with the payline PL (referred to as a "line win"), there is another type of win referred to as "scatter win" that is given when a scatter symbol among the plural types of the symbols is shown on the display window 22.

Figure 7:
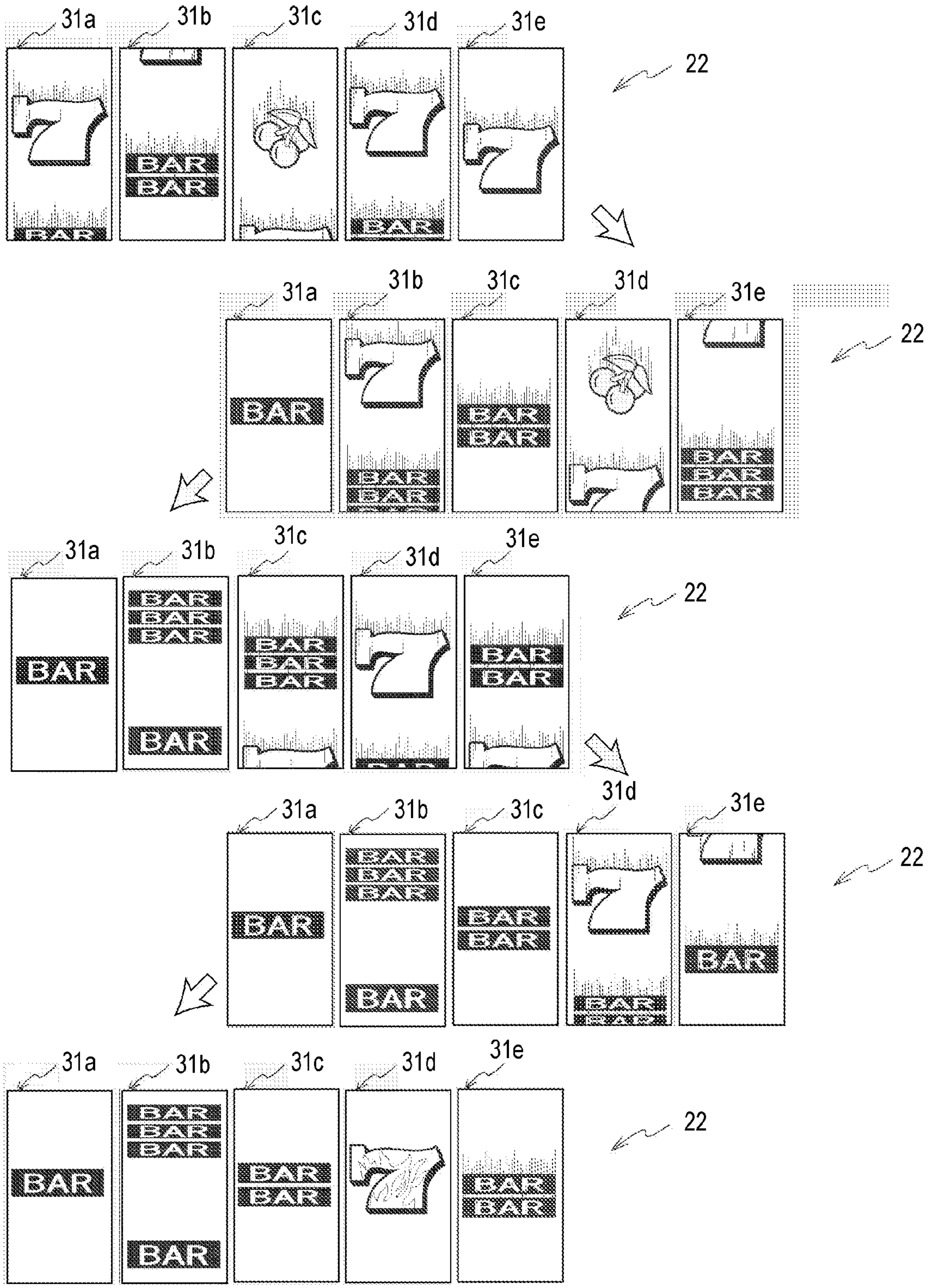
FIG. 7 shows an example of a general rendering effect.

Referring to FIG. 6A, a symbol sequence including a plurality of symbols is marked on each of the reels 31*a* to 31*e*. Each symbol in the symbol sequence may be assigned to a code, and may include a picture (hereinafter referred to as "a picture symbol") or may include no picture (hereinafter referred to as "a blank symbol"). The picture symbols may include symbols denoted by, for example, "7," "BAR," "DOUBLE BAR," or "TRIPLE BAR," and a scatter symbol (denoted by "BONUS"). For example, the symbol sequence may include eleven picture symbols and eleven blank symbols each being located between adjacent two picture symbols. Codes ranging from "00" to "21" may be assigned to the eleven picture symbols and the eleven blank symbols. In an example symbol code table shown in FIG. 6, the "BAR," blank, "7," blank, "TRIPLE BAR," blank, "BONUS," blank, "DOUBLE BAR," blank, "TRIPLE BAR," blank, "DOUBLE BAR," blank, "7," blank, "DOUBLE BAR," blank, "BAR," blank, "7," and blank symbols to which the codes from "00" to "21 are respectively assigned are marked on the first reel 31*a* (reel 1). A gaming machine randomly determines a code (i.e., a stop position) for each of the reels 31*a* to 31*e* and spins the reels 31*a* to 31*e*, according to a player's input. After a certain time period elapses, the gaming machine stops each of the reels 31*a* to 31*e* to locate the symbol corresponding to the determined code at one row (for example, the middle row) of the symbol matrix. Accordingly, the symbols are rearranged in the symbol matrix. In general, the gaming machine spins the reels 31*a* to 31*e*, and then sequentially stops the reels 31*a* to 31*e*, as shown in FIG. 7.

In another example symbol code table shown in FIG. 6B, "WILD" symbol is marked on each of the reels 31*a* to 31*e*, instead of a predetermined symbol, for example the "7" symbol. The blank symbol adjacent to the "WILD" symbol may be substituted to the "WILD" symbol. The "WILD" symbol may establish its own winning combination, or may be substituted to a certain symbol to combine with the certain symbol of the payline and establish the winning combination. Alternatively, the "WILD" symbol may be not marked on all of the reels 31*a* to 31*e*, but be marked to only some of the reels 31*a* to 31*e*.

The display panel 24 on the reel cover 21 displays a betting amount, a credit amount and a payout amount in respective areas which do not overlap the symbol arrangement. The credit amount indicates the number of coins that are owned by the player and deposited inside the gaming machine 1. The payout amount indicates the number of coins to be paid out to the player when a winning combination is established.

Although the gaming machine 1 employs the mechanical reels 31*a* to 31*e* in the present embodiment, video reels or a combination of the mechanical reels and the video reels may be used as well, alternatively.

An IC card reader 62 is disposed below the primary display 20. The IC card reader 62 receives an IC card which stores predetermined data such as player identification information and game log data related with the games previously played by the player. Also, the IC card may store data equivalent to coins, bills, or credits owned by the player. The IC card reader 62 reads and writes data from and to the inserted IC card. The IC card reader 62 includes an LCD for displaying the data read from the IC card.

In front of a lower end of the IC card reader 62 are provided a control panel 40, on which includes various buttons, a coin entry 41, and a bill entry 43. For example, referring to FIG. 8, a RESERVE button 51, a COLLECT button 52, and a GAME RULES button 53 are disposed on an upper left area of the control panel 40. 1-BET button 56*a*, 2-BET button 56*b*, 3-BET button 56*c*, 5-BET button 56*d*, and 10-BET button 56*e* are disposed on a lower left area of the control panel 40. Also, a START button 54 is disposed on the lower center area of the control panel 40. The coin entry 41 is disposed upper center area, and the bill entry 43 is disposed right area of the control panel 40.

The RESERVE button 51 is used when the player temporarily leaves the seat or when the player wants to ask a staff of the game facility to exchange money. Alternatively, the RESERVE button 51 may be used to store remaining credits into an IC card inserted into the IC card reader 62. The COLLECT button 52 is used to instruct the gaming machine 1 to pay out credited coins to a coin tray 15. The GAME RULES button 53 is used when the player is not acquainted with game rules or manipulation method. When the GAME RULES button 33 is pressed, various types of help information are displayed on a secondary display 70.

The BET buttons 56*a* to 56*e* are used to set the betting amount. Each time the 1-BET button 56*a* is pressed, one credit is bet for each active payline from the current credits owned by the player. When the 2-BET button 56*b* is pressed, the game is started on condition that two credits are bet for each active payline. When the 3-BET button 56*c* is pressed, the game is started on condition that three credits are bet for each active payline. When the 5-BET button 56*d* is pressed, the game is started on condition that five credits are bet for each active payline. When the 10-BET button 56*e* is pressed, the game is started on condition that ten credits are bet for each active payline. The START button 54 is used to instruct the initiation of spinning the reels 31*a* to 31*e* under the previously set betting condition.

The coin entry 41 receives coins and guides the inserted coins into a hopper inside the cabinet 11. The bill entry 43 receives a bill and validates the legitimacy of the inserted bill to accept only a legitimate bill into the cabinet 11.

On a lower front face of the main door 13 and below the control panel 40, there are provided a belly glass 14 on which a character of the gaming machine 1 or the like is drawn, and a coin tray 15 receiving coins paid out from the cabinet 11.

Referring back to FIG. 2, a secondary display 70 that may include a display panel. The display panel may include a flat panel display, for example, a liquid crystal display (LCD), an organic light emitting display (OLED), a plasma display panel (PDP), and so on. Further, the display panel may be a touch panel. However, embodiments are not limited thereto.

Below the secondary display 70, there are provided a ticket printer 66, a keypad 67, and a data display 68.

The ticket printer 66 prints, on a ticket, a bar code containing the credit data, date and time, and an ID number of the gaming machine 1 to output the barcode imprinted ticket. The player can exchange the barcode imprinted ticket with bills or the like at a predetermined location of a gaming facility (e.g., from a casher in a casino).

The keypad 67 includes a plurality of keys allowing the player to input instructions pertinent to the issuance of the ticket. The data display 68, which is implemented using a fluorescent display, LEDs, or the like, displays data input by the player through the keypad 67.

Configuration of Primary Display

A primary display 20 of the gaming machine 1 shown in FIG. 2 is described in detail with reference to FIG. 9 to FIG. 11.

Figure 9:
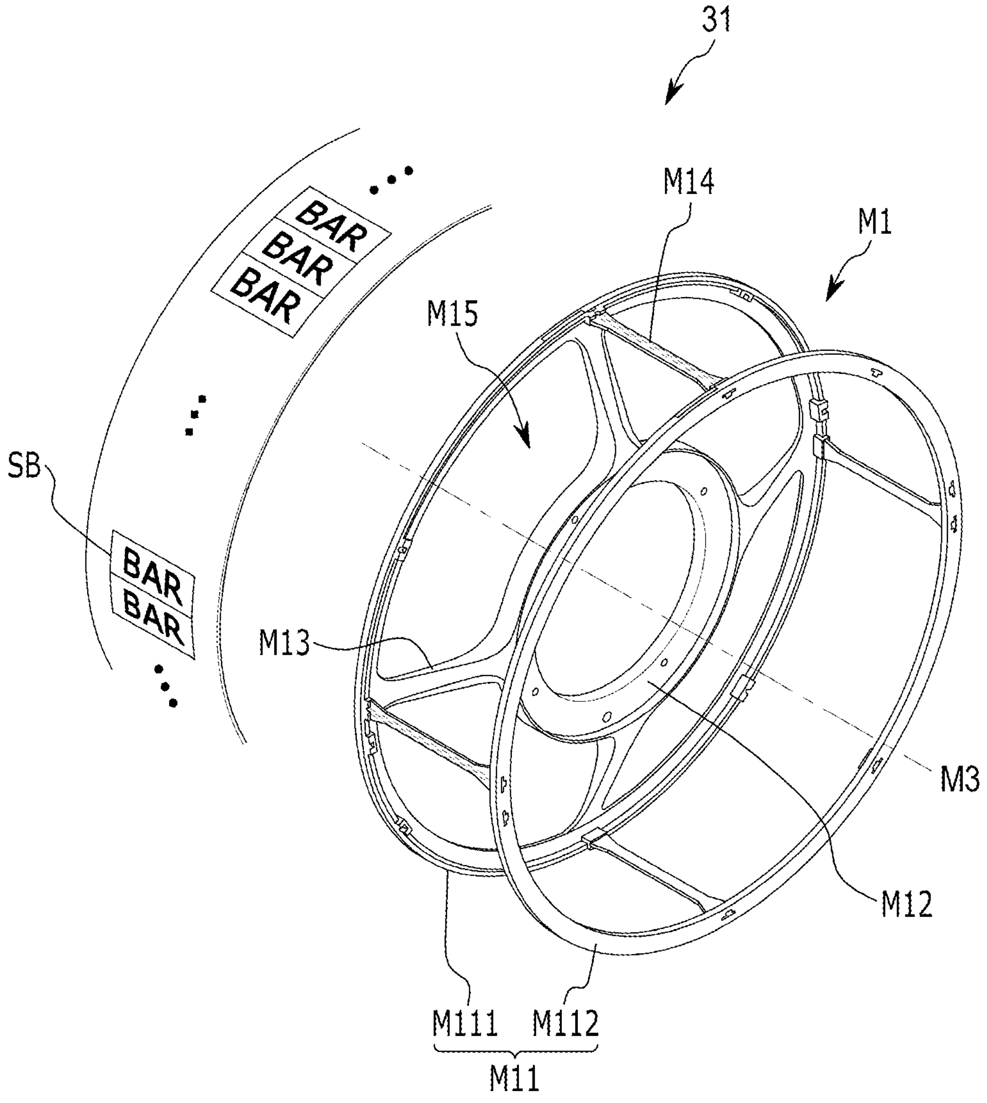
FIG. 9 is a schematic perspective view of an example of a reel assembly shown in FIG. 2 according to an embodiment of the present invention.
Figure 10:
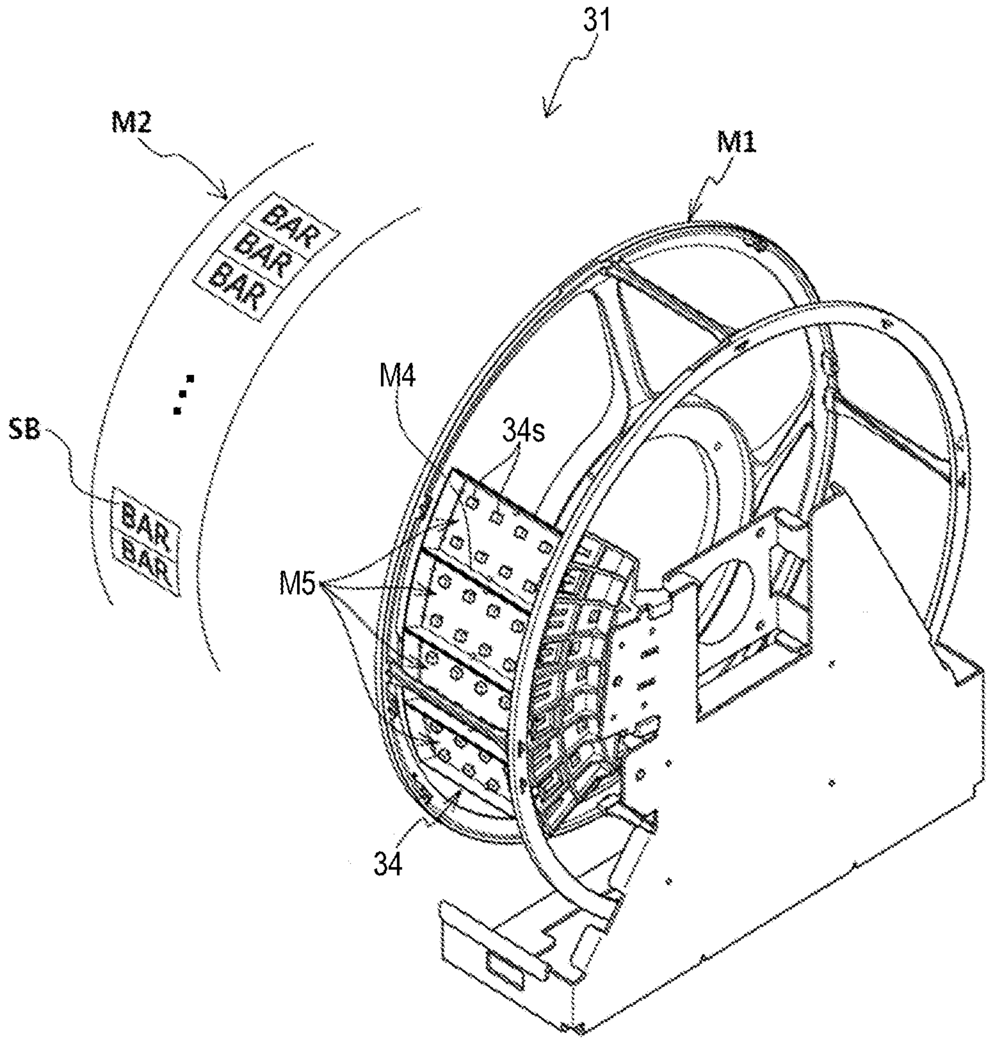
FIG. 10 is a schematic exploded perspective view of a reel shown in FIG. 9.
Figure 11:
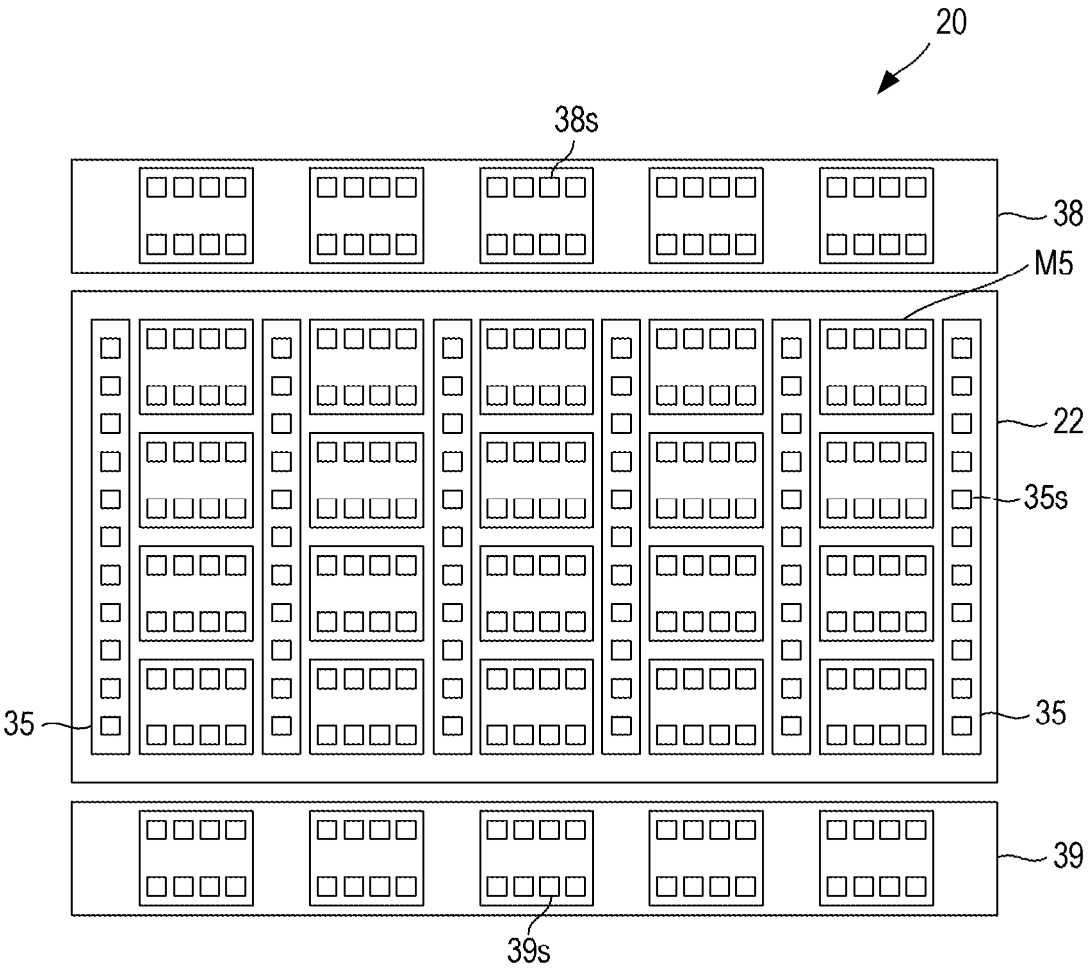
FIG. 11 is a schematic diagram showing light sources of a primary display shown in FIG. 2 according to an embodiment of the present invention.

FIG. 9 is a schematic perspective view of an example of a reel assembly shown in FIG. 2 according to an embodiment of the present invention, FIG. 10 is a schematic exploded perspective view of a reel shown in FIG. 9, and FIG. 11 is a schematic diagram showing light sources of a primary display shown in FIG. 2 according to an embodiment of the present invention.

Referring to FIG. 9, the reels 31*a* to 31*e* of a reel assembly 30 included in a primary display 20 have substantially equal diameters and are arranged in a coaxial manner such that they can rotate or spin around a common rotational axis. One reel 31 of the reels 31*a* to 31*e* is shown in FIG. 9 for easy description. The reels 31*a* to 31*e* may be configured to rotate individually. Although the number of the reels 31*a* to 31*e* is five in this embodiment, but it is not limited thereto.

A symbol sequence including a plurality of symbols SB is marked on each of the reels 31*a* to 31*e*. The symbol sequence may be determined by a symbol code table shown in FIG. 6A or FIG. 6B. The reel assembly 30 further includes a backlight unit 34 that illuminate the symbols SB.

Referring to FIG. 9 and FIG. 10, each of the reels 31*a* to 31*e* includes a reel frame M1 and a reel stripe M2 disposed on an entire outer circumference of the reel frame M1. The plurality of symbols SB of the symbol sequence is marked on the reel stripe M2. The reel frame M1 may receive rotational force from a rotational axis of a motor (not shown) to rotate a central axis M3.

The reel frame M1 includes a rim M11, a herb M12, a plurality of spokes M13, and a plurality of connecting rods M14.

The rim M11 includes a pair of circular loops M111 and M112 that are arranged substantially parallel to each other along the central axis M4 and are spaced apart from each other by a substantially uniform distance.

The herb M12 has a shape of a ring, and is disposed at a center of one M111 of the two loops M111 and M112 in a coaxial manner. The herb M12 and the loop M111 are connected by the spokes M13. The herb M12 may transmit the rotational force from the motor to the rim M11.

The connecting rods M14 are connected between the pair of loops M111 and M112 such that they keep the distance between the pair of loops M111 and M112. The connecting rods M14 are arranged substantially in parallel along a circumference of the rim M11. The connecting rods M14 and the rim M11 form a plurality of rectangle-like openings M15.

The backlight unit 34 includes a plurality of light sources 34*s* such as light emitting diodes (LEDs), and the light sources 34*s* are partitioned by a plurality of partitions M4. Each of a plurality of lighting areas M5 defined by the partitions M4 corresponds to a symbol SB on a reel stripe M2.

The primary display 20 may further include at least one lighting unit. Referring to FIG. 11, the at least one lighting unit may include line lighting units 35 and background light units 38 and 39. The line lighting units 35 are arranged along the reels 31*a* to 31*e* on a display window (22 of FIG. 2), and each of the line lighting units 35 may include a plurality of light sources 35*s* such as LEDs. The background light units 38 and 39 are arranged above and below the reels 31*a* to 31*e* on the display window 22, and each of the background light units 38 and 39 may include a plurality of light sources 38*s* or 39*s* such as LEDs.

Electrical Configuration of Gaming Machine

Now, electrical structure of the gaming machine 1 shown in FIG. 2 is described in detail with reference to FIG. 12 to FIG. 14.

Figure 12:
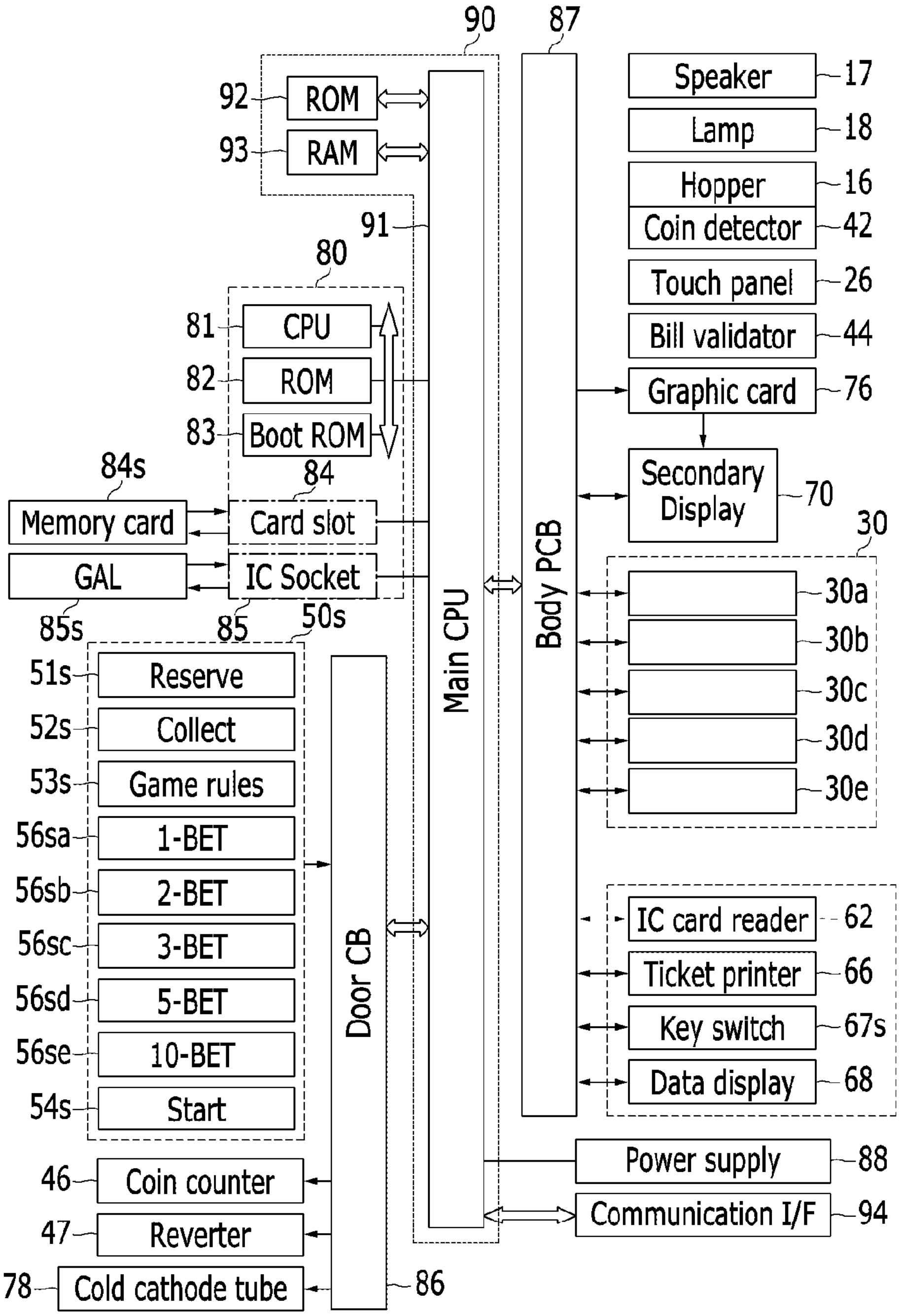
FIG. 12 is an electrical block diagram of the gaming machine shown in FIG. 2 according to an embodiment of the present invention.
Figure 13:
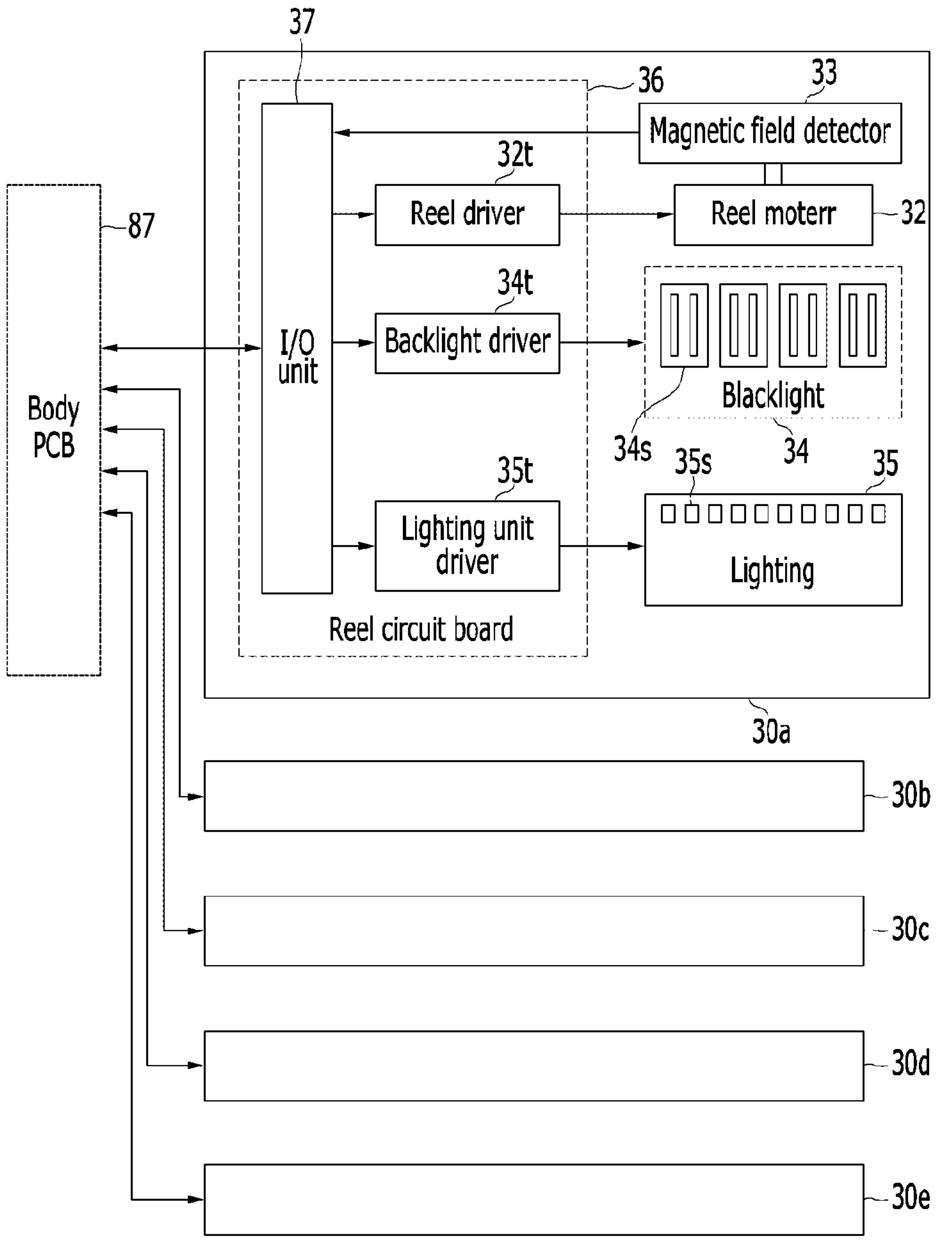
FIG. 13 is a block diagram of an electrical circuit of the reel assembly according to an embodiment of the present invention.
Figure 14:
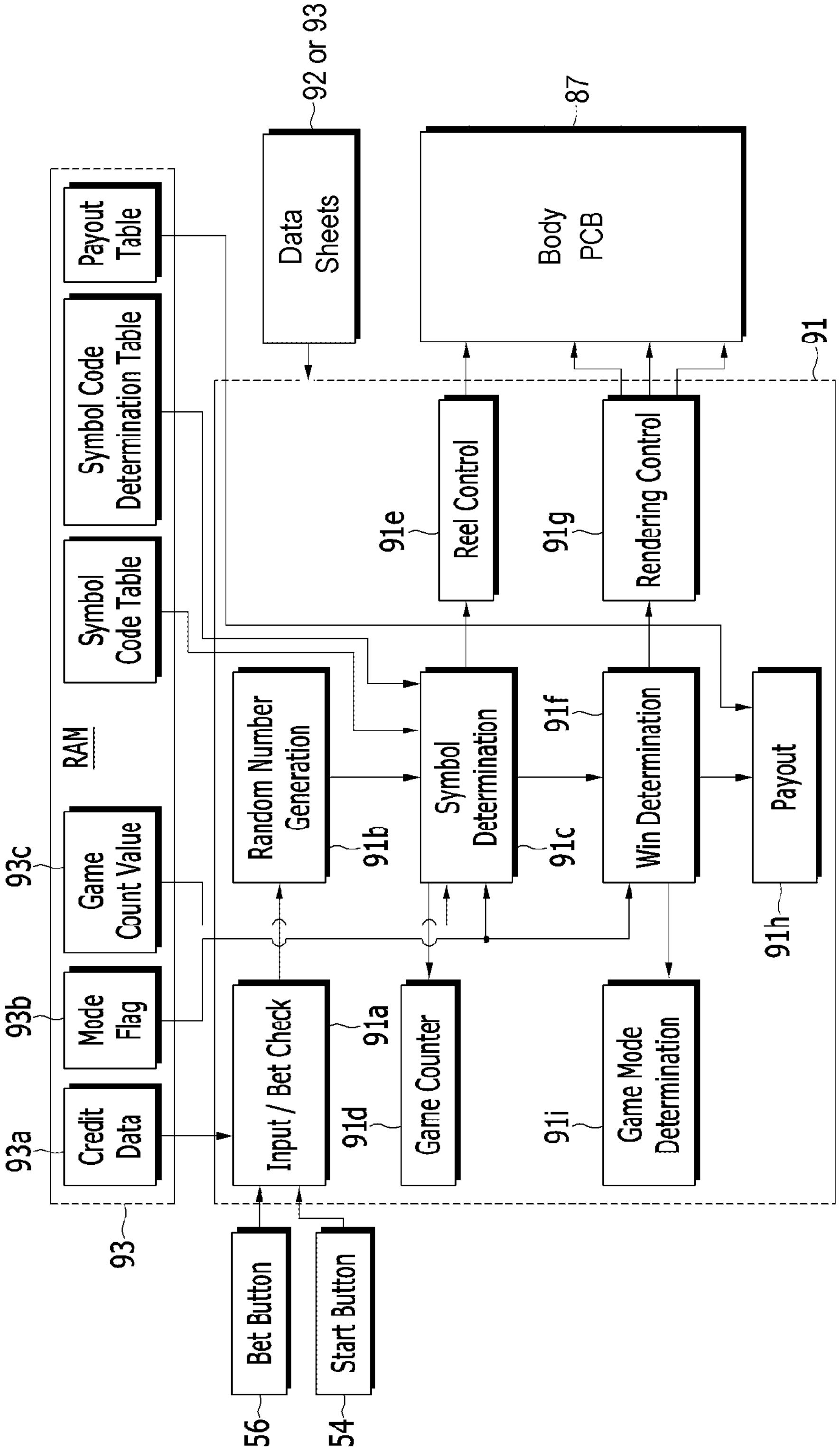
FIG. 14 is a functional block diagram of the game program executed by a main CPU of a motherboard in the gaming machine shown in FIG. 2 according to an embodiment of the present invention.

FIG. 12 is an electrical block diagram of the gaming machine shown in FIG. 2 according to an embodiment of the present invention, FIG. 13 is a block diagram of an electrical circuit of the reel assembly according to an embodiment of the present invention, and FIG. 14 is a functional block diagram of the game program executed by a main CPU of a motherboard in the gaming machine shown in FIG. 2 according to an embodiment of the present invention.

Referring to FIG. 12, the gaming machine 1 includes a gaming board 80, a motherboard 90, and a door PCB 86, and a body PCB 87.

A gaming board 80 includes a CPU 81, a ROM 82 accessible by the CPU 81 through an internal bus, and a boot ROM 83 accessible by the CPU 81 by an internal bus. The gaming board 80 additionally includes a card slot 84 which can receive and communicate with a memory card 84*s*, and an IC socket 85 provided correspondingly to a Generic Array Logic (GAL) 85*s*.

The memory card 84*s* includes a non-volatile memory and stores a game program and a game system program.

The card slot 84 is configured to receive and eject the memory card 84*s*, and is connected to a motherboard 90 by an IDE bus. The details of the game performed in the gaming machine 1 can be changed by replacing the memory card 84*s* with another one, or by withdrawing the memory card 84*s* from card slot 84, writing another program into the memory card 84*s*, and then inserting the memory card 84*s* into the card slot 84 again.

The GAL 85*s*, which is a type of a Programmable Logic Device (PLD) having a fixed OR array structure, has a plurality of input ports and output ports. When the GAL 85*s* receives certain data through the input ports, it outputs data corresponding to the input data through the output ports.

The IC socket 85 is configured in such a manner that the GAL 85*s* can be inserted into the IC socket 85 or detached from the IC socket 85, and connected to a motherboard 90 by a PCI bus.

The CPU 81, the ROM 82, and the boot ROM 83 interconnected by the internal bus are connected to the motherboard 90 by the PCI bus. The PCI bus enables signal transmission between the motherboard 90 and the gaming board 80, and supply of power from the motherboard 90 to the gaming board 80.

The ROM 82 stores an authentication program. The boot ROM 83 stores a preliminary authentication program, a boot code to be used by the CPU 81 for activating the preliminary authentication program, and the like. The authentication program is a tamper check program for authenticating the originality of the game program and the game system program. The preliminary authentication program is a program for authenticating the originality of the authentication program. The authentication program and the preliminary authentication program are written in a sequence of proving that the subject program has not been tampered.

The motherboard 90, which may be implemented using a commonly available general main board, executes the game program and the game system program. The motherboard 90 includes a main CPU 91, a ROM 92, a RAM 93, and a communication interface 94.

The ROM 92, which may be a flash memory, may be configured to store a program to be executed by the main CPU 91 such as BIOS, along with another data to be maintained permanently. When being executed by the main CPU 91, the BIOS performs initialization of peripheral devices. Also, the BIOS starts to load the game program and the game system program stored in the memory card 84*s* through the gaming board 80. The ROM 92 may be rewritable. However, write-protected one might be used as the ROM 92 as well.

The RAM 93 stores data and programs which are used during the operation of the main CPU 91. For example, when the game program, the game system program, or the authentication program is to be loaded, the RAM 93 can store such programs. Also, the RAM 93 is provided with working space for the execution of the programs. Examples of the space include a space for storing the number of bets, the payout amount, the credit amount, and the like can be maintained during the execution of the game. Also, plurality of tables defining symbols, symbol codes, winning combinations, and their probabilities are maintained during the execution of the game. Further, the RAM 93 stores symbol code determination tables which stores mapping information between symbol codes and random number which can used for determining symbols based on random numbers. In particular, the RAM 93 maintains a mode flag indicating the gaming mode, along with a game and a game counter of which count value indicates the number of executed chance mode games or the number of possibly remaining chance mode games.

The RAM 93 may store a game program corresponding to data sheets including commands for operations of drivers for controlling objects such as a plurality of reels (31*a* to 31*e* of FIG. 2), backlight units (34 of FIG. 13), a speaker 17, and a secondary display 70. Alternatively, the ROM 92 may store the data sheets. The main CPU 91 executes the game program or the game system program stored in the RAM 93 to operate a game. Alternatively, the RAM 93 may store the data sheets. In this case, while executing the game program or the game system program, the main CPU 91 may interpret the commands of the data sheets stored in the RAM 93 or the ROM 92 by a background process. Accordingly, the execution of the game program and the interpretation of the commands can be performed in parallel by multitasking.

Further, the main CPU 91 uses the game program or the game system program and the interpreted commands to send control signals to the body PCB 87. The control signals transmitted to the body PCB 87 are transmitted to rendering drivers such as the reel drivers 32*t*, the backlight drivers 34*t*, lighting unit drivers 35*t*, the graphic card 76, for controlling the reels 31*a* to 31*e*, the backlight units 34, the lighting units 35, the secondary display 70, and the speaker 17.

Also, the RAM 93 stores count values of a plurality of counters, which include a bet counter, a payout amount counter, a credit amount counter, and a chance mode game counter which counts the number of chance mode games. Alternatively, however, some of the count values can be maintained in an internal register of the main CPU 91.

The communication interface 94 facilitates data communication of the main CPU 91 with an external controller of, for example, a server through a communication channel.

Besides, the motherboard 90 is connected to the door PCB 86 and the body PCB 87 by USB communications. The motherboard 90 is also connected to a power supply 88. The main CPU 91 of the motherboard 90 boots up and operates using the power supplied from the power supply 88, and passes over some of the power to the gaming board 80 through the PCI bus so as to boot up the CPU 81. The door PCB 86 and the body PCB 87 are connected to input devices such as a switch and a sensor, and peripheral devices of which operation are controlled by the main CPU 91. Also, the door PCB 86 is connected with a control panel 40, a coin counter 46, a reverter 47, and a cold cathode tube 78.

The control panel 40 has a reserve switch 51*s*, a collect switch 52*s*, a game rule switch 53*s*, a start switch 54*s*, a 1-BET switch 56 as, a 2-BET switch 56*bs*, a 3-BET switch 56*cs*, a 5-BET switch 56*ds*, and a 10-BET switch 56*es*, each of which is provided correspondingly to respective buttons 51 to 54 and 56*a* to 56*e*. The switches 51*s* to 54*s* and 56 as to 56*es* detects pressing of the respective buttons 51 to 54 and 56*a* to 56*e* to output signals to the main CPU 91.

The coin counter 46 and the reverter 47 are disposed in the coin entry 41. The coin counter 46 validates legitimacy of coins inserted into the coin entry 41 in terms of material, shape, or the like. The coin counter 46 outputs a signal to the main CPU 91 when detecting a legitimate coin. Meanwhile, illegitimate coins are discharged to the coin tray 15. The reverter 47, which operates based upon a control signal from the main CPU 91, distributes the legitimate coins validated by the coin counter 46 into either a hopper 16 or a cash box (not shown in the drawing). The coins are guided into the hopper 16 when the hopper 16 is not filled with coins. Contrarily, however, the coins are guided into the cash box when the hopper 16 is filled with coins.

The cold cathode tube 78, which is disposed on the rear face of the secondary display 70, functions as a backlight unit and illuminates based on a control signal from the main CPU 91. Another light source such as light emitting diodes (LEDs) may be used as the backlight unit of the secondary display 70. If the display panel of the second display 70 is the OLED or the PDP, the backlight unit may be omitted.

The body PCB 87 is connected with the speaker 17, the lamp 18, the hopper 16, a coin detector 42, the touch panel 26, a bill validator 44, the reel assembly 30, the IC card reader 62, a graphic card 76, the ticket printer 66, a key switch 67*s*, and the data display 68.

The lamp 18 flashes based upon a control signal from the main CPU 91. The speaker 17 outputs a sound such as BGM based upon the control signal from the main CPU 91.

The hopper 16, which operates based upon a control signal from the main CPU 91, pays out coins of the designated payout amount to the coin tray 15 through a coin payout exit formed between the belly glass 14 and the coin tray 15. The coin detector 42 detects coins paid out from the hopper 16 to output a detection signal to the main CPU 91.

The touch panel 26 detects a position touched by the player to provide the main CPU 91 with a position sense signal corresponding to the detected position. The bill validator 44 in the bill entry 43 provides, upon detection of a legitimate bill, the main CPU 91 with a bill detection signal corresponding to the bill amount.

The graphic card 76 controls video display of the secondary display 70 and the display panel 24 of the primary display 20 in response to a control signal from the main CPU 91. The graphic card 76 includes a Video Display Processor (VDP) generating video data, and a video RAM temporarily storing the video data. The video data may be originated from the game program stored in the RAM 93.

The IC card reader 62 reads out data stored in the IC card inserted into the card slot 176 to provide the read-out data to the main CPU 91. Also, the IC card reader 62 writes data received the main CPU 91 into the ID card.

The ticket printer 66 prints on a ticket the barcode containing information of the credit amount stored in the RAM 93, date and time, the identification number of the gaming machine 1, and the like, in response to the control signal from the main CPU 91 to output the barcode imprinted ticket.

The key switch 67*s*, which is disposed behind the keypad 67, outputs a key detection signal to the main CPU 91 when the keypad 67 is pressed by the player.

The data display 68 displays information related the input through the keypad 67 in response to a control signal from the main CPU 91.

The body PCB 87 is also electrically connected to the reel assembly 30, which includes first to fifth reel units 30*a* to 30*e*, each of the reel unit 30*a* to 30*e* including the reels 31*a* to 31*e*, respectively.

Referring to FIG. 13, each of the reel units 30*a* to 30*e* includes a reel circuit board 36. The reel circuit board 36 includes an input/output (I/O) unit 37 capable of communicating with the body PCB 87, a reel driver 32*t* connected to the I/O unit 37, a backlight driver 34*t*, and a lighting unit driver 35*t*.

To the I/O unit 37 is connected a magnetic field detector 33, which includes a magnetic sensor for sensing magnetic field intensity to output a magnetic detection signal proportional to the magnetic field intensity, and sensor fixation means for fixing the magnetic sensor to a predetermined position. The magnetic sensor detects the intensity of the magnetic field generated by a magnet which is connected to a rotating axis of a reel motor 32 to rotate with the reel 31*a*.

The reel driver 32*t* supplies electric power to the reel motor 32. The backlight driver 34*t* supplies electric power individually to each light source 34*s* in a backlight unit 34. The lighting unit driver 35*t* supplies electric power individually to each light source 35*t* of a lighting unit 35. The lighting unit 35 may be the line lighting unit adjacent to a corresponding reel.

Since a second to a fifth reel units 30*b* to 30*e* have the same configuration as a first reel unit 30*a*, detailed description thereof will be omitted.

The reel assembly 30 may further include lighting unit driver (not shown) that is electrically connected to the body PCB 87. The lighting unit driver may supply electric power individually to each light source of the background lighting units 38 and 39.

According to an embodiment, as shown in FIG. 14, the game program includes a input/bet check 91*a*, a random number generation 91*b*, a symbol determination 91*c*, a reel control 91*e*, a win determination 91*f*, a rendering control 91*g*, and a payout 91*h*, and a game mode determination 91*i* to execute respective processing.

The bet/input check 91*a*, in an idle state where the reels 31*a* to 31*e* stop, continuously checks whether any of the BET buttons 56*a* to 56*e* or the START button 79 is pressed. After the BET buttons 56*a* to 56*e* or the START button 79 is pressed, the bet/input check 91*a* checks whether there remains any credit for the player on the basis of credit data 93*a* stored in the RAM 93. If the player has at least one remaining credit, the bet/input check 91*a* call the random number generation 91*b*.

Subsequently, the random number generation 91*b* generates random numbers to be used for the symbol determination 91*c*. In the present embodiment, the random number generation 91*b* generates five random numbers, each of which is directed to respective one of the first though the fifth reel units 30*a* to 30*e*.

After five random numbers are completely extracted, the symbol determination 91*c* determines a to-be-stopped symbol for each of the reel units 30*a* to 30*e* with reference to the symbol code determination table stored in the RAM 93. The symbol determination 91*c* uses the five random numbers to determine five to-be-stopped symbols for the reel units 30*a* to 30*e* to be shown in the display window 22 of the primary display 20 for each of the reels 31*a* to 31*e*.

In particular, the symbol determination 91*c* checks the current gaming mode with reference to mode flag 93*b* stored in the RAM 93, and differentiates the symbol determination process between the normal mode and the chance mode. In the normal mode, the symbol determination 91*c* applies a fixed symbol code determination table to determine the symbol using the random number according to a fixed scheme. Contrarily, however, the symbol determination 91*c* consecutively changes the symbol code determination table for each unit game to vary the symbol determination process. The consequence of varying the symbol code determination table is that winning combinations including at least one specific symbol increases as the chance mode games continue. Possible number of chance mode games available in a single session is limited to a certain limit, e.g., eight. In order to limit the number of chance mode games, a game counter 91*d* counts the number of chance mode games already performed or possibly remaining in the session, and a game count value 93*c* is stored in the RAM 93. The game counter 91*d* may reside in the symbol determination 91*c*, alternatively.

The reel control 91*e* provides controls the reel assembly 30 by providing stop position information corresponding to the determined symbols, so that the reels 31*a* to 31*e* spins and stops at position designated by the stop position information. Thus, the symbols scrolls along with the spinning of the reels 31*a* to 31*e* and then stops in such a manner that the determined symbols are arranged in central position vertically in the display window 22 of the primary display 20.

Meanwhile, the win determination 91*f* determines whether any winning combination is established in the rearranged symbols. In case that a winning combination is established in the rearranged symbols, the rendering control 91*g* controls the primary display 20 and the other devices such as the speaker 17, the lamp 18, the secondary display 70 to output production effect. The production effect includes video and audio effect, backlight change, and lighting effect. Also, the payout 91*h* determines payout amount depending on the established winning combination to payout the amount the player obtained.

Meanwhile, whenever the unit game is completed, the game mode determination 91*i* determines the gaming mode of the next unit game. The game mode determination 91*i* changes the normal mode into the chance mode when a trigger event occurs in the rearranged symbols. On the other hands, the game mode determination 91*i* changes the chance mode into the normal mode when an exit condition is satisfied. In the other cases, the game mode determination 91*i* maintains the previous gaming mode. Meanwhile, the game mode determination 91*i* can be implemented inside win determination 91*f*.

Gaming Method

Now, a gaming method of a gaming machine according to embodiments of the present invention is described in detail with reference to FIG. 15 to FIG. 21.

Figure 15:
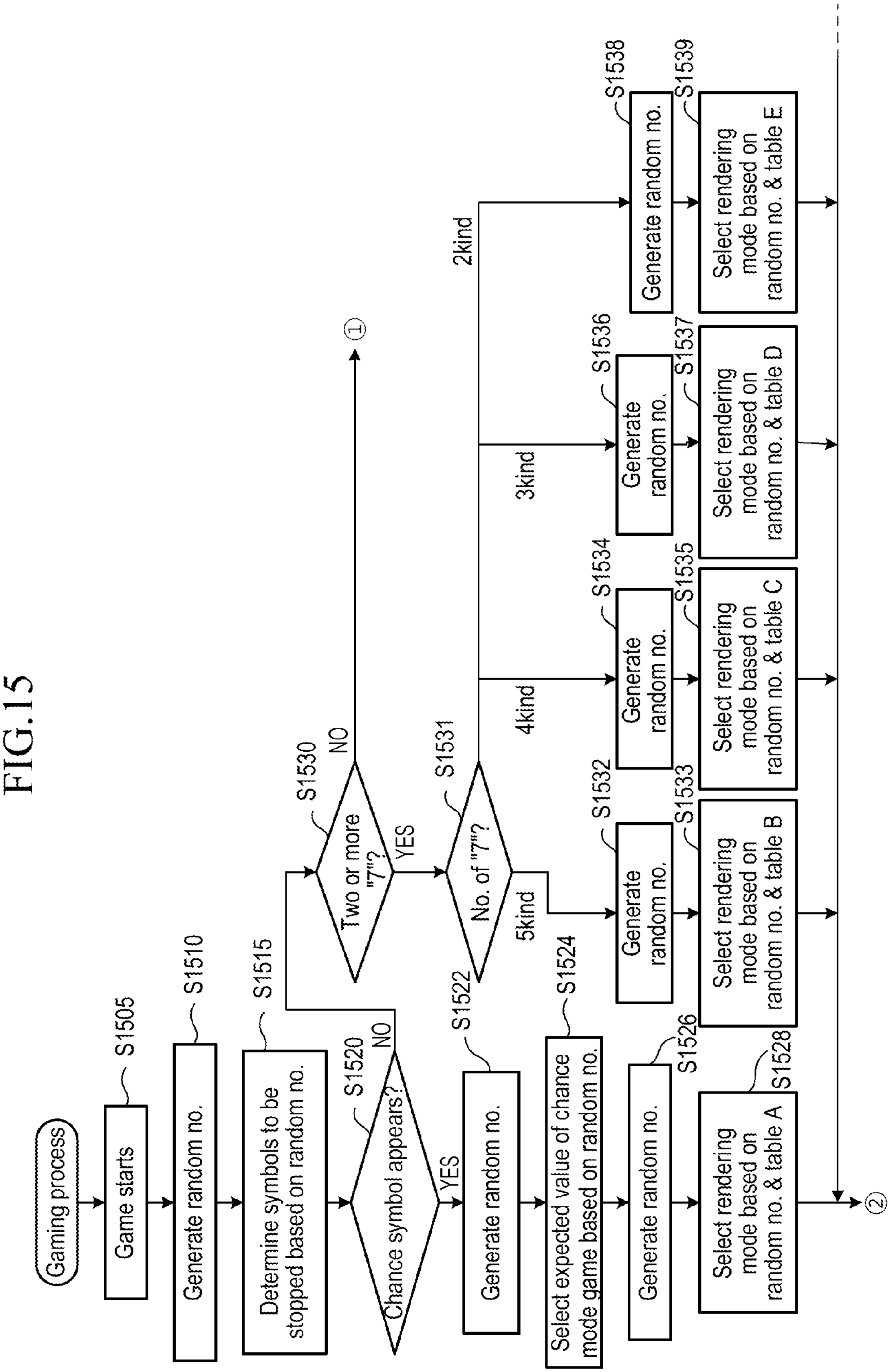
FIG. 15 is a flowchart of an example game process according to an embodiment of the present invention.
Figure 16:
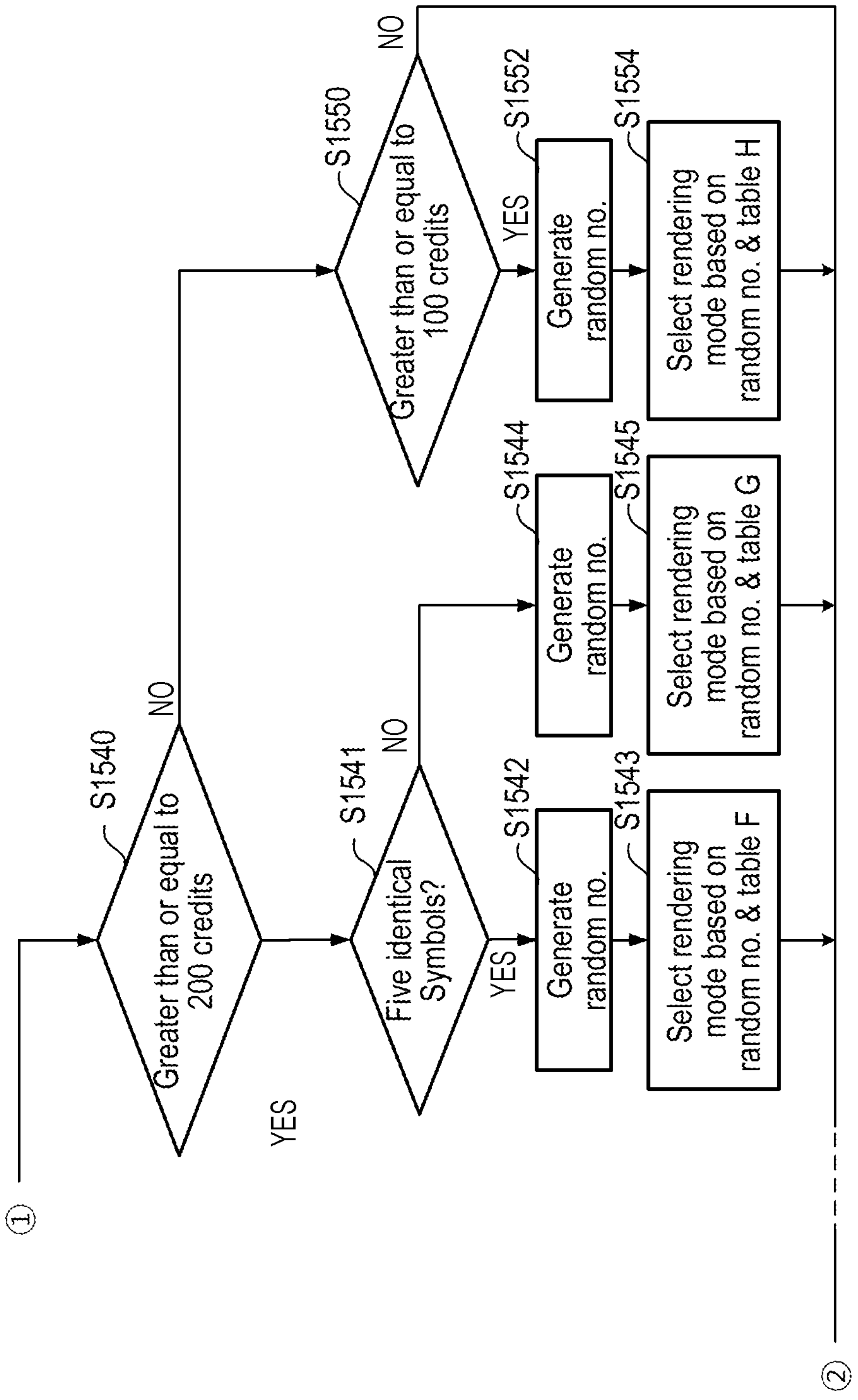
FIG. 16 is a flowchart of an example game process subsequent to a flowchart shown in FIG. 15.
Figure 17:
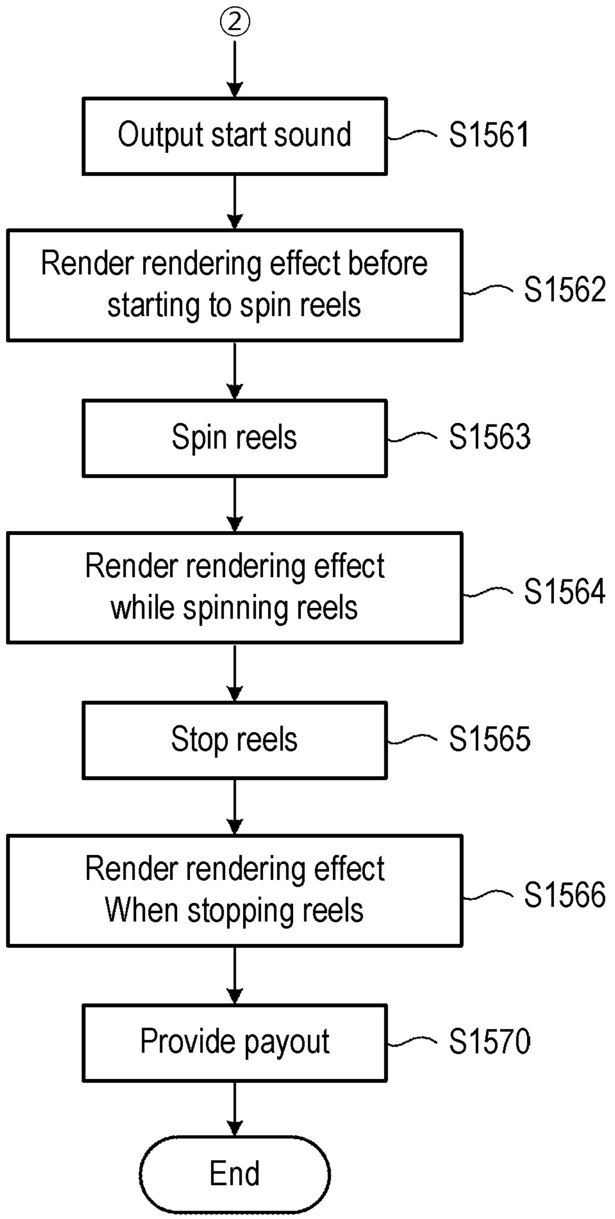
FIG. 17 is a flowchart of an example game process subsequent to a flowchart shown in FIG. 16.

FIG. 15 to FIG. 17 are flowcharts of an example game process according to an embodiment of the present invention, FIG. 18 is a table showing a relationship between an expected value of a chance mode game and a weight, and FIG. 19 to FIG. 21 are examples of a rendering mode lottery table according to an embodiment of the present invention.

According to an embodiment of the present invention, a controller, i.e., a main CPU (91 of FIG. 12) of the gaming machine 1 performs the game process shown in FIG. 15 to execute the game.

Referring to FIG. 15, after credits are bet by a player, the controller determines whether a game is started by the player (S1505). The player may start the game by pressing a START button (54 of FIG. 8). When the game is started, the controller executes a symbol determining process (S1510, S1515). In other words, the controller generates a random number for each of reels 31*a* to 31*e* (S1510), and determines positions where the reels 31*a* to 31*e* are to be stopped based on the generated random number and a symbol code determination table (S1515). Accordingly, symbols to be stopped on each payline are determined.

Next, the controller determines a rendering mode based on a result of the symbol determining process. In some embodiments, the controller may determine the rendering mode for notifying a prize, according to a magnitude of the prize to be provided by a result of the symbol determining process. The controller may determine whether the result of the symbols determining process includes a "CHANCE" symbol (S1520), whether the result of the symbols determining process includes a combination of two or more "7" symbols (S1530), whether a payout (i.e., the prize) according to the result of the symbols determining process is greater than or equal to a first predetermined value (for example, 200 credits) (S1550), or whether the payout according to the result of the symbols determining process is greater than or equal to a second predetermined value (for example, 100 credits) less than the first predetermined value (S1560).

When the result of the symbols determining process includes the "CHANCE" symbol for triggering a chance mode game (S1520: Yes), the controller generates a random number for determining an expected value of the chance mode game (S1522). The expected value corresponds to an amount of credits that are expected to be awarded to the player in the chance mode game. The controller selects the expected value of the chance mode game based on the generated random number (S1524). In this case, the controller may select the expected value referring to an expected value lottery table stored in a memory such as a RAM (93 of FIG. 12). The expected value lottery table includes information representing a plurality of expected values and weights corresponding to the plurality of expected values. The weight corresponds to a range of random numbers, and the range of random numbers is proportional to the weight. As shown in an example of FIG. 18, weights of a higher expected value, a middle expected value, and a lower expected value are 1, 3, and 6, respectively. Accordingly, the lower expected value is selected with a high probability.

Next, the controller generates a random number for determining a rendering mode (S1526). The controller selects the rendering mode based on the generated random number and the result of the symbol determining process, referring to a rendering mode lottery table stored in the memory such as the RAM 93 (S1528). An example of the rendering mode lottery table is shown in FIG. 19 to FIG. 21. In this example, the controller may select a rendering mode corresponding to the random number among rendering modes of a type A in the rendering mode lottery table. For example, assuming that a mode number 10 is selected in the table A, the controller may move the reels 31*a* to 31*e* and render a rendering effect according to a rendering mode defined by a mode 2-1.

Referring to FIG. 19 to FIG. 21, the example of the rendering mode lottery table represents relationships between a plurality rendering modes and weights allocated to the plurality rendering modes for each of a plurality of types. The weight corresponds to a range of random numbers, and the range of random numbers is proportional to the weight. The plurality of types includes a type A, a type B, a type C, a type D, a type E, a type F, a type G, and a type H determined by the result of the symbol determining process. The type A may correspond to a case that the result of the symbol determining process includes the "CHANCE" symbol (S1520). The type B may correspond to a case that the result of the symbols determining process includes a combination of five "7" symbols, the type C may correspond to a case that the result of the symbols determining process includes a combination of four “7” symbols, the type D may correspond to a case that the result of the symbols determining process includes a combination of three “7” symbols, and the type E may correspond to a case that the result of the symbols determining process includes a combination of two “7” symbols. The type F may correspond to a case that the payout according to the result of the symbols determining process is greater than or equal to the first predetermined value (for example, 200 credits) and the result of the symbols determining process includes a combination of five identical symbols, and the type G may correspond to a case that the payout according to the result of the symbols determining process is greater than or equal to the first predetermined value and the result of the symbols determining process does not include a combination of five identical symbols, The type H may correspond to a case that the payout according to the result of the symbols determining process is greater than or equal to the second predetermined value (for example, 100 credits).

The plurality of rendering modes are identified by mode numbers, and the mode numbers may start from 1 and numbers up to 94. Each rendering mode is defined by a combination of at least one of a plurality of modes. For example, the plurality of modes may include a mode 1, a mode 2, a mode 3, a mode 4, and a mode 5.

The mode 1 is used for outputting a start sound, and includes a mode 1-1, a mode 1-2, a mode 1-3, and a mode 1-4. The mode 1-1 may render an effect for delaying an output of a start sound notifying a game start, the mode 1-2 may render an effect for outputting a particular sound as the start sound, the mode 1-3 may render an effect for outputting no start sound, and the mode 1-4 may render an effect for outputting a sound notifying a trigger of the chance mode game as the start sound.

The mode 2 is used before the reels 31*a* to 31*e* start to spin, and includes a mode 2-1, a mode 2-2, a mode 2-3, a mode 2-4, a mode 2-5, and a mode 2-6. The modes 2-1, 2-2, 2-3, 2-4, 2-5, and 2-6 may render various lighting patterns of backlight units (34 of FIG. 13) for the reels 31*a* to 31*e*.

The mode 3 is used when the reels 31*a* to 31*e* start to spin, and includes a mode 3-1, a mode 3-2, and a mode 3-3. The mode 3-1 may render an effect for rotating the reels 31*a* to 31*e* after moving the reels 31*a* to 31*e* upward, the mode 3-2 may render an effect for sequentially rotating the reels 31*a* to 31*e*, and the mode 3-3 may render an effect for rotating the reels 31*a* to 31*e* after lighting the whole surface of the reels 31*a* to 31*e*.

The mode 4 is used while the reels 31*a* to 31*e* are spinning, and includes a mode 4-1 and a mode 4-2. The mode 4-1 may render an effect for notifying an appearance of a combination of the five identical symbols, and the mode 4-2 may render an effect for notifying a trigger of the chance mode game.

The mode 5 is used when some of the reels 31*a* to 31*e* are stopped, and includes a mode 5-1, a mode 5-2, and a mode 5-3. The mode 5-1 may render an effect for notifying an appearance of the low speed spin for the fifth reel 31*e*, the mode 5-2 may render an effect for notifying an appearance of the low speed spin for the third to fifth reels 31*c* to 31*e*, and the mode 5-3 may render an effect for notifying an appearance of the low speed spin for all of the reels 31*a* to 31*e*. The low speed spin is an effect in which some of the reels 31*a* to 31*e* that spin at a normal speed are stopped and then the remaining reel spins at a low speed. In an example of the mode 5-1, after the first to fourth reels 31*a* to 31*d* are stopped, the fifth reel 31*e* spins at the low speed. The triggering event of the low speed spin may be an appearance of the combination of the “7” symbols of the predetermined numbers on the payline.

Referring to FIG. 15 again, when the result of the symbols determining process does not include the “CHANCE” symbol (S1520: No), the controller determines whether the result of the symbols determining process includes the combination of two or more “7” symbols (S1530). When the result of the symbols determining process includes the combination of five “7” symbols (S1531: 5kind), the controller generates a random number for determining a rendering mode (S1532). Further, the controller selects the rendering mode based on the generated random number and the type B of the rendering mode lottery table (S1533). When the result of the symbols determining process includes the combination of four “7” symbols (S1531: 4kind), the controller generates a random number for determining a rendering mode (S1534), and selects the rendering mode based on the generated random number and the type C of the rendering mode lottery table (S1535). When the result of the symbols determining process includes the combination of three “7” symbols (S1531: 3kind), the controller generates a random number for determining a rendering mode (S1536), and selects the rendering mode based on the generated random number and the type D of the rendering mode lottery table (S1537). When the result of the symbols determining process includes the combination of two “7” symbols (S1531: 2kind), the controller generates a random number for determining a rendering mode (S1538), and selects the rendering mode based on the generated random number and the type E of the rendering mode lottery table (S1539).

Referring to FIG. 16, when the result of the symbols determining process does not include the combination of two or more “7” symbols (S1530: No), the controller determines whether the payout according to the result of the symbols determining process is greater than or equal to the first predetermined value (for example, 200 credits) (S1540). When the payout according to the result of the symbols determining process is greater than or equal to the first predetermined value (S1540: Yes), the controller determines whether the result of the symbol generating process includes the combination of five identical symbols (S1541). When the result of the symbol generating process includes the combination of five identical symbols (S1541: Yes), the controller generates a random number for determining a rendering mode (S1542), and selects the rendering mode based on the generated random number and the type F of the rendering mode lottery table (S1543). When the result of the symbol generating process does not include the combination of five identical symbols (S1541: No), the controller generates a random number for determining a rendering mode (S1544), and selects the rendering mode based on the generated random number and the type G of the rendering mode lottery table (S1545).

When the payout according to the result of the symbols determining process is less than the first predetermined value (S1540: No), the controller determines whether the payout according to the result of the symbols determining process is greater than or equal to the second predetermined value (for example, 100 credits) (S1550). When the result of the symbols determining process is greater than or equal to the second predetermined value (S1550: Yes), the controller generates a random number for determining a rendering mode (S1552), and selects the rendering mode based on the generated random number and the type H of the rendering mode lottery table (S1554). When the payout according to the result of the symbols determining process is less than the second predetermined value (S1550: No), the controller selects a general rendering mode for a normal mode.

Referring FIG. 17, after selecting the rendering mode, the controller outputs the start sound according to the selected rendering mode (S1561). If the selected rendering mode does not include the start sound, the controller does not output the start sound. Next, the controller performs a rendering effect to be rendered before starting to spin the reels 31*a* to 31*e* according to the selected rendering mode (S1562), and spins the reels (S1563). Next, the controller performs a rendering effect to be rendered while the reels 31*a* to 31*e* are spinning, according to the selected rendering mode (S1564). The controller stops at least some of the reels 31*a* to 31*e* (S1565), and performs a rendering effect to be rendered when at least some of the reels 31*a* to 31*e* are stopped, according to the selected rendering mode (S1566). After all of the reels 31*a* to 31*e* are stopped, the controller provides a payout according to the result of the symbol determining process (S1570).

As such, according to an embodiment of the present invention, various rendering effect can be provided to the player according to the result of the symbol determining process.

Each of data sheets generated by a development tool according to an embodiment of the present invention corresponds to any one of various modes. That is, commands for controlling the reels 31*a* to 31*e* and/or rendering devices according to a corresponding mode are input to the data sheet. Accordingly, the gaming machine 1 can select at least one data sheet among the data sheets according to at least one mode configuring the determined rendering mode, and interpret the selected data sheet. Alternatively, each of data sheets may correspond to any one of various rendering modes. That is, each of data sheets may correspond to a rendering mode configured by at least one mode. Further, an identifier for identifying a corresponding mode or rendering mode may be assigned to each of the data sheets.

Various Rendering Effects

Now, examples of various rendering effect are described with reference to FIG. 22 to FIG. 36.

Lighting Effects

Figure 22:
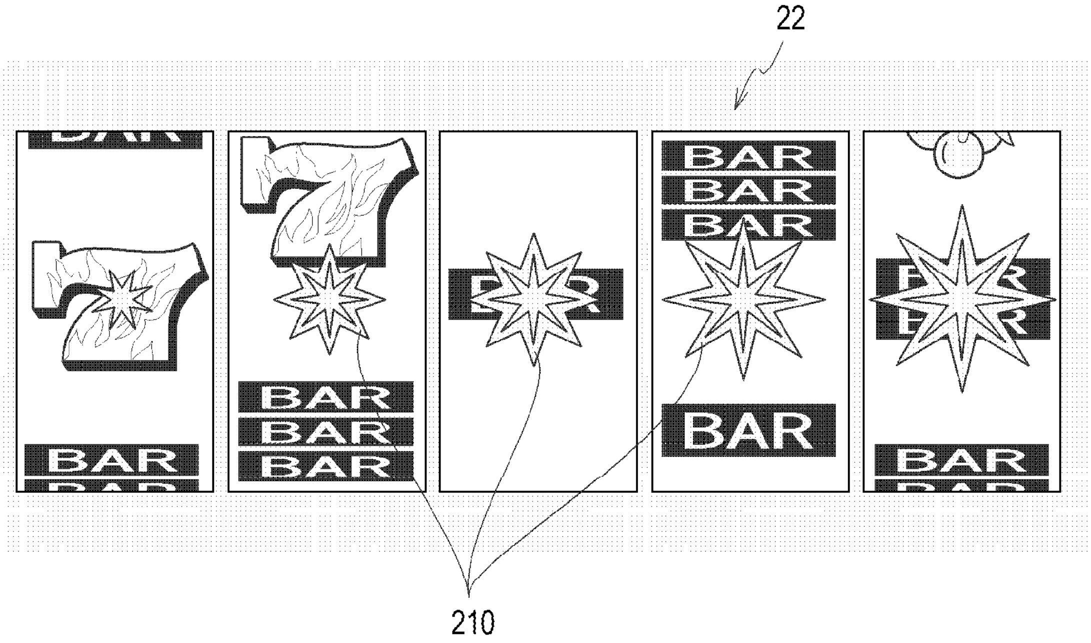
FIG. 22 shows an example of a rendering effect.

FIG. 22 shows an example of a rendering effect according to a mode 2-1. As shown in FIG. 22, in the rendering effect 210 according to the mode 2-1, backlight drivers (34*t* of FIG. 13) control backlight units 34 for the reels 31*a* to 31*e* to light symbols located on a middle row of a display window (22 of FIG. 22) using corresponding backlight units 34. In this case, the brightness is increased in order of the first, second, third, fourth, and fifth reels 31*a*, 31*b*, 31*c*, 31*d*, and 31*e*, The brightness of the symbol may be controlled the number of lighting sources 34*s* to be lit in a lighting area (M5 of FIG. 10) corresponding to the symbol. After the rendering effect 210 shown in FIG. 22 is rendered, reel drivers (32*t* of FIG. 13) spin the reels 31*a* to 31*e*, and then sequentially stop the reels 31*a* to 31*e* as shown in FIG. 7.

Figure 23:
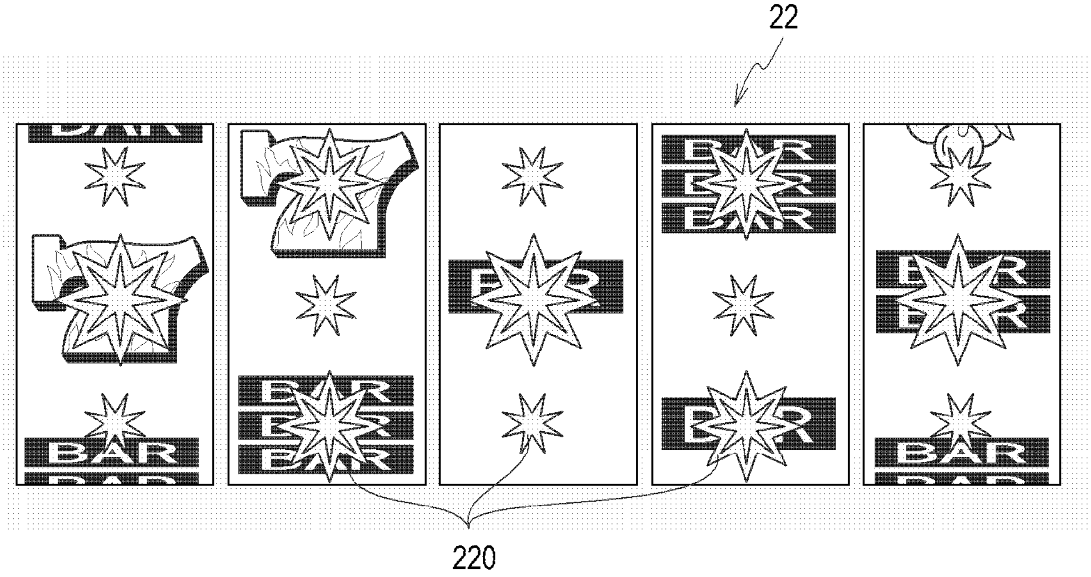
FIG. 23 shows another example of a rendering effect.

FIG. 23 shows an example of a rendering effect according to a mode 2-2. As shown in FIG. 23, in the rendering effect 220 according to the mode 2-2, the backlight drivers 34*t* control the backlight units 34 to render a lighting pattern forming a flower on the display window 22. That is, some of symbols on the display window 22 are lit with the high brightness, and remaining symbols on the symbol matrix are lit with the low brightness. After the rendering effect 220 shown in FIG. 23 is rendered, the reel drivers 32*t* spin the reels 31*a* to 31*e*, and then sequentially stop the reels 31*a* to 31*e* as shown in FIG. 7.

Figure 24:
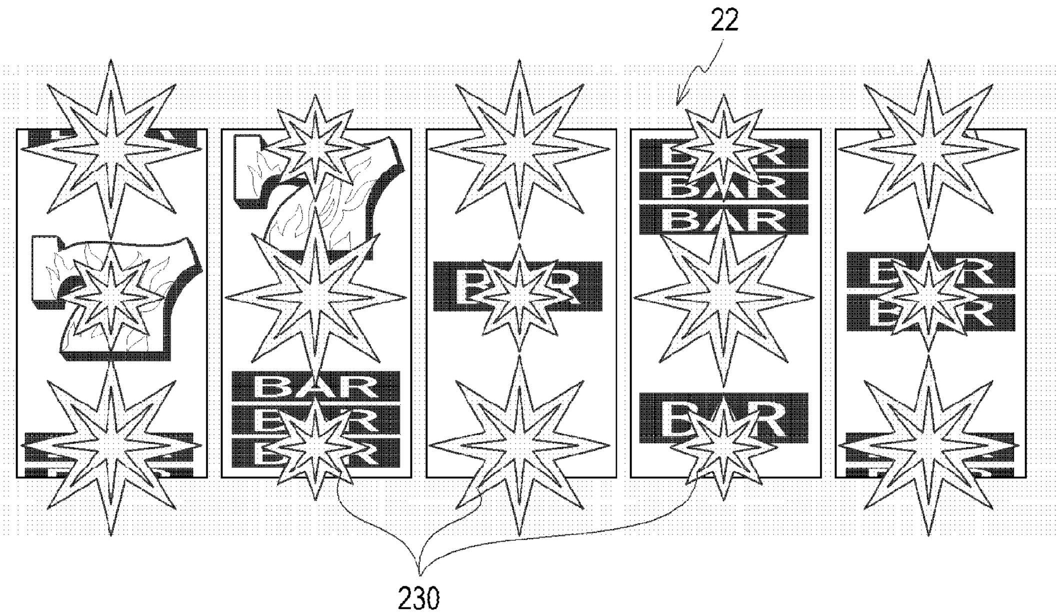
FIG. 24 shows yet another example of a rendering effect.

FIG. 24 shows an example of a rendering effect according to a mode 2-3. As shown in FIG. 24, in the rendering effect 230 according to the mode 2-3, the backlight drivers 34*t* control the backlight units 34 to render a lighting pattern for lighting all of symbols on the display window 22 with varying brightness. After the rendering effect 230 shown in FIG. 24 is rendered, the reel drivers 32*t* spin the reels 31*a* to 31*e*, and then sequentially stop the reels 31*a* to 31*e* as shown in FIG. 7.

Figure 25:
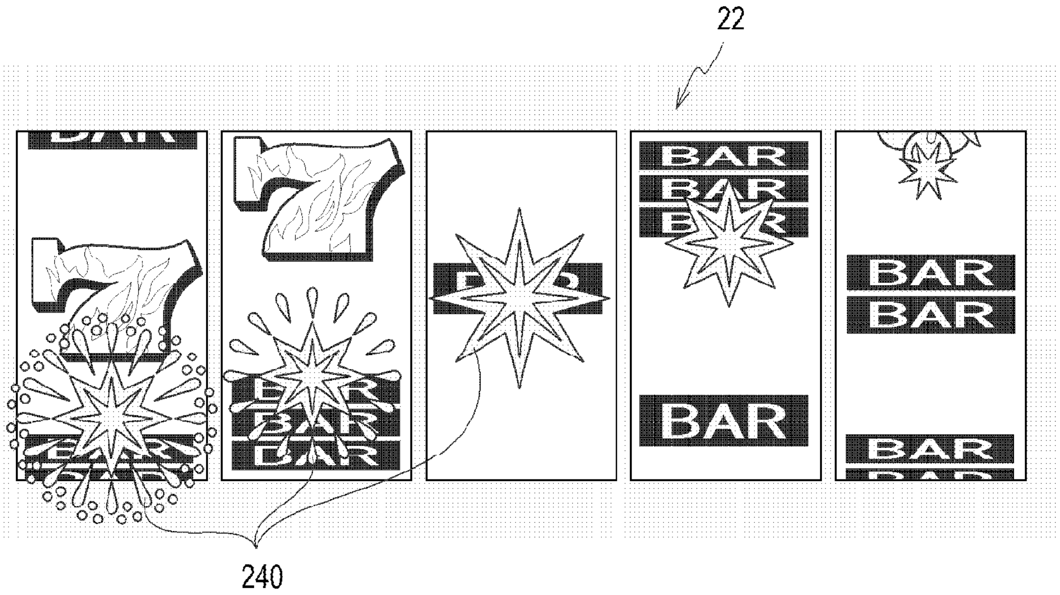
FIG. 25 shows yet another example of a rendering effect.

FIG. 25 shows an example of a rendering effect according to a mode 2-4. As shown in FIG. 25, in the rendering effect 240 according to the mode 2-4, the backlight drivers 34*t* control the backlight units 34 to render a lighting pattern for emitting the light along with a diagonal connecting a symbol on an upper row of the fifth column and a symbol on a lower row of the first column in the display window 22. In this case, the light may be sequentially emitted in the order of the symbol on the upper row of the fifth column and the symbol on the lower row of the first column, and the brightness may be increased in the order of the symbol on the upper row of the fifth column and the symbol on the lower row of the first column After the rendering effect 240 shown in FIG. 25 is rendered, the reel drivers 32*t* spin the reels 31*a* to 31*e*, and then sequentially stop the reels 31*a* to 31*e* as shown in FIG. 7.

Figure 26:
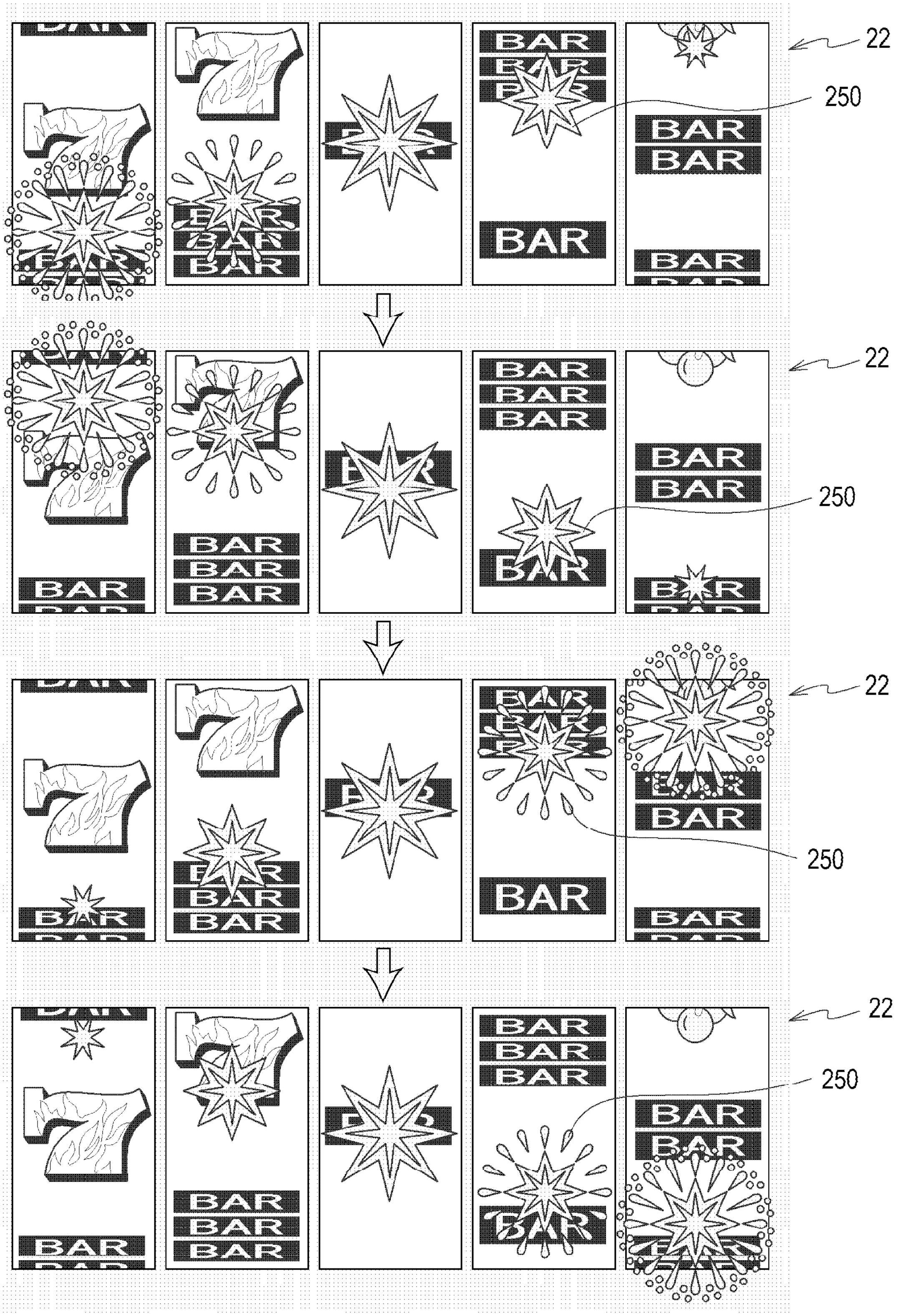
FIG. 26 shows yet another example of a rendering effect.

FIG. 26 shows an example of a rendering effect according to a mode 2-5. As shown in FIG. 26, in the rendering effect 250 according to the mode 2-5, the backlight drivers 34*t* control the backlight units 34 to render a lighting pattern for sequentially emitting the light along with four diagonals. The first diagonal is a line connecting the symbol on the upper row of the fifth column and the symbol on the lower row of the first column in the display window 22. In the first diagonal, the light may be sequentially emitted in the order of the symbol on the upper row of the fifth column and the symbol on the lower row of the first column, and the brightness may be increased in the order of the symbol on the upper row of the fifth column and the symbol on the lower row of the first column. The second diagonal is a line connecting a symbol on the lower row of the fifth column and a symbol on the upper row of the first column. In the second diagonal, the light may be sequentially emitted in the order of the symbol on the lower row of the fifth column and the symbol on the upper row of the first column, and the brightness may be increased in the order of the symbol on the lower row of the fifth column and the symbol on the upper row of the first column. The third diagonal is a line connecting a symbol on the lower row of the first column and a symbol on the upper row of the fifth column. In the third diagonal, the light may be sequentially emitted in the order of the symbol on the lower row of the first column and the symbol on the upper row of the fifth column, and the brightness may be increased in the order of the symbol on the lower row of the first column and the symbol on the upper row of the fifth column. The fourth diagonal is a line connecting a symbol on the upper row of the first column and a symbol on the lower row of the fifth column. In the fourth diagonal, the light may be sequentially emitted in the order of the symbol on the upper row of the first column and the symbol on the lower row of the fifth column, and the brightness may be increased in the order of the symbol on the upper row of the first column and the symbol on the lower row of the fifth column. After the rendering effect 250 shown in FIG. 26 is rendered, the reel drivers 32*t* spin the reels 31*a* to 31*e*, and then sequentially stop the reels 31*a* to 31*e* as shown in FIG. 7.

Figure 27:
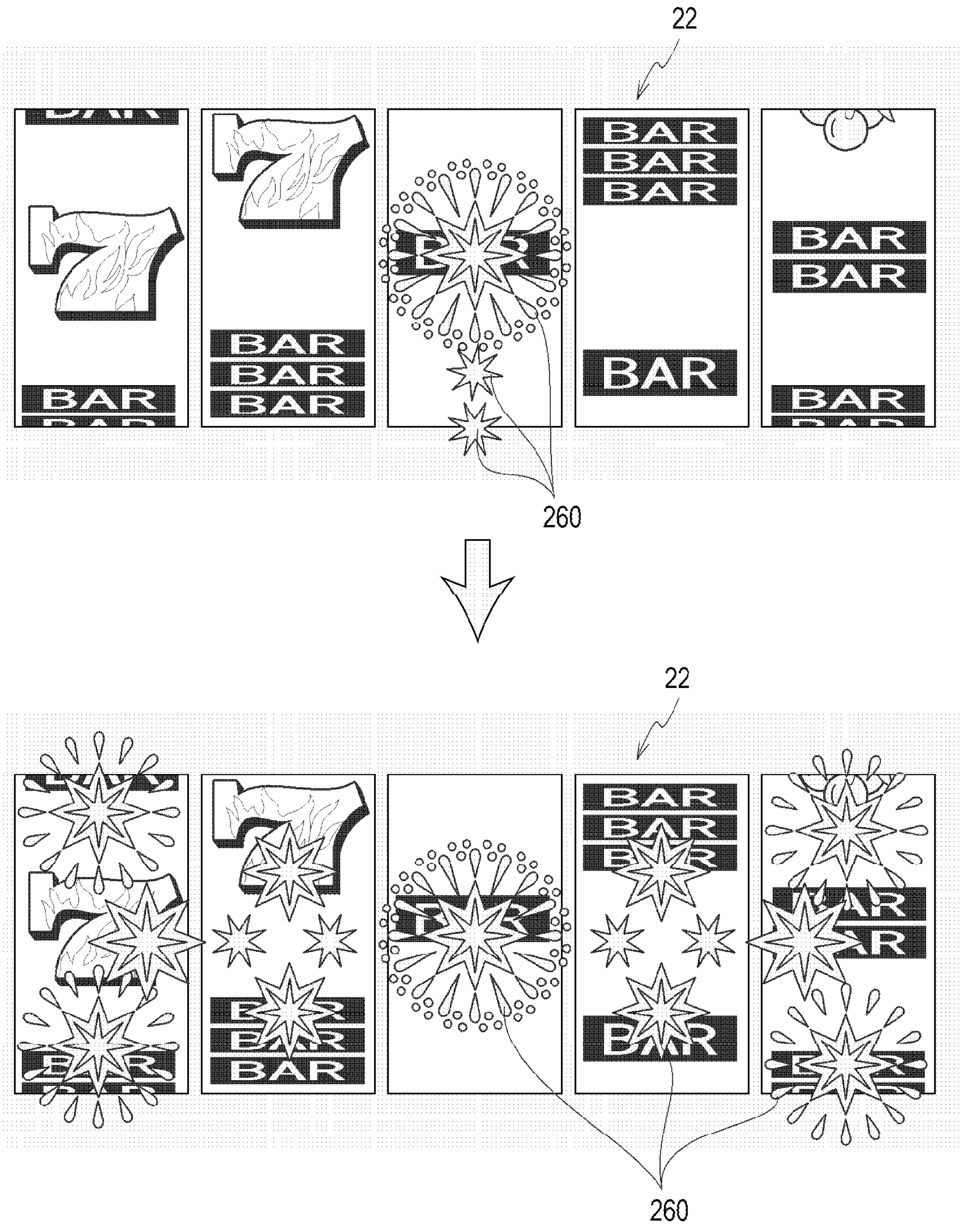
FIG. 27 shows yet another example of a rendering effect.

FIG. 27 shows an example of a rendering effect according to a mode 2-6. As shown in FIG. 27, in the rendering effect 260 according to the mode 2-6, the backlight drivers 34*t* control the backlight units 34 to render a lighting pattern for sequentially emitting the light from a symbol on the lower row of the third column to a symbol on the middle row of the third column in the display window 22. In this case, the brightness light may be emitted in the symbol on the middle row of the third column. Next, the backlight drivers 34*t* control the backlight units 34 to render a light pattern for radiating the light from the symbol on the middle row of the third column to neighbor symbols. After the rendering effect 260 shown in FIG. 27 is rendered, the reel drivers 32*t* spin the reels 31*a* to 31*e*, and then sequentially stop the reels 31*a* to 31*e* as shown in FIG. 7.

Moving Effects of Reels

Figure 28:
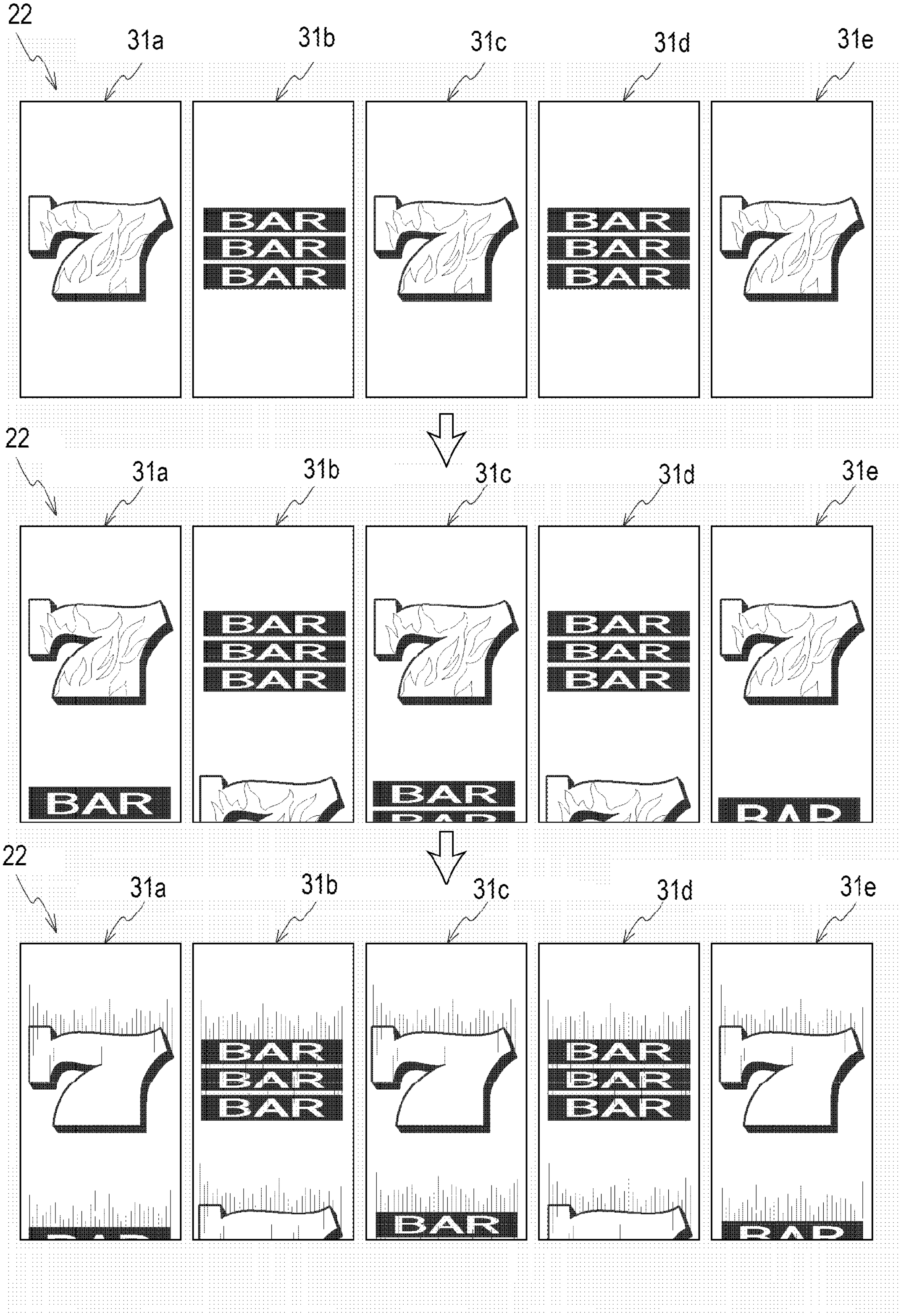
FIG. 28 shows yet another example of a rendering effect.

FIG. 28 shows an example of a rendering effect according to a mode 3-1. As shown in FIG. 28, in the rendering effect according to the mode 3-1, the reel drivers 32*t* move the reels 31*a* to 31*e* upward, and then spin the reels 31*a* to 31*e* in a forward direction. Next, the reel drivers 32*t* sequentially stop the reels 31*a* to 31*e* as shown in FIG. 7.

Figure 29:
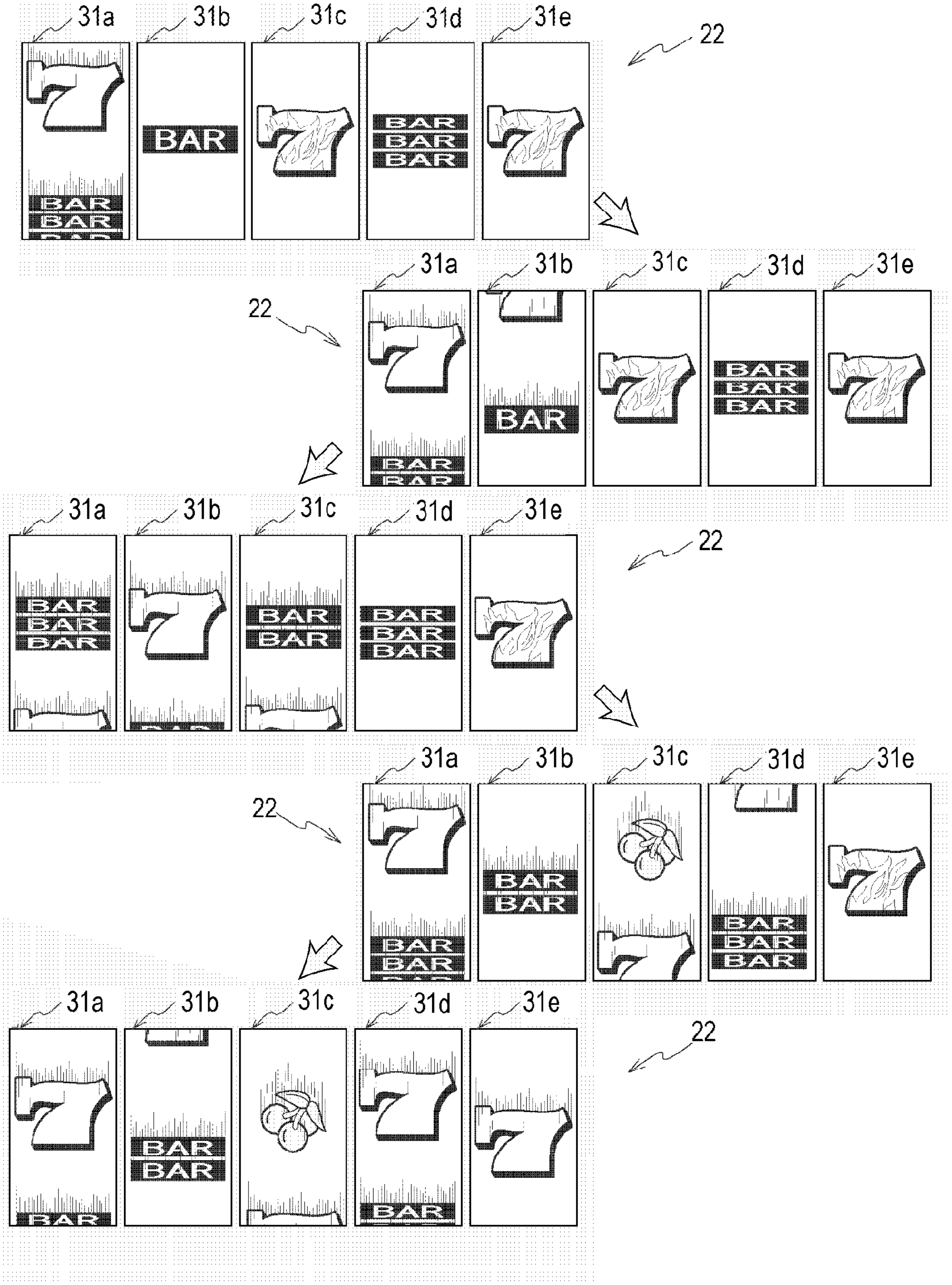
FIG. 29 shows yet another example of a rendering effect.

FIG. 29 shows an example of a rendering effect according to a mode 3-2. As shown in FIG. 29, in the rendering effect according to the mode 3-2, the reel drivers 32*t* sequentially spin the reels 31*a* to 31*e* in the forward direction. Next, the reel drivers 32*t* sequentially stop the reels 31*a* to 31*e* as shown in FIG. 7.

Figure 30:
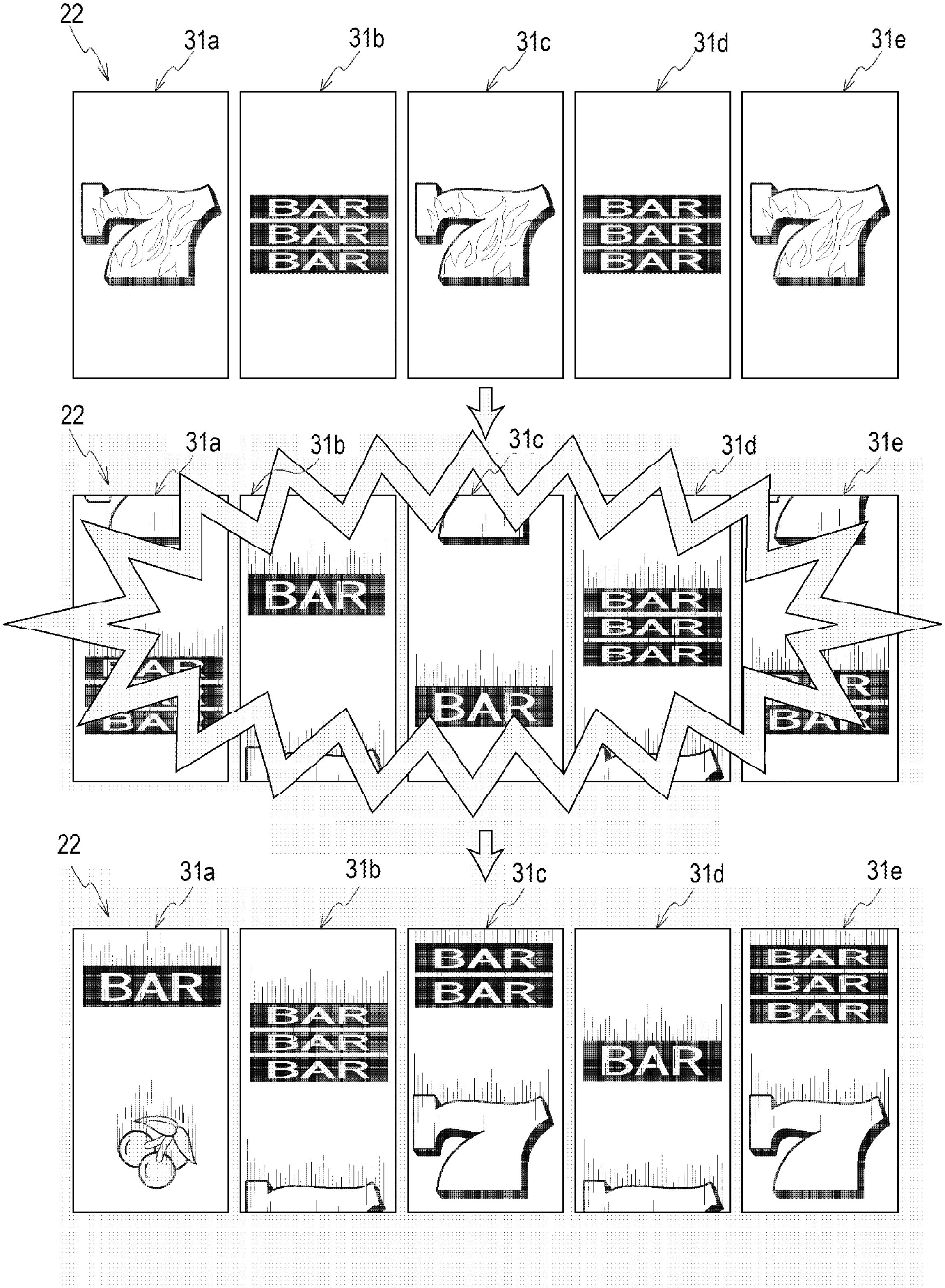
FIG. 30 shows yet another example of a rendering effect.

FIG. 30 shows an example of a rendering effect according to a mode 3-3. As shown in FIG. 30, in the rendering effect according to the mode 3-3, the backlight units 34 light all of the symbols on the display window 22, and then the reel drivers 32*t* spin the reels 31*a* to 31*e* in the forward direction. Next, the reel drivers 32*t* sequentially stop the reels 31*a* to 31*e* as shown in FIG. 7.

Effects to be Rendered in Spinning Reels

Figure 31:
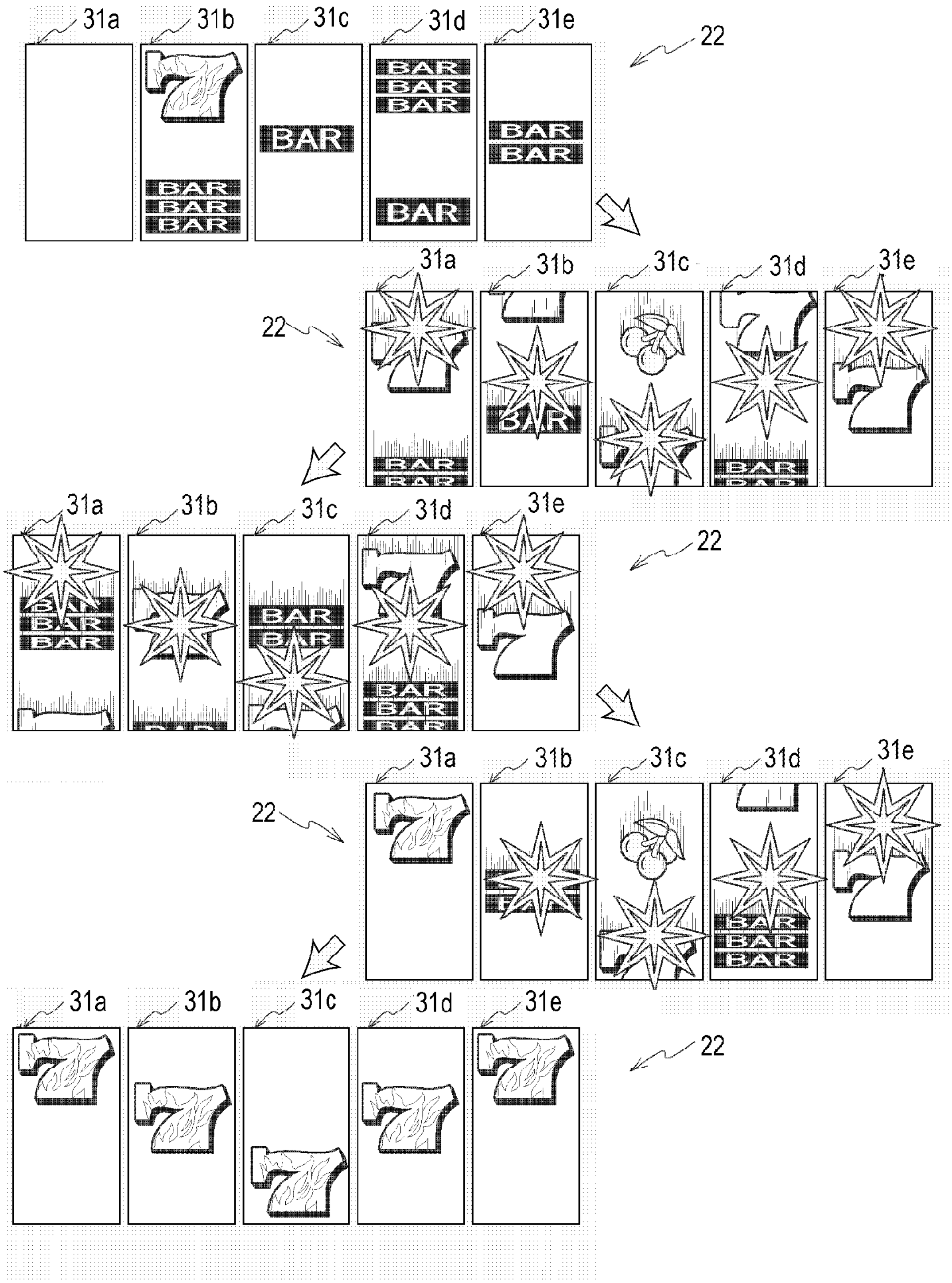
FIG. 31 shows yet another example of a rendering effect.

FIG. 31 shows an example of a rendering effect according to a mode 4-1. As shown in FIG. 31, in the rendering effect according to the mode 4-1, the backlight drivers 34*t* control the backlight units 34 to render a lighting pattern for notifying an appearance of a combination of five identical symbols on a payline while the reel drivers 32*t* spin the reels 31*a* to 31*e*. In detail, the backlight units 34 light locations on which the combination of five identical symbols is to be appeared. In this case, the backlight drivers 34*t* may control the backlight units 34 to darken locations except for the locations corresponding to the combination of five identical symbols. Next, the reel drivers 32*t* sequentially stop the reels 31*a* to 31*e* to appear the five identical symbols on the payline, and the backlight drivers 34*t* control the backlight units 34 to turn off the light on the stopped reel.

Figure 32:
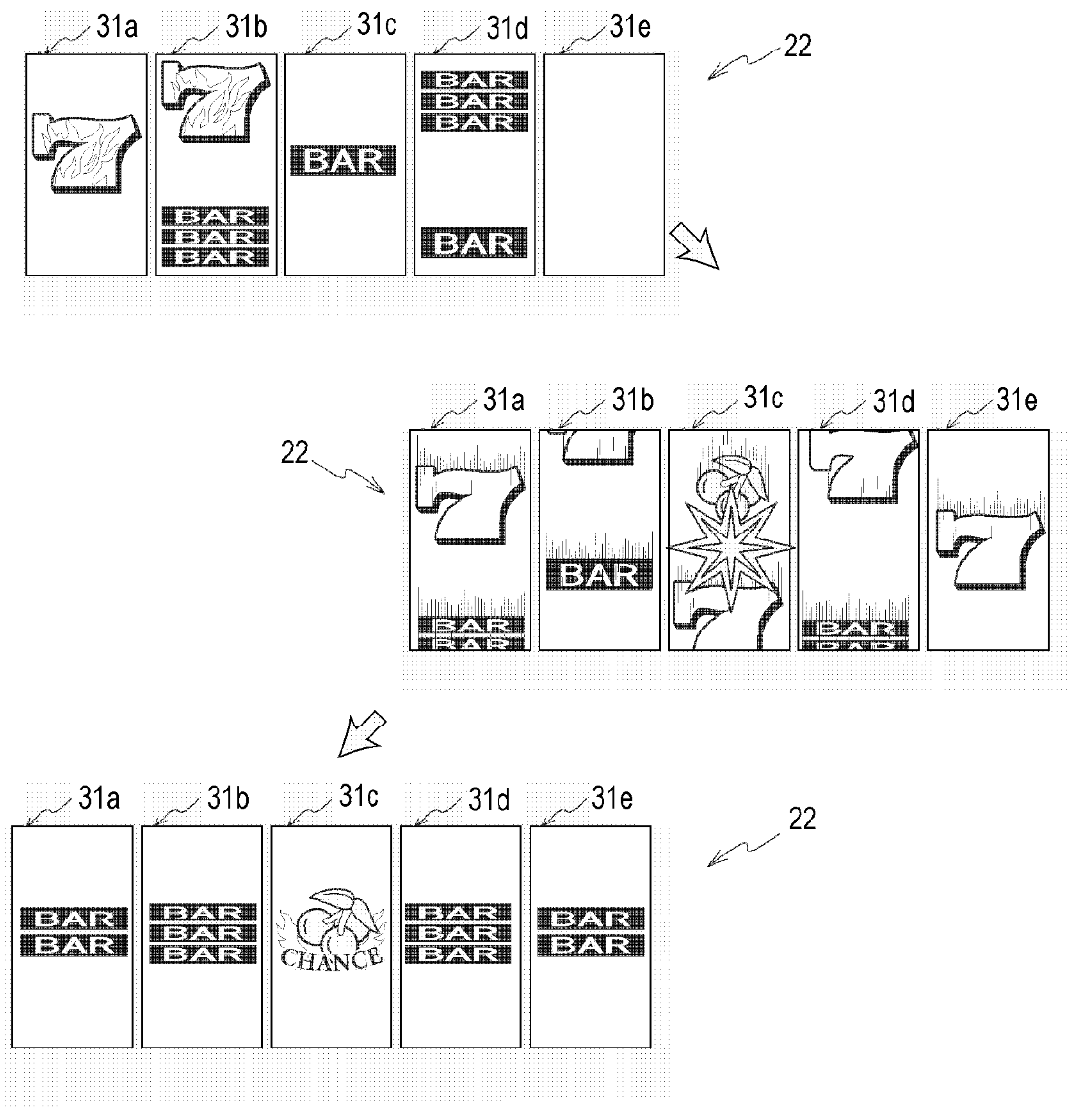
FIG. 32 shows yet another example of a rendering effect.

FIG. 32 shows an example of a rendering effect according to a mode 4-2. As shown in FIG. 32, in the rendering effect according to the mode 4-2, the backlight drivers 34*t* control the backlight units 34 to render a lighting pattern for notifying a trigger of a chance mode game while the reel drivers 32*t* spin the reels 31*a* to 31*e*. In detail, the backlight units 34 light a location on which a "CHANCE" symbol is to be appeared in the reels 31*a* to 31*e*. In this case, the backlight drivers 34*t* may control the backlight units 34 to darken locations except for the location corresponding to the "CHANCE" symbol. Next, the reel drivers 32*t* sequentially stop the reels 31*a* to 31*e* to appear the "CHANCE" symbol.

Effect for Low Speed Spin

Figure 33:
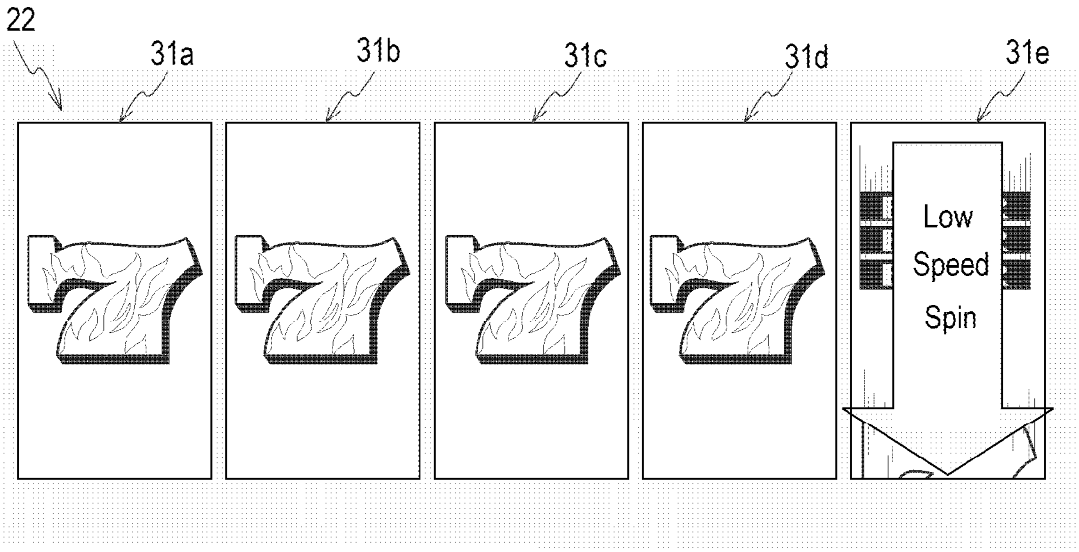
FIG. 33 shows yet another example of a rendering effect.

FIG. 33 shows an example of a rendering effect according to a mode 5-1. As shown in FIG. 7, the reel drivers 32*t* spin the reels 31*a* to 31*e*, and then sequentially stop the reels 31*a* to 31*d*. In the rendering effect according to the mode 5-1, when the first to fourth reels 31*a* to 31*d* are stopped such that "7" symbols are appeared on the payline for the first to fourth reels 31*a* to 31*d*, the reel drivers 32*t* spin the fifth reel 31*e* at the low speed as shown in FIG. 33, to notify the player of an appearance of big prize according to a combination of five "7" symbols.

Figure 34:
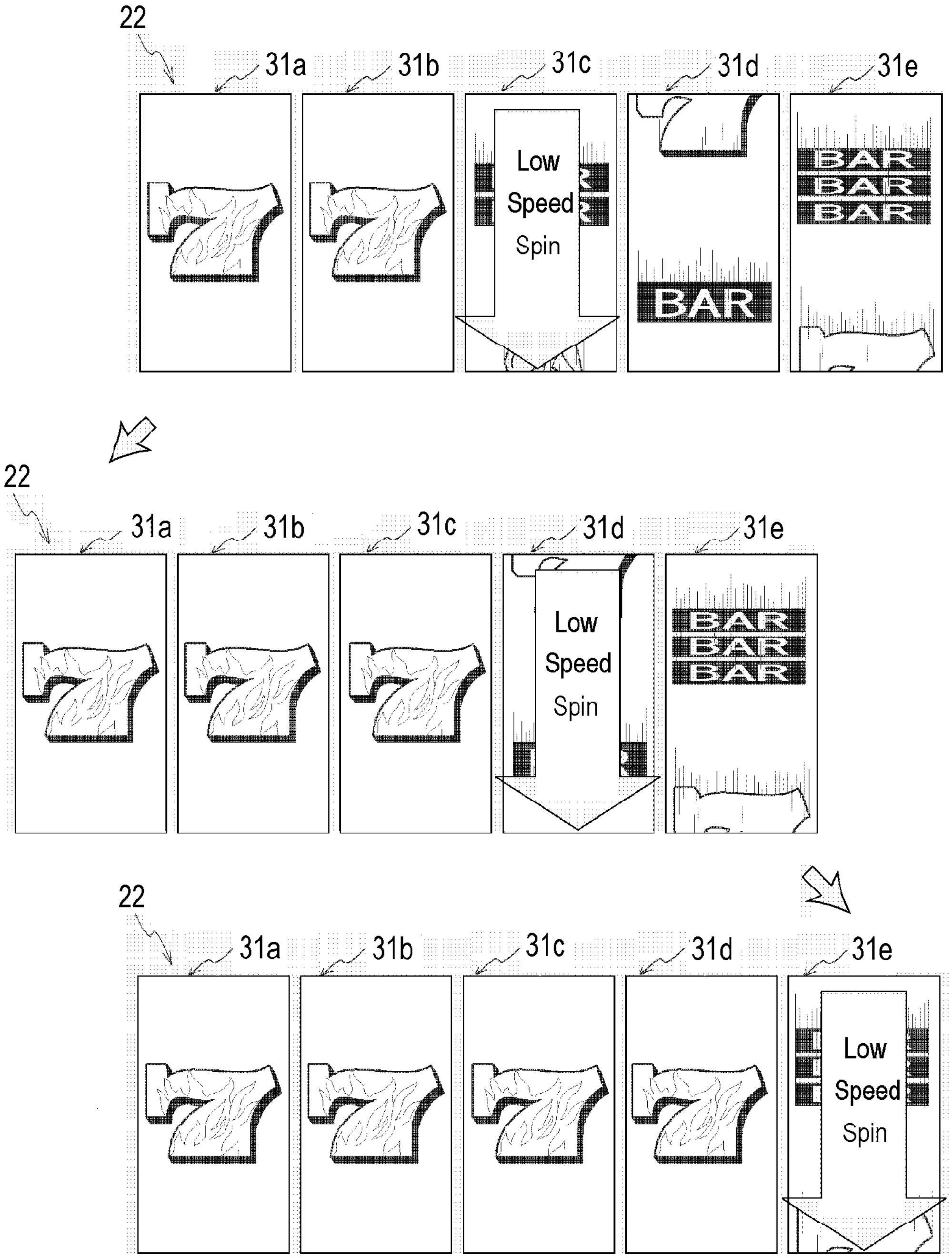
FIG. 34 shows yet another example of a rendering effect.

FIG. 34 shows an example of a rendering effect according to a mode 5-2. As shown in FIG. 7, the reel drivers 32*t* spin the reels 31*a* to 31*e*, and then sequentially stop the reels 31*a* and 31*b*. In the rendering effect according to the mode 5-2, when the first and second reels 31*a* and 31*b* are stopped such that the "7" symbols are appeared on the payline for the first and second reels 31*a* and 31*b*, the reel drivers 32*t* spin the third reel 31*d* at the low speed as shown in FIG. 34, to notify the player of an appearance of big prize according to a combination of "7" symbols. When the third reel 31*c* is stopped such that the "7" symbol is appeared on the payline for the third reel 31*c*, the reel drivers 32*t* spin the fourth reel 31*d* at the low speed. When the fourth reel 31*d* is stopped such that the "7" symbol is appeared on the payline for the fourth reel 31*d*, the reel drivers 32*t* spin the fifth reel 31*e* at the low speed.

Figure 35:
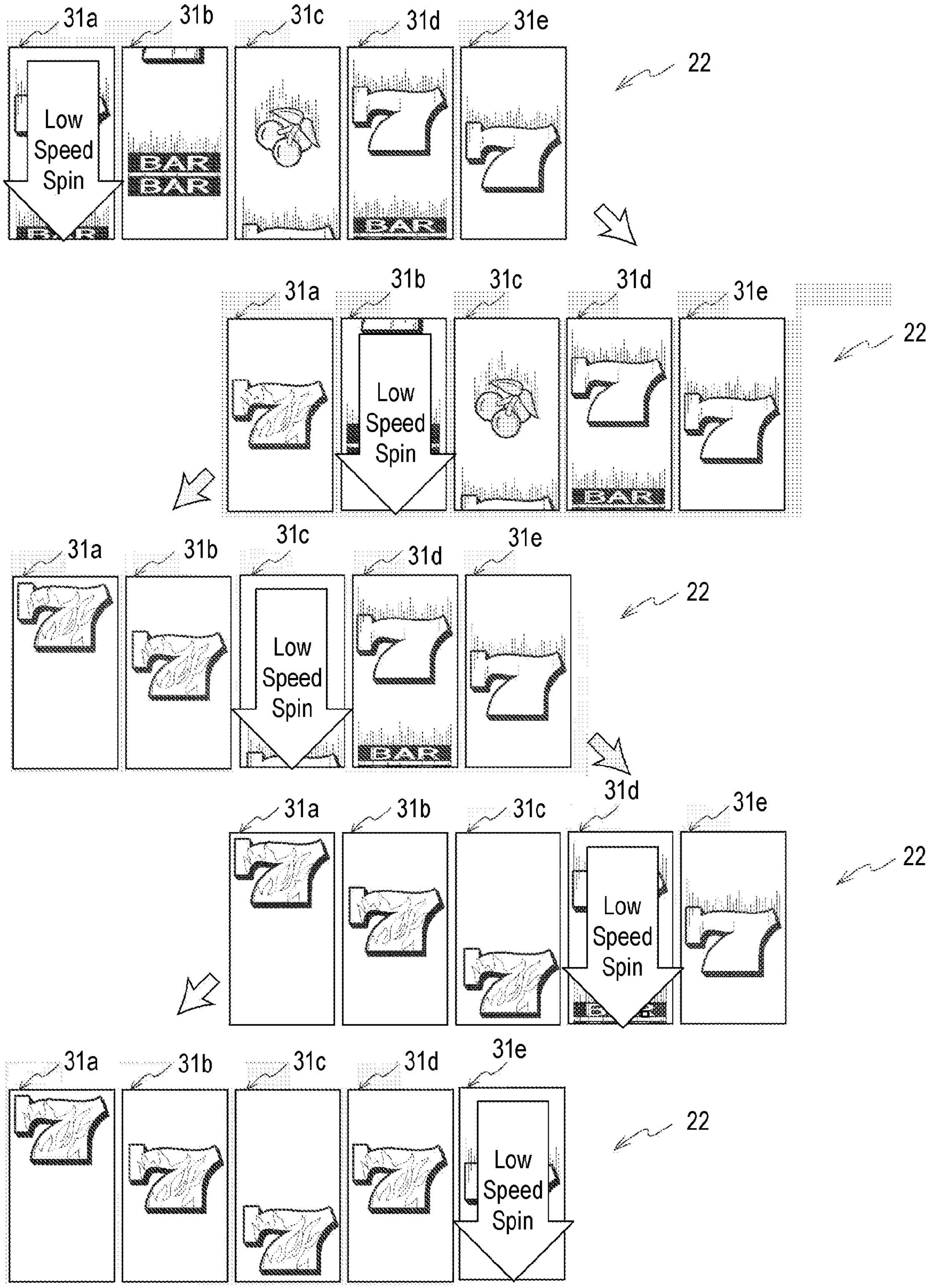
FIG. 35 shows yet another example of a rendering effect.

FIG. 35 shows an example of a rendering effect according to a mode 5-3. As shown in FIG. 7, the reel drivers 32*t* spin the reels 31*a* to 31*e*, and then sequentially stop the reels 31*a* to 31*e* at the low speed, to notify the player of an appearance of big prize according to a combination of "7" symbols. In the rendering effect according to the mode 5-3, when the first reel 31*a* is stopped such that the "7" symbol is appeared on the payline for the first reel 31*a*, the reel drivers 32*t* spin the second reel 31*b* at the low speed. When the second reel 31*b* is stopped such that the "7" symbol is appeared on the payline for the second reel 31*b*, the reel drivers 32*t* spin the third reel 31*c* at the low speed. When the third reel 31*c* is stopped such that the "7" symbol is appeared on the payline for the third reel 31*c*, the reel drivers 32*t* spin the fourth reel 31*d* at the low speed. When the fourth reel 31*d* is stopped such that the "7" symbol is appeared on the payline for the fourth reel 31*d*, the reel drivers 32*t* spin the fifth reel 31*e* at the low speed.

When the rendering effects shown in FIG. 22 to FIG. 35 are rendered, a main CPU (90 of FIG. 12) or a processor mounted on a body PCB (87 of FIG. 12) may control a speaker (17 of FIG. 12) to output an effect sound in synchronization with the rendering effects. Further, when the rendering effects shown in FIG. 22 to FIG. 35 are rendered, a graphic card (76 of FIG. 12) may control a secondary display (70 of FIG. 12) to display an effect image in synchronization with the rendering effects. Alternatively, only at least one of the rendering effect for outputting the effect sound or the rendering effect for display the effect image may be performed without the rendering effect for emitting the light.

Furthermore, the gaming machine 1 may use the rendering effects shown in FIG. 22 to FIG. 35 to notify the prize. As described above, since the rendering effect is determined by the result of the symbol determining process, i.e., the magnitude of the prize, the gaming machine 1 can notify the prize according to the magnitude of the prize, by using the rendering effects shown in FIG. 22 to FIG. 35.

Another Rendering Effect for Notification Rendering Mode

Figure 36:
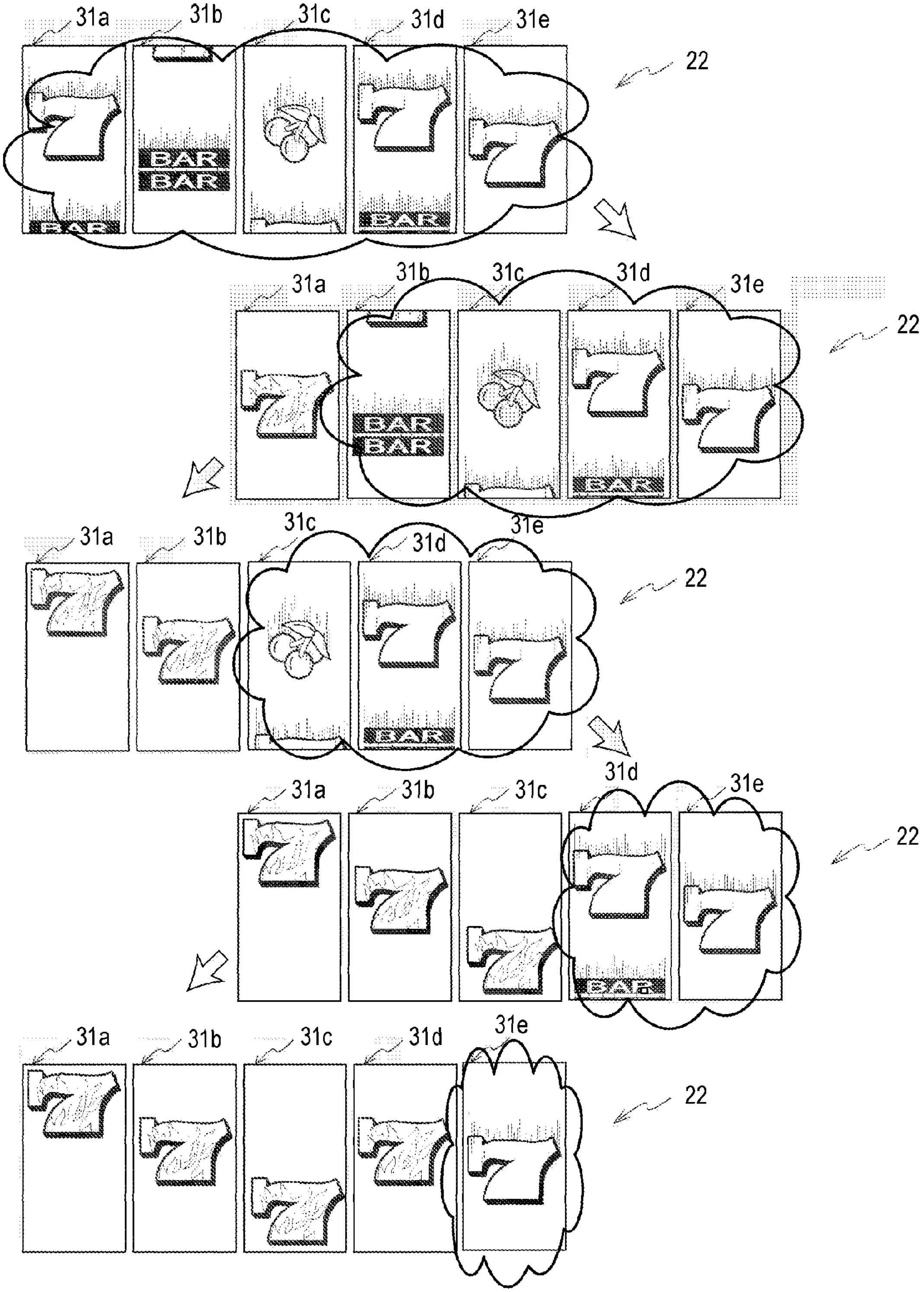
FIG. 36 shows yet another example of a rendering effect.

FIG. 36 shows an example of yet another rendering effect.

As described above, the gaming machine 1 may notify a prize to a player according to a magnitude of the prize such as a payout. That is, the gaming machine 1 may provide a rendering mode for a notification of the prize (hereinafter referred to as "a notification rendering mode"). For the notification rendering mode, the gaming machine 1 may randomly determine whether to notify the prize or not after randomly determining positions where the reels 31*a* to 31*e* are to be stopped. When it is determined that the prize is notified to the player, the gaming machine may render an effect for notifying the prize to the player. In this case, the effect may be varied according to the magnitude of the prize before the reels 31*a* to 31*e* are stopped according the determined positions (i.e., the symbols of the reels 31*a* to 31*e* are rearranged).

As shown in FIG. 36, in a rendering effect for a notification of the prize, the reel drivers 32*t* spin the reels 31*a* to 31*e* in a forward direction, and the backlight drivers 34*t* control the backlight units 34 to render a lighting pattern for notifying the prize. In detail, when the reel drivers 32*t* spin the reels 31*a* to 31*e*, the backlight units 34 light all of the symbols on the display window 22. Next, when the first reel 31*a* is stopped, the backlight units 34 turn off the light on the first reel 31*a*, and maintain the lights on the other reels 31*b* to 31*e*. Subsequently, when the second reel 31*b* is stopped, the backlight units 34 turn off the light on the second reel 31*b*, and maintain the lights on the other reels 31*c* to 31*e*. As such, the reel drivers 32*t* sequentially stop the reels 31*a* to 31*e*, and the backlight units 34 sequentially turn off the lights on the reels 31*a* to 31*e* according to the stop of the reels 31*a* to 31*e*, thereby the rendering effect for notifying the prize. In this case, the backlight drivers 34*t* control the brightness of the lights emitted from the backlight units 34 to be proportional to the magnitude of the prize, thereby notifying the prize according to the magnitude of the prize.

Alternatively, the gaming machine 1 may render an effect for outputting a sound to notify the prize to the player. For example, the main CPU 90 or the processor mounted on the body PCB 87 may control the speaker 17 to output an effect sound according to the magnitude of the prize when the reels 31*a* to 31*e* start to spin. Further, the main CPU 90 or the processor mounted on the body PCB 87 may control the speaker 17 to output an effect sound according to the magnitude of the prize when the reels 31*a* to 31*e* are sequentially stopped. In this case, the effect sound may be outputted in synchronization with the rendering effect shown in FIG. 36.

Alternatively, the gaming machine 1 may render an effect for displaying an image to notify the prize to the player. For example, the graphic card 76 may control the secondary display 70 to display an effect image according to the magnitude of the prize when the reels 31*a* to 31*e* start to spin. Further, the graphic card 76 may control the secondary display 70 to display an effect image according to the magnitude of the prize when the reels 31*a* to 31*e* are sequentially stopped. In this case, the effect image may be displayed in synchronization with the rendering effect shown in FIG. 36 or the effect sound.

Data Generating Method

Now, a data generating method of a development tool according to embodiments of the present invention is described in detail with reference to FIG. 36A to FIG. 39D.

Example of Data Sheet

FIG. 37A to FIG. 37D are a schematic diagram of a data sheet provided by a development tool according to an embodiment of the present invention.

Referring to FIG. 37A to FIG. 37D, a development tool provides an editable data sheet such as a spreadsheet. Control data for a gaming operation of a gaming machine are input to the data sheet, and the data sheet to which the control data are input is stored to the development tool. Accordingly, various control data for the gaming operation may be input to a plurality of data sheets. The control data may include commands such as commands for controlling operations of reel drivers (32*t* of FIG. 13) for a plurality of reels (31*a* to 31*e* of FIG. 2) and commands for controlling operations of rendering drivers for a plurality of rendering devices. The rendering devices may include backlight units (34 of FIG. 10) for the plurality of reels 31*a* to 31*e*, a speaker (17 of FIG. 12) for outputting a sound, and a secondary display (70 of FIG. 2) for displaying an image. The rendering drivers of the backlight units 34 may be backlight drivers (34*t* of FIG. 13). The rendering driver of the speaker 17 may be a main CPU (90 of FIG. 12) or a processor mounted on a body PCB (87 of FIG. 12). The rendering driver of the secondary display 70 may be a graphic card (76 of FIG. 12).

The data sheet includes a plurality of row and a plurality of columns defining a plurality of cells. Each cell is editable, and a corresponding command is input to each cell. The data sheet further includes a plurality of column names (i.e., field names) that correspond to the plurality of columns, respectively. The plurality of column names include field names indicating an object corresponding to a command that is input to a cell of a corresponding column. The objects may be the plurality of reels 31*a* to 31*e* and the plurality of rendering devices for rendering an effect such as a visual effect or a sound effect. The plurality of column names may further include a field name indicating a trigger for triggering each of the plurality of rows and a field name indicating a scene number corresponding to each of the plurality of rows. When each of the plurality of rows is triggered, commands that are input to cells of each of the plurality of rows may be simultaneously executed.

In an example shown in FIG. 37A to FIG. 37D, the plurality of column names include a scene number (Scene No), a plurality of triggers (Trigger 1, Trigger 2, and Trigger 3), and a plurality of object names. The plurality of object names include reel fields for columns associated with a plurality of reels 31*a* to 31*e*, sound fields for columns associated with sounds output from a speaker 17 of the gaming machine 1, and light fields for columns associated with light sources 34*s* of the backlight units 34. The plurality of object names may further include image fields for columns associated with an image displayed in a secondary display 70. The light fields include symbol light fields for columns associated with a backlight unit (34 of FIG. 10) of the plurality of reels 31*a* to 31*e*. The light fields may further include line light fields for columns associated with line lighting units (35 of FIG. 10) and/or background light fields for columns associated with background lighting units (38 and 39 of FIG. 10).

Further, any one of a plurality of tags is input to a beginning of each row and indicates a function of each row. The plurality of tags are used for synchronization of commands included in the plurality of columns. The plurality of tags may include a scene start tag (#SCENE_ST), a scene trigger tag (#SCENE_TR), and a scene end tag (#SCENE_END). The scene end tag (#SCENE_END) may be omitted. A scene corresponds to a rendering effect for the gaming machine 1. The scene start tag (#SCENE_ST) is input to a row including commands to be executed when each scene starts. The scene trigger tag (#SCENE_TR) is input to a row including commands to be executed when a triggering condition is satisfied after the scene start tag (#SCENE_ST). The scene end tag (#SCENE_END) is input to a row including commands to be executed when each scene ends.

The scene number (Scene No) indicates a number of the scene and corresponds to a priority for defining an order of execution of commands for a plurality of scenes. The scene number (the priority) may start from zero and be incremented to nine. The scene number may be incremented by one when the scene is changed.

The plurality of triggers may include a trigger (Trigger 1 and Trigger 2) for indicating a triggering condition of a scene trigger and a trigger (Trigger 3) for indicating a start or an end of the scene. The trigger (Trigger 1) indicates a triggering condition for triggering each row, and the trigger (Trigger 2) indicates a delay between a time when the triggering condition is satisfied and a time when commands are executed.

"START" is input to the trigger (Trigger 3) when the scene is in progress by at least one of the reels 31*a* to 31*e* that is spinning, and "END" is input to the trigger (Trigger 3) when all of the reels 31*a* to 31*e* are stopped. Accordingly, "START" may be input to the trigger (Trigger 3) of rows having the scene start tag (#SCENE_ST) or the scene trigger tag (#SCENE_TR), and "START" may be input to the trigger (Trigger 3) of rows having the scene end tag (#SCENE_END).

When a plurality of scene numbers (Scene No) are input to the data sheet, commands are in the order of scene number (Scene No) in the gaming machine 1. That is, commands that are input to rows having the smallest scene number (Scene No=0) are first performed, and commands that are input to rows having the largest scene number (Scene No=9) are performed last. Further, in rows having the same scene number (Scene No), commands are performed in order of rows having the scene start tag (#SCENE_ST), rows having the scene trigger tag (#SCENE_TR), and rows having the scene end tag (#SCENE_END). Furthermore, in rows having the scene trigger tag in the same scene number (Scene No), commands are performed in order of a triggering condition (Trigger 1 and/or Trigger 2). Accordingly, the order of execution for the commands is defined based on the tag, the scene number (the priority), and the triggering condition.

In some embodiments, the order of execution for the commands may be defined based on the scene number (the priority) and the triggering condition without the tag. That is, when generating a game program, a processor 240 of a gaming machine development system can identify that commands are executed in order of scene number. Further, the processor 240 can identify that commands of rows having no triggering condition are first executed and then commands of rows having the triggering condition are executed in the same scene number because the rows having no triggering condition (Trigger 1 or Trigger 2) correspond to the scene start tag. Furthermore, the processor 240 can identify that commands of rows are executed in order of triggering condition. In this case, the scene end tag may not be used in the data sheet.

The reel fields may include a reel filename field to which a filename of a reel control file for controlling the plurality of reels 31*a* to 31*e* is input. The reel control file includes information for controlling the plurality of reels 31*a* to 31*e*, and may include, for example, a speed for rotating each of the plurality of reels 31*a* to 31*e*, a direction for rotating each of the plurality of reels 31*a* to 31*e*, a time for stopping each of the plurality of reels 31*a* to 31*e*, and a moving pattern of each of the plurality of reels 31*a* to 31*e*. The reel fields may further include reel position fields r1, r2, r3, r4 and r5 indicating positions where the plurality of reels 31*a* to 31*e* are to be stopped. However, since reel symbols to be arranged on the plurality of reels 31*a* to 31*e* are randomly determined by the gaming machine 1, the positions of the reel position fields r1, r2, r3, r4 and r5 of the reel fields may be used for a test of the data sheet. The reel control file may be a comma-separated values (CSV) file.

The sound fields may include a sound filename field, a volume field, a time field, and an attribute field. A filename of a sound control file for controlling a sound output from the speaker 17 is input to the sound filename field such that the sound control file is indicated. A volume of the sound output from the speaker 17 is input to the volume field. A time during which the sound is output from the speaker 17 is input to the time field, and an attribute of the sound is input to the attribute field. The sound control file may be an audio file such waveform audio file (WAV) format, MPEG-1 or MPEG-2 audio layer III (MP3) format, or an ogg format that is a free, open container format maintained by the Xiph.Org Foundation. The attribute may be any one of ONCE for playing the sound control file once, REPEAT for repeatedly playing the sound control file, and STOP for stopping a play of the sound control file.

The symbol light fields may include a plurality of reel light fields that corresponds to the plurality of reels 31*a* to 31*e*. Each of the plurality of reel light fields may include a type field, a filename field, and an attribute field. A type of symbol to which commands of the filename field and the attribute field are applied is input to the type field. The type of symbol may be a "BONUS" symbol, a "7" symbol, a "WILD" symbol, a "BAR" symbol, a "DOUBLE BAR" symbol, a "TRIPLE BAR" symbol, or all symbols. The filename field receives a filename of a symbol control file for controlling a lighting of light sources (34*s* of FIG. 10) included in a lighting area (M5 of FIG. 10) corresponding to a symbol such that the symbol control file is indicated for controlling the lighting of the light sources 34*s*. The symbol control file may be a CSV file. An attribute of the lighting of the light sources 34*s* is input to the attribute field. The attribute may be any one of "START" for starting the lighting of the light sources 34*s* according to the symbol control file indicated by the filename field or "STOP" for stopping the lighting of the light sources 34*s*.

The background light fields may include a filename field and an attribute field. The filename field receives a filename of a background control file for controlling a lighting of light sources included in the background lighting units 38 and 39 such that the background control file is indicated for controlling the lighting of the light sources. The background control file may be a CSV file. An attribute of the lighting of the light sources is input to the attribute field. The attribute may be any one of "START" for starting the lighting of the light sources according to the background control file indicated by the filename field or "STOP" for stopping the lighting of the light sources.

The line light fields may include a filename field and an attribute field. The filename field receives a filename of a line control file for controlling a lighting of light sources (35*s* of FIG. 10) included in the line lighting units 35 such that the line control file is indicated for controlling the lighting of the light sources 35*s*. The line control file may be a CSV file. An attribute of the lighting of the light sources 35*s* is input to the attribute field. The attribute may be any one of "START" for starting the lighting of the light sources 35*s* according to the line control file indicated by the filename field and "STOP" for stopping the lighting of the light sources 35*s*.

The data fields may include a filename field and an attribute field. The filename field receives a filename of an image control file for controlling images displayed in the secondary display 70 such that the image control file is indicated for controlling the image. The image control file may be a CSV file. An attribute of the images is input to the attribute field. The attribute may be any one of "ONCE" for displaying images according to the image control file once, "REPEAT" for repeatedly displaying images according to the image control file, "HOLD" for holding the images displayed according to the image control file, "CANCEL" for cancelling the image displayed according to the image control file, and a combination thereof.

The data sheets generated and stored by the development tool are provided to the gaming machine 1. In this case, the data sheets may be transferred to the gaming machine 1 through a wire or wireless network, and the transferred data sheets may be stored to a memory of the gaming machine 1, for example a RAM or a ROM (93 or 92 of FIG. 12). Alternatively, a data storage device storing the data sheets may be provided to the gaming machine 1. The data storage device may be a storage device of the gaming machine 1, for example a memory card (84*s* of FIG. 12). The gaming machine 1 may copy the data sheets stored to the data storage device to its memory, for example the RAM 93 or ROM 92. Next, a main CPU (91 of FIG. 12) of the gaming machine 1 interprets the commands of the data sheets to be applicable to a gaming program of the gaming machine 1. It is predefined that each column of the data sheet is matched to a driver for controlling the object of the gaming machine 1. That is, the driver to which a command of each column is allocated is predefined. Further, information of each column or each cell may be input to the data sheet. The information of each column or each cell may be an index for extracting a command of each field. Accordingly, the gaming machine 1 can interpret the command of each field to transmit a driver for the corresponding object according to the predefined allocation.

As such, according to an embodiment of the present invention, a user can easily input to the data sheets commands such as commands for controlling operations of the reel drivers 32*t* for the reels 31*a* to 31*e* and commands for controlling operations of rendering drivers for the rendering devices 34, 17, or 70, thereby generating the commands for synchronizing movements of the reels 31*a* to 31*a* with rendering effects rendered by the rendering effect devices. The gaming machine 1 can provide the gaming operation by interpreting the commands of the data sheets to control the reel drivers 32*t* and/or the rendering drivers.

Next, examples of commands input to data sheets are described in detail with reference to FIG. 38A to FIG. 38D, FIG. 39, FIG. 40A to FIG. 40D, and FIG. 41A to FIG. 41D. While data sheets for some rendering effects among various rendering effects are exemplified in FIG. 38A to FIG. 41D, each of the data sheets for the various rendering effects may be generated in the similar ways.

Example of Data Sheet for General Rendering Mode

FIG. 38A to FIG. 38D are a schematic diagram of an example data sheet for a general rendering mode provided by a development tool according to an embodiment of the present invention, and FIG. 39 is a schematic diagram of an example reel control file according to an embodiment of the present invention.

Referring to FIG. 38A to FIG. 38D, data for a general rendering mode corresponding to a rendering effect shown in FIG. 7 are input to a data sheet of a development tool.

Scene Start

As shown in FIG. 38A, a scene start tag (#SCENE_ST) is first input to at least one row for a start of the first scene (Scene No=0). It is assumed in FIG. 38A that the scene start tag (#SCENE_ST) is input to four rows. Accordingly, commands of the rows to which the scene start tag (#SCENE_ST) is input are simultaneously executed when the first scene starts. The first scene may correspond to a scene that is first rendered when a player executes a normal game by pressing a START button (54 of FIG. 8). When inputting the scene start tag (#SCENE_ST), a user may input "START" to a trigger (Trigger 3) of the rows to which the scene start tag (#SCENE_ST) is input.

Since a gaming machine 1 spins a plurality of reels 31*a* to 31*e* in the first scene, a filename (ReelAllSpeed70.csv) of a reel control file for controlling spinning of the plurality of reels 31*a* to 31*e* is input to a reel filename field of the data sheet. Accordingly, the gaming machine 1 can spin the plurality of reels 31*a* to 31*e* according to information included in the reel control file, in the first scene. Further, the user may input positions where the plurality of reels 31*a* to 31*e* are to be stopped to reel position fields r1, r2, r3, r4 and r5 of the data sheet. The positions may be used for the test of the control data input to the data sheet.

A data type of a value input to the filename field may be defined as a data type of a programming language (for example, the C programming language) for generating the game program, i.e., compiling the data sheet. Accordingly, the gaming machine 1 can load the reel control file for controlling the reels 31*a* to 31*e*.

Referring to FIG. 39, the reel control file includes control information for each of the reels 31*a* to 31*e*, i.e., commands for controlling operations of the reel drivers 34*t* for the reels 31*a* to 31*e*. An example of the reel control file includes a reel number (Reel No), a reel rotation, a rotating pattern, a rotating direction, a highest speed, a lowest speed, the number of acceleration steps, the number of deceleration steps, a stop interval, and a lowest rotating time.

The reel number indicates a number (#Reel1, #Reel2, #Reel3, #Reel4, or #Reel5) of each of the reels 31*a* to 31*e*. A value for defining moving of each of the reels 31*a* to 31*e* is input to the reel rotation of the reel control file, and the value of the reel rotation may be defined as a long signed integer type (long) of the C programming language. For example, the value "0" of the reel rotation may indicate stopping a rotation of a corresponding reel at a predetermined time, and the value "1" of the reel rotation may indicate maintaining the rotation of the corresponding reel. A value for defining a rotating pattern of each of the reels 31*a* to 31*e* is input to the rotating pattern of the reel control file, and the rotating pattern may be defined as an unsigned character type (unsigned char) of the C programming language. In the example of the FIG. 39, "STEPPER_PAT_NORMAL" indicates a normal operation of a corresponding reel. A value for defining a rotating direction of each of the reels 31*a* to 31*e* is input to the rotating direction of the reel control file, and the value of the rotating direction may be defined as the unsigned character type (unsigned char) of the C programming language. For example, the value "1" of the rotating direction may indicate a forward rotation of a corresponding reel, and the value "0" of the rotating direction may indicate a reverse rotation of the corresponding reel. Values for defining the highest rotating speed and the lowest rotating speed of each of the reels 31*a* to 31*e* is input to the highest speed and the lowest speed of the reel control file, respectively. The values of the highest speed and the lowest speed may be defined as the unsigned character type (unsigned char) of the C programming language, and their measurement units may be a microsecond. In this case, the highest speed may be generally used as the rotating speed of the corresponding reel, and the lowest speed may be used as the rotating speed of the corresponding reel at a special mode, for example, a rendering mode for a low speed spin of the corresponding reel. Values for defining the number of acceleration steps and the number of deceleration steps of each of the reels 31*a* to 31*e* is input to the number of acceleration steps and the number of deceleration steps of the reel control file, respectively. The values of the number of acceleration steps and the number of deceleration steps may be defined as the long unsigned integer type (unsigned long) of the C programming language. For example, the value "0" may indicate that the rotating speed of the corresponding reel is automatically accelerated or decelerated, and the other value may indicate the number of steps. Generally, the value "0" may be used as the number of acceleration steps and the number of deceleration steps.

A time interval, i.e., a delay time between a stop of the first reel 31*a* and a stop of the other reel is input to the stop interval of the reel control file. The value of the stop interval may be defined as the long signed integer type (long) of the C programming language, and its measurement unit may be a microsecond. Accordingly, 0 is input to the stop interval for the reel number (#Reel1) of the first reel 31*a*. In the example of FIG. 39, 400000 μs, 800000 μs, 1200000 μs, and 1600000 μs are input to the stop intervals for the reel numbers (#Reel2, #Reel3, #Reel4, and #Reel5) of the other reels 31*b* to 31*e*, respectively. Accordingly, the second reel 31*b* is stopped after 400000 μs is lapsed from a time when the first reel 31*a* is stopped. The lowest value of rotating times of the plurality of reels 31*a* to 31*e* is input to the lowest rotating time of the reel control file. Accordingly, each of the reels 31*a* to 31*e* is stopped after a sum of the value of a corresponding stop interval and the value of the lowest rotating time is lapsed. The value of the lowest rotating time may be defined as the long unsigned integer type (unsigned long) of the C programming language, and its measurement unit may be a microsecond. In the example of FIG. 39, the rotating time of the first reel 31*a* is input to the lowest rotating time for each of the reels 31*a* to 31*e*, and is 500000 μs.

As such, data types of the values input to the reel control file may be defined as data types of the programming language (for example, the C programming language) for generating the game program, i.e., compiling the data sheet. Accordingly, the gaming machine 1 can interpret the values of the reel control file to control movements of the reels 31*a* to 31*e*.

Referring to FIG. 38A to FIG. 38D again, a filename (R1.csv) of a background control file for controlling lighting of light sources included in background lighting units 38 and 39 is input to a filename field of a background light field in the row to which the scene start tag is input. The background control file includes commands for operations of backlight drivers for background lighting units 38 and 39. Further, "START" is input to an attribute field of the background light fields such that the gaming machine 1 can start to control the lighting of the light sources included in background lighting units 38 and 39 according to the background control file. The background control file may include information for a lighting pattern of the light sources. The lighting pattern may be a lighting color and/or a lighting time.

Data types of values input to the filename field and the attribute field may be defined as the data types of the programming language for generating the game program, i.e., compiling the data sheet. Accordingly, the gaming machine 1 can load and interpret the background control file, and perform an operation indicated by the commands of the background control file according to the attribute. Further, data types of values input to the lighting pattern of the background control file may be also defined as the data types of the programming language for generating the game program, i.e., compiling the data sheet. Accordingly, the gaming machine 1 can interpret the values of the background control file to control lighting of the lighting sources. Further, background lighting units 38 and 39 can be controlled in synchronization with operations of the reels 31*a* to 31*e* according to the reel control file that is input to the rows indicated by the scene start tag. On the other hand, when the gaming machine 1 does not include the background lighting units 38 and 39, the background light fields may be omitted in the data sheet or data may be not input to the background light fields.

Commands for controlling a backlight driver 34*t* of a backlight unit 34 for each of the reels 31*a* to 31*e* is input to each of the plurality of reel light fields of the data sheet. In detail, a type of symbol whose lighting pattern is to be controlled is input to a type field of each of the plurality of reel light fields of the data sheet. When controlling the lighting patterns of a plurality of symbols, a plurality of types are input to the plurality of rows to which the scene start tag (#SCENE_ST) is input. In the example of FIG. 38A to FIG. 38D, four types (OBI_B__00, OBI_B__01, OBI_B__02, and OBI_B__04) are input to the type fields of the four rows, respectively. For example, the type OBI_B__0 may indicate a "WILD" symbol, the type OBI_B__01 may indicate a "BONUS" symbol, the type OBI_B__02 may indicate a "7" symbol, and OBI_B__04 may indicate the other symbols. The user inputs, to a filename field, a symbol control file for controlling a lighting pattern of light sources 34*s* included in a lighting area M5 corresponding to a symbol indicated by the type field. In the example of FIG. 38A to FIG. 38D, the filenames (W.csv, B1.scv, B2.csv, and N.csv) are input to the filename fields for the types (OBI_B__00, OBI_B__01, OBI_B__02, and OBI_B__04), respectively. The symbol control file may include information for the lighting pattern of the light sources 34*s*. The lighting pattern may be a lighting color and/or a lighting time. Further, a value of "START" or "STOP" is input to an attribute field for each of the type fields. In the example of FIG. 38A to FIG. 38D, lighting patterns of symbols corresponding to the types (OBI_B__00 and OBI_B__01) start to be controlled according to the symbol control files (W.csv and B1.csv) in the first and third reels 31*a* and 31*c*, the lighting pattern of the symbol corresponding to the type (OBI_B__00) start to be controlled according to the symbol control file (W.csv) in the second and fourth reels 31*b* and 31*d*, and lighting patterns of symbols corresponding to the types (OBI_B__00, OBI_B__01, and OBI_B__02) start to be controlled according to the symbol control files (W.csv, B1.csv, and B2.csv) in the fifth reels 31*e*.

Data types of values input to the type field, the filename field, and the attribute field are defined as the data types of the programming language for generating the game program, i.e., compiling the data sheet. Accordingly, the gaming machine 1 can load and interpret the symbol control file, and perform an operation indicated by the symbol control file according to the attribute. Further, data types of values input to the lighting pattern of the symbol control file may be also defined as the data types of the programming language for generating the game program, i.e., compiling the data sheet. Accordingly, the gaming machine 1 can interpret the information of the symbol control file to control lighting of the lighting sources 34*s*. Further, backlight drivers 34*t* can control backlight units 34 for the reels 31*a* to 31*e* in synchronization with operations of the reels 31*a* to 31*e* according to the reel control file that is input to the rows indicated by the scene start tag.

Scene Trigger

A scene trigger tag (#SCENE_TR) is input to at least one row for an event to be triggered in the first scene. In the general rendering mode, five events corresponding to stops of the five reels 31*a* to 31*e* may be triggered. That is, the scene trigger tag (#SCENE_TR) is first input to at least one row for the event corresponding to the stop of the first reel 31*a*. It is assumed in FIG. 38A to FIG. 38D that the scene trigger tag (#SCENE_TR) is input to four rows. Further, the stop of the first reel 31*a* (r1_STOP) is input, as a triggering condition, to a trigger (Trigger 1) of the four rows to which the scene trigger tag (#SCENE_TR) is input. Accordingly, commands of the rows to which the scene trigger tag (#SCENE_TR) and "r1_STOP" are input are simultaneously executed when the first reel 31*a* stops. When inputting "r1_STOP", the user may input "START" to a trigger (Trigger 3) of the same rows. Further, a type of symbol whose lighting pattern is to be controlled is input to a type field of a reel light field for the first reel 31*a* of the rows to which the scene trigger tag (#SCENE_TR) and "r1_STOP" are input. Further, the user inputs, to a filename field, a symbol control file for controlling a lighting pattern of light sources 34*s* included in a lighting area M5 corresponding to a symbol indicated by the type field. Further, a value of "START" or "STOP" is input to an attribute field for each of the type fields. In the example of FIG. 38A to FIG. 38D, lighting patterns of symbols corresponding to the types (OBI_B__00, OBI_B__01, and OBI_B__03) start to be controlled by an operation of the backlight driver 34*t* according to the symbol control files (W.csv, B1.csv, and N.csv) of the first reel 31*a*.

Next, the scene trigger tag (#SCENE_TR) is input to at least one row for the event corresponding to the stop of the second reel 31*b*. Further, the stop of the second reel 31*b* (r2_STOP) and "START" are input to triggers (Trigger 1 and Trigger 3) of the four rows to which the scene trigger tag (#SCENE_TR) for the stop of the second reel 31*b* is input. Furthermore, a type of symbol, a symbol control file, and a value of "START" or "STOP" are input to a reel light field for the second reel 31*b* of the rows to which the scene trigger tag (#SCENE_TR) and "r2_STOP" are input.

Next, the scene trigger tag (#SCENE_TR) is input to at least one row for the event corresponding to the stop of the third reel 31*c*. Further, the stop of the third reel 31*c* (r3_STOP) and "START" are input to triggers (Trigger 1 and Trigger 3) of the four rows to which the scene trigger tag (#SCENE_TR) for the stop of the third reel 31*c* is input. Furthermore, a type of symbol, a symbol control file, and a value of "START" or "STOP" are input to a reel light field for the third reel 31*c* of the rows to which the scene trigger tag (#SCENE_TR) and "r3_STOP" are input.

Next, the scene trigger tag (#SCENE_TR) is input to at least one row for the event corresponding to the stop of the fourth reel 31*d*. Further, the stop of the fourth reel 31*d* (r4_STOP) and "START" are input to triggers (Trigger 1 and Trigger 3) of the four rows to which the scene trigger tag (#SCENE_TR) for the stop of the fourth reel 31*d* is input. Furthermore, a type of symbol, a symbol control file, and a value of "START" or "STOP" are input to a reel light field for the fourth reel 31*d* of the rows to which the scene trigger tag (#SCENE_TR) and "r4_STOP" are input.

Next, the scene trigger tag (#SCENE_TR) is input to at least one row for the event corresponding to the stop of the fifth reel 31*e*. Further, the stop of the fifth reel 31*e* (r5_STOP) and "START" are input to triggers (Trigger 1 and Trigger 3) of the four rows to which the scene trigger tag (#SCENE_TR) for the stop of the fifth reel 31*e* is input. Furthermore, a type of symbol, a symbol control file, and a value of "START" or "STOP" are input to a reel light field for the fifth reel 31*e* of the rows to which the scene trigger tag (#SCENE_TR) and "r5_STOP" are input.

Accordingly, the backlight drivers 34*t* can sequentially control the backlight units 34 for the reels 31*a* to 31*e* to in synchronization with the sequential stop of the reels 31*a* to 31*e*.

The first scene ends if all of the plurality of reels 31*a* to 31*e* are stopped. Accordingly, a scene end tag (#SCENE_END) is input to at least one row for an event corresponding to the end of the first scene. When inputting the scene end tag, the user may input "END" to a trigger (Trigger 3) of the same rows. A type of symbol whose lighting pattern is to be controlled is input to a type field of a reel light field for the first reel 31*a* of the rows to which the scene end tag is input. Further, the user inputs, to a filename field, a symbol control file for controlling a lighting pattern of light sources 34*s* included in a lighting area M5 corresponding to a symbol indicated by the type field. Furthermore, a value of "START" or "STOP" is input to an attribute field for each of the type fields. In the example of FIG. 38A to FIG. 38D, lighting patterns of symbols corresponding to the types (OBI_B__00, OBI_B__01, and OBI_B__03) start to be controlled according to the symbol control files (W.csv, B1.csv, and N.csv) in the first and third reels 31*a* and 31*c*, the lighting patterns of the symbols corresponding to the types (OBI_B__00 and OBI_B__03) start to be controlled according to the symbol control files (W.csv and N.csv) in the second and fourth reels 31*b* and 31*d*, and lighting patterns of symbols corresponding to the types (OBI_B__00, OBI_B__01, OBI_B__02, and OBI_B__03) start to be controlled according to the symbol control files (W.csv, B1.csv, B2.csv, and N.csv) in the fifth reels 31*e*. Accordingly, commands of the rows to which the scene end tag (#SCENE_END) are input can be executed in synchronization with each other when the first scene ends. Alternately, if the lighting patterns of the symbols end when the first scene ends, the scene end tag (#SCENE_END) and commands for the scene end may not be input to the data sheet.

Example of Data Sheet for Rendering Mode of Low Speed Spin

FIG. 40A to FIG. 40D are a schematic diagram of an example data sheet for a rendering mode for a low speed spin provided by a development tool according to an embodiment of the present invention.

Referring to FIG. 40A to FIG. 40D, data for a rendering mode of a low speed spin corresponding to a rendering effect shown in FIG. 33 are input to a data sheet of a development tool.

In the rendering mode of the low speed spin, after the first to fourth reels 31*a* to 31*d* are stopped, the fifth reel 31*e* starts to spin at a low speed. Accordingly, a filename (5ReelReech70.csv) of a reel control file for stopping rotations of the first to fourth reels 31*a* to 31*d* and maintaining a rotation of the fifth reel 31*e* is input to a reel filename field of the data sheet. Accordingly, the gaming machine 1 can sequentially stop the first to fourth reels 31*a* to 31*d* and maintain spinning of the fifth reel 31*e* according to information included in the reel control file, in the first scene.

Events corresponding to stops of firth to fourth reels 31*a* to 31*d* are the same as the events of the general rendering mode. After the event corresponding to the stop of fourth reel 31*d* is performed, the fifth reel starts to spin at the low speed. Accordingly, a scene start tag (#SCENE_ST) for the second scene (Scene No=1) is input to at least one row that is next to at least one row to which the scene trigger tag (#SCENE_TR) for the stop of the fourth reel 31*d* is input. A filename (1234Stop5Slow.csv) of a reel control file for maintaining the stops of the first to fourth reels 31*a* to 31*d* and spinning the fifth reel 31*e* at the low speed is input to a reel filename field of the data sheet. Accordingly, the gaming machine 1 can spin the fifth reels 31*e* at the low speed according to information included in the reel control file, in the second scene.

Further, a filename (slw.ogg) of a sound control file for controlling a sound from a speaker 17 is input to a sound filename field of the row to which the scene start tag (#SCENE_ST) for the second scene is input. A volume (SE) of the sound, a time (1) of the sound, and the attribute (ONCE) of the sound are also input to a volume field, a time field, and an attribute field. Accordingly, the gaming machine 1 can output the sound according to information included in the sound field when the second scene starts. In addition, a filename (R5.csv) of a background control file for controlling lighting of light sources included in background lighting units 38 and 39 is input to a filename field of a background light field of the row to which the scene start tag (#SCENE_ST) for the second scene is input. "START" is input to an attribute field of the background light field. Accordingly, the gaming machine 1 can light the background lighting units 38 and 39 according to the background control file (R5.csv) when the second scene starts.

A scene trigger tag (#SCENE_TR) is input to at least one row for an event to be triggered in the second scene. In the rendering mode of the low speed spin, an event corresponding to the stop of the fifth reel 31*e* may be triggered. That is, the scene trigger tag (#SCENE_TR) is input to at least one row for the event for the stop of the fifth reel 31*e*. Further, commands for the event corresponding to the stop of the fifth reel 31*e* are input to the at least one row to which the scene trigger tag (#SCENE_TR) is input as shown in FIG. 38C. In addition, "STOP" is input to the attribute field of the sound field such that the output of the sound according to the sound control file (slw.ogg) is stopped. Further, "STOP" is input to the attribute field of the background light field such that the lighting of the background lighting units 38 and 39 according to the background control file (R5.csv) is stopped.

The second scene ends if the fifth reel 31*e* stops. Accordingly, for the end of the second scene, a scene end tag (#SCENE_END) is input to at least one row. When inputting the scene end tag, the user may input "END" to a trigger (Trigger 3) of the same rows. Alternately, the scene end tag (#SCENE_END) may not be input to the data sheet.

FIG. 41A to FIG. 41D are a schematic diagram of another example data sheet for a rendering mode for a low speed spin provided by a development tool according to an embodiment of the present invention.

Referring to FIG. 41A to FIG. 41D, data for a rendering mode of a low speed spin corresponding to a rendering effect shown in FIG. 34 are input to a data sheet of a development tool.

In the rendering mode of the low speed spin shown in FIG. 34, after the first and second reels 31*a* and 31*b* are stopped, the third reel 31*c* starts to spin at a low speed. Accordingly, a filename (3ReelReech70.csv) of a reel control file for stopping rotations of the first and second reels 31*a* and 31*b* and maintaining rotations of the third to fifth reel 31*c* to 31*e* is input to a reel filename field of the data sheet. Accordingly, the gaming machine 1 can sequentially stop the first and second reels 31*a* and 31*b* and maintain spinning of the third to fifth reel 31*c* to 31*e* according to information included in the reel control file, in the first scene.

Events corresponding to stops of firth and second reels 31*a* and 31*b* are the same as the events of the general rendering mode. After the first and second reels 31*a* and 31*b* are stopped, the third reel 31*c* starts to spin at the low speed. Accordingly, a scene start tag (#SCENE_ST) for the second scene (Scene No=1) is input to a row that is next to at least one row to which the scene trigger tag (#SCENE_TR) for the stop of the second reel 31*b* is input. A filename (12Stop3Slow.csv) of a reel control file is input to a reel filename field of the data sheet. The reel control file (12Stop3Slow.csv) may include information for maintaining the stops of the first and second reels 31*a* and 31*b*, spinning the third reel 31*c* at the low speed, and maintaining the spinning of the fourth and fifth reels 31*d* and 31*e*. Accordingly, the gaming machine 1 can spin the third reel 31*c* at the low speed according to information included in the reel control file (12Stop3Slow.csv), in the second scene.

Next, a scene trigger tag (#SCENE_TR) is input to at least one row for an event corresponding to the stop of the third reel 31*c*. Commands for the event corresponding to the stop of the third reel 31*c* are input to the at least one row to which the scene trigger tag (#SCENE_TR) and "r3_STOP" are input.

After the third reel 31*c* is stopped, the fourth reel 31*d* starts to spin at the low speed. Accordingly, a scene start tag (#SCENE_ST) for the third scene (Scene No=2) is input to a row that is next to the at least one row to which the scene trigger tag (#SCENE_TR) for the stop of the third reel 31*c* is input. A filename (123Stop4Slow.csv) of a reel control file is input to a reel filename field of the data sheet. The reel control file (123Stop4Slow.csv) may include information for maintaining the stops of the first to third reels 31*a* to 31*c*, spinning the fourth reel 31*d* at the low speed, and maintaining the spinning of the fifth reel 31*e*. Accordingly, the gaming machine 1 can spin the fourth reel 31*d* at the low speed according to information included in the reel control file (123Stop4Slow.csv), in the third scene.

Next, a scene trigger tag (#SCENE_TR) is input to at least one row for an event corresponding to the stop of the fourth reel 31*d*. Commands for the event corresponding to the stop of the fourth reel 31*d* are input to the at least one row to which the scene trigger tag (#SCENE_TR) and "r4_STOP" are input.

After the fourth reel 31*d* is stopped, the fifth reel 31*e* starts to spin at the low speed. Accordingly, a scene start tag (#SCENE_ST) for the fourth scene (Scene No=3) is input to a row that is next to the at least one row to which the scene trigger tag (#SCENE_TR) for the stop of the fourth reel 31*d* is input. A filename (1234Stop5Slow.csv) of a reel control file is input to a reel filename field of the data sheet. The reel control file (1234Stop5Slow.csv) may include information for maintaining the stops of the first to fourth reels 31*a* to 31*d* and spinning the fifth reel 31*e* at the low speed. Accordingly, the gaming machine 1 can spin the fifth reel 31*e* at the low speed according to information included in the reel control file (1234Stop5Slow.csv), in the third scene.

The fourth scene ends if the fifth reel 31*e* stops. Accordingly, for the end of the fourth scene, a scene end tag (#SCENE_END) is input to at least one row. When inputting the scene end tag, the user may input "END" to a trigger (Trigger 3) of the same rows. Alternately, the scene end tag (#SCENE_END) may not be input to the data sheet.

Example of Data Sheet for Another Notification Rendering Mode

A data sheet for another notification rendering mode may be generated in a similar way to the data sheet for the general rendering mode.

Referring to FIG. 38A to FIG. 38D again, a scene start tag (#SCENE_ST) is input to at least one row for a start of a scene for the notification rendering mode. The symbol control files for lighting all types of symbols are input to the reel light fields for the reels 31*a* to 31*e*, in the row to which the scene start tag is input. Accordingly, backlight drivers 34*t* can control backlight units 34 for the reels 31*a* to 31*e* to emit the light in synchronization with operations of the reels 31*a* to 31*e* according to the reel control file.

Next, a scene trigger tag (#SCENE_TR) is input to at least one row for an event to be triggered when each of the reels 31*a* to 31*e* is stopped. That is, the scene trigger tag (#SCENE_TR) is first input to at least one row for the event corresponding to the stop of the first reel 31*a*, and the symbol control files for turning off the lights on all types of symbols for the first reel 31*a* are input to the reel light fields for the first reel 31*a*, in the row to which the scene trigger tag for the stop of the first reel 31*a* is input. Next, the scene trigger tag is input to at least one row for the event corresponding to the stop of the second reel 31*b*, and the symbol control files for turning off the lights on all types of symbols for the second reel 31*b* are input to the reel light fields for the second reel 31*b*, in the row to which the scene trigger tag for the stop of the second reel 31*b* is input. Next, the scene trigger tag is input to at least one row for the event corresponding to the stop of the third reel 31*c*, and the symbol control files for turning off the lights on all types of symbols for the third reel 31*c* are input to the reel light fields for the third reel 31*c*, in the row to which the scene trigger tag for the stop of the third reel 31*c* is input. Next, the scene trigger tag is input to at least one row for the event corresponding to the stop of the fourth reel 31*d*, and the symbol control files for turning off the lights on all types of symbols for the fourth reel 31*d* are input to the reel light fields for the fourth reel 31*d*, in the row to which the scene trigger tag for the stop of the fourth reel 31*d* is input. Next, the scene trigger tag is input to at least one row for the event corresponding to the stop of the fifth reel 31*e*, and the symbol control files for turning off the lights on all types of symbols for the fifth reel 31*e* are input to the reel light fields for the fifth reel 31*e*, in the row to which the scene trigger tag for the stop of the fifth reel 31*e* is input. Accordingly, the backlight drivers 34*t* can control the backlight units 34 for the reels 31*a* to 31*e* to sequentially turn off the lights on the reels 31*a* to 31*e* in synchronization with the sequential stop of the reels 31*a* to 31*e*.

Since various notification rendering modes are provided according to the magnitude of the prize and/or the result of the symbol determining process in the gaming machine 1, a plurality of data sheets corresponding to the various notification rendering modes may be generated. For example, the data sheets shown in FIG. 40A to FIG. 40D and FIG. 41A to FIG. 41D may be used for the notification rendering modes. That is, the data sheets shown in FIG. 40A to FIG. 40D and FIG. 41A to FIG. 41D may be used to notify a big prize such as the combination of "7" symbols.

Generating Method of Data Sheet

Now, a generating method of a data sheet in a development tool according to embodiments of the present invention is described in detail with reference to FIG. 42 and FIG. 45.

Figure 42:
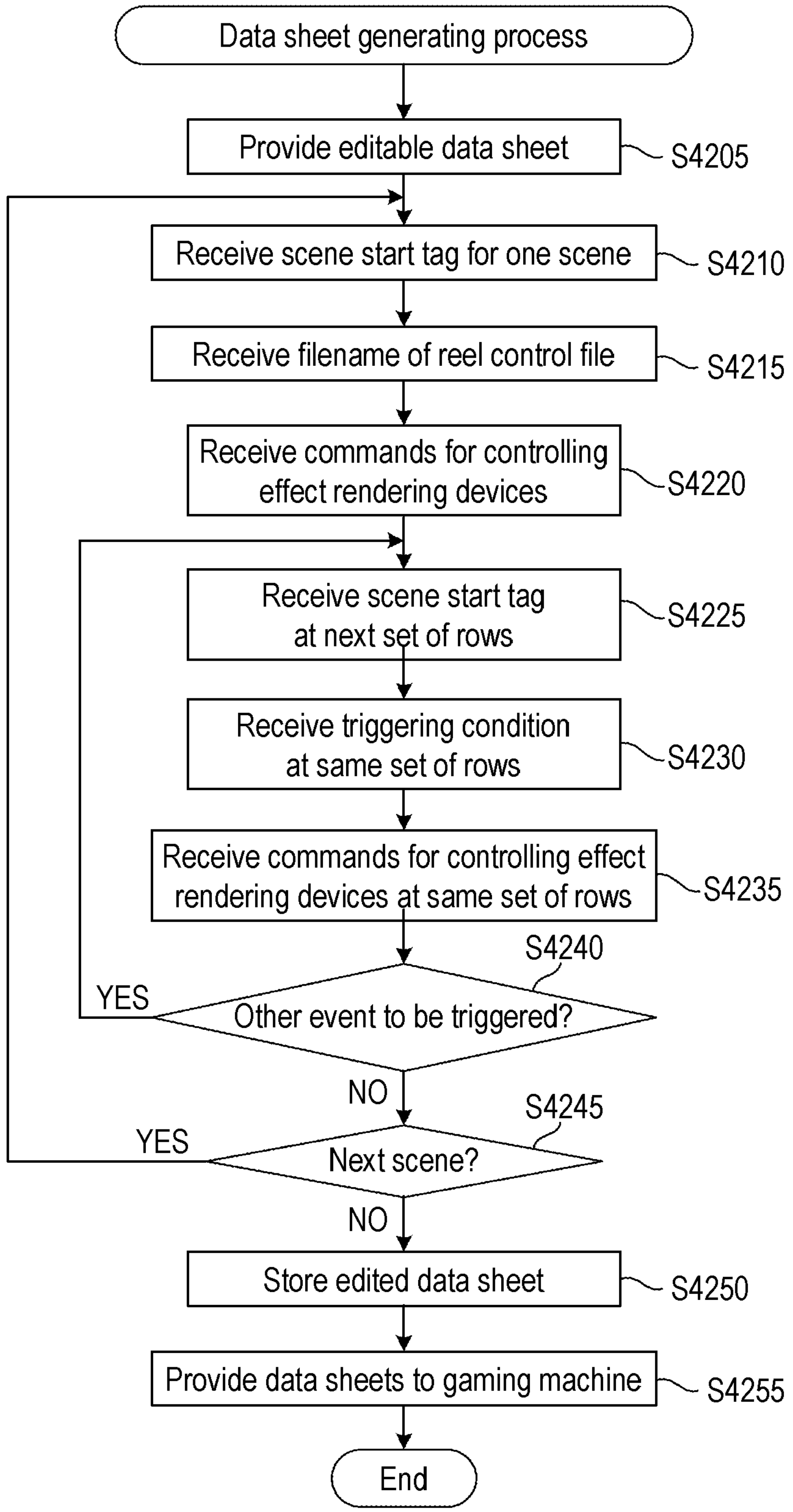
FIG. 42 is a flowchart of a generating method of a data sheet in a development tool according to an embodiment of the present invention.

FIG. 42 is a flowchart of a generating method of a data sheet in a development tool according to an embodiment of the present invention.

Referring to FIG. 42, a processor of a gaming machine development system, through a development tool, provides a user with an editable data sheet (S4205). The editable data sheet includes a plurality of row and a plurality of columns defining a plurality of cells, and the plurality of column names corresponding to the plurality of columns A value of each cell is defined as a data type used in a programming language for generating the game program, i.e., compiling the data sheet.

First, the processor of the gaming machine development system receives, through the development tool, in a set of rows including at least one row, a scene start tag for indicating an event that occurs at a start of the first scene (S4210). Further, the processor of the gaming machine development system may receive a scene number of the first scene in a corresponding column (e.g., a scene number field of FIG. 37A) among the plurality of columns of the set of rows assigned by the scene start tag. The processor of the gaming machine development system receives, through the development tool, a filename of a reel control file for controlling the movement of a plurality of reels (31*a* to 31*e* of FIG. 2) in a corresponding column (e.g., a reel filename field of FIG. 37B) among the plurality of columns of the set of rows assigned by the scene start tag (S4215). When the scene start tag is input to the plurality of rows, the filename of the reel control file may be input to only one row. Further, the processor of the gaming machine development system receives, through the development tool, data for controlling the lighting of at least one symbol of at least one of the plurality of reels 31*a* to 31*e* of the set of rows assigned by the scene start tag (S4220). In detail, the processor of the gaming machine development system receives, through the development tool, a type of a symbol, a filename of a symbol control file for controlling the lighting of the symbol, and an attribute for indicating a start or a stop of the control according to the symbol control file, in corresponding columns (e.g., reel light fields of FIG. 37B) of the set of rows assigned by the scene start tag.

Further, if the gaming machine 1 outputs a sound and/or displays an image when the plurality of reels are spinning, the processor of the gaming machine development system receives, through the development tool, data for controlling the sound and/or the image in corresponding columns (sound fields and/or image fields of FIG. 37C) of the set of rows assigned by the scene start tag (S4220). In detail, a filename of a sound control file for controlling the sound to be played and an attribute for playing the sound may be input to the corresponding columns A volume of the sound and a time in which the sound is output may be further input to the corresponding columns. Further, a filename of an image control file for controlling the image to be displayed and an attribute for displaying the image may be input to the corresponding columns.

Next, the processor of the gaming machine development system receives, through the development tool, a scene trigger tag for indicating an event that is triggered at the first scene, in a set of rows including a plurality of rows that are next to the set of rows receiving the scene start tag of the first scene (S4225). That is, the scene trigger tag is input to the set of rows that are lower than the set of rows to which the scene start tag of the first scene is input. In detail, a scene trigger tag for indicating the event that is first triggered in the first scene is input to the first set of rows among the plurality of rows for the scene trigger tag (S4225). The processor of the gaming machine development system receives, through the development tool, a triggering condition of the first event in a corresponding column (e.g., Trigger 1 of FIG. 37A) at the first set of rows (S4230), and receives commands for controlling the lighting of the symbol, the sound, and/or the image in the corresponding columns (e.g., reel light fields, sound fields, and/or image fields) of the first set of rows (S4235). If the other event to be triggered after the event triggered at the step S4225 exists in the first scene (S4240: Yes), the processor of the gaming machine development system receives, through the development tool, a scene trigger tag for indicating the event that is subsequently triggered in the first scene in a set of rows including rows next to the first set of rows (S4225). Accordingly, the processor of the gaming machine development system repeats the process of the steps S4225 to S4240.

If no event to be triggered exists in the first scene (S4240: No), the processor of the gaming machine development system receives, through the development tool, commands for a next scene (S4245: Yes). That is, the process of the steps S4210 to S4240 is repeated for the next scene. However, if no next scene does exists (S4245: No), the processor of the gaming machine development system stores the edited data sheet (S4250). A plurality of data sheets that are generated and stored by the gaming machine development system are converted to a game program such that the game program is provided to the gaming machine 1 (S4255).

As such, according to an embodiment of the present invention, the user can input commands to be simultaneously in different objects of the gaming machine, to the predefined columns of the rows having the same tag and the same triggering condition. Accordingly, the gamine machine can simultaneously perform the commands of the rows having the same tag and the same triggering condition by controlling the objects predefined to be associated with the columns of the data sheet. Further, the user can input commands to be sequentially performed, to the predefined columns of the rows having the different tags or the different triggering conditions. Accordingly, the gamine machine can sequentially perform the commands of the rows having the different tags or the different triggering conditions, by controlling the objects predefined to be associated with the columns of the data sheet.

Figure 43:
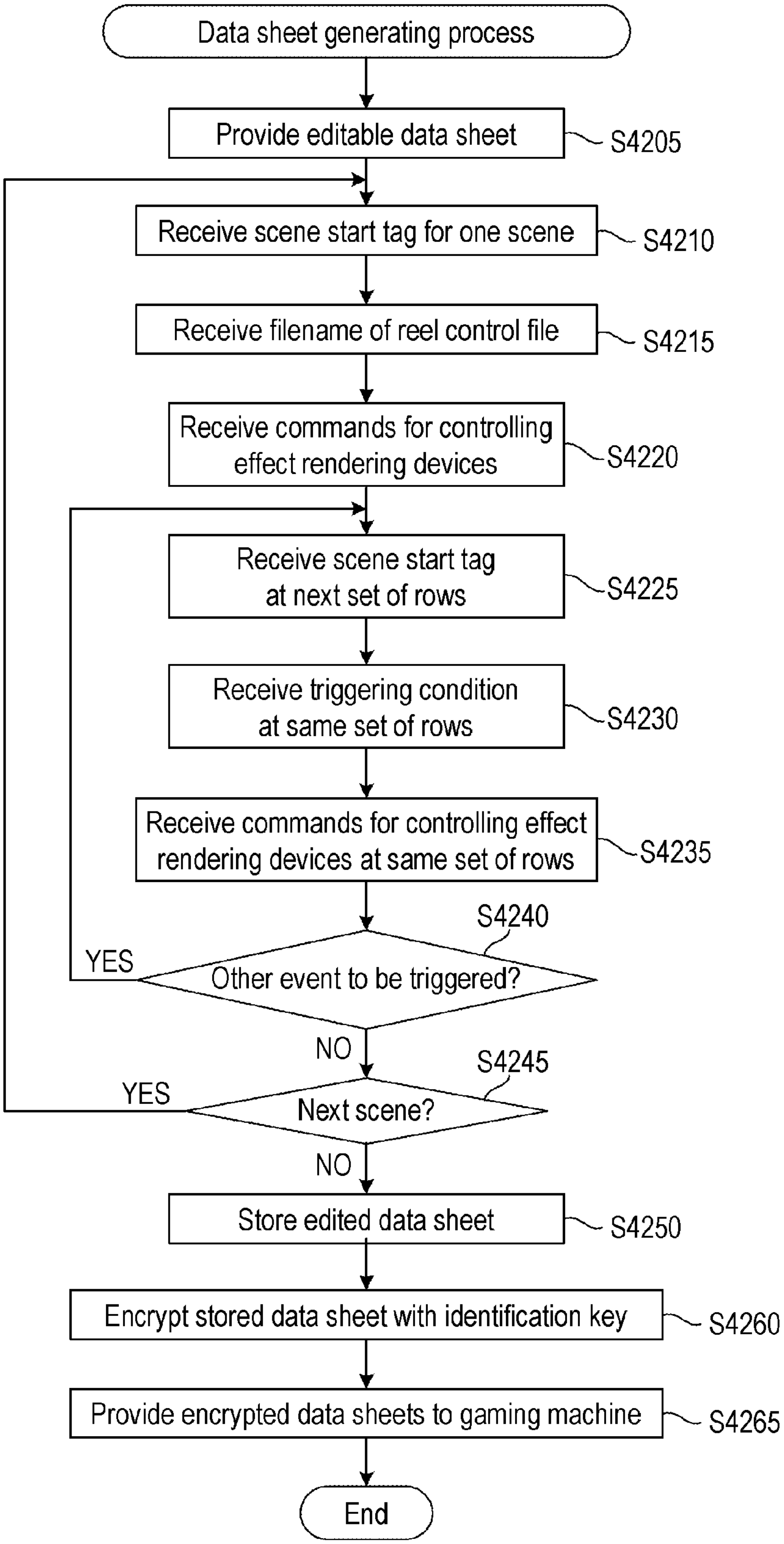
FIG. 43 is a flowchart of a generating method of a data sheet in a development tool according to another embodiment of the present invention.

FIG. 43 is a flowchart of a generating method of a data sheet in a development tool according to another embodiment of the present invention.

Referring to FIG. 43, after storing the edited data sheet (S4250), the processor of the gaming machine development system encrypts the stored data sheet with an identification key (S4260), and then provides the gaming machine with a plurality of encrypted data sheets (S4265). Accordingly, if a correct identification key is input to the gaming machine, a gaming program or an authentication program of the gaming machine 1 can decrypt and interpret the data sheets.

Figure 44:
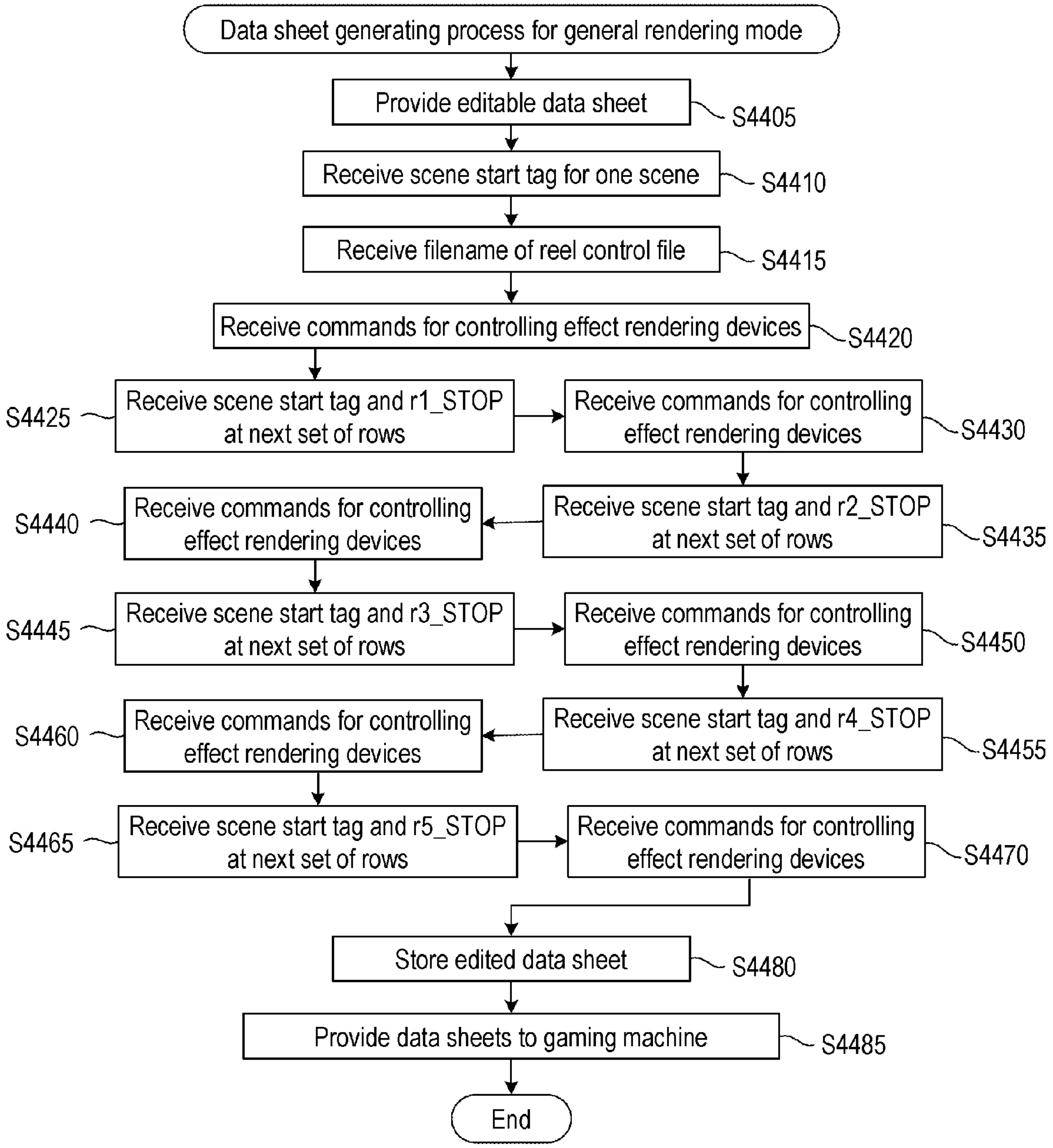
FIG. 44 is a flowchart of a generating method of an example data sheet for a general rendering mode in a development tool according to an embodiment of the present invention.

FIG. 44 is a flowchart of a generating method of an example data sheet for a general rendering mode in a development tool according to an embodiment of the present invention.

Referring to FIG. 44, a processor of the gaming machine development system, through a development tool, provides a user with an editable data sheet (S4405).

First, the processor of the gaming machine development system receives, in a first set of rows including a plurality of rows, a scene start tag for indicating an event that occurs at a start of the first scene (S4410). Further, the processor of the gaming machine development system may receive a scene number of the first scene in a corresponding column (e.g., a scene number field) among the plurality of columns at the first set of rows. The processor of the gaming machine development system receives a filename of a reel control file for controlling the movement of a plurality of reels 31*a* to 31*e* in a corresponding column (e.g., a reel filename field) among the plurality of columns of the first set of rows (S4415). Further, the processor of the gaming machine development system receives commands for controlling the lighting of at least one symbol of at least one of the plurality of reels 31*a* to 31*e* of the first set of rows (S4420). In detail, the processor of the gaming machine development system receives a type of a symbol, a filename of a symbol control file for controlling the lighting of the symbol, and an attribute for indicating a start or a stop of the control according to the symbol control file, in corresponding columns (e.g., reel light fields) at each row of the first set of rows. Further, the processor of the gaming machine development system receives commands for controlling the sound and/or the image in corresponding columns (sound fields and/or image fields) of the first set of rows (S4420). Accordingly, the gamine machine can simultaneously perform the reel control file and the commands of the first rows.

In the general rendering mode, the plurality of reels 31*a* to 31*e* are sequentially stopped, and an event is performed when each of the reels 31*a* to 31*e* is stopped. Accordingly, the processor of the gaming machine development system first receives a scene trigger tag for the stop of the first reel 31*a*, in a second set of rows including a plurality of rows that are next to the first set of rows, and receives a trigger value (e.g., r1_STOP) indicating the stop of the first reel 31*a* as a triggering condition in a corresponding column (e.g., Trigger 1) of the second set of rows (S4425). Further, the processor of the gaming machine development system receives commands for controlling the lighting of the symbol of the first reel 31*a*, the sound, and/or the image in the corresponding columns (e.g., reel light fields, sound fields, and/or image fields) of the second set of rows (S4430). Accordingly, the gamine machine can simultaneously perform the commands of the second set of rows when the first reel 31*a* is stopped. Next, the processor of the gaming machine development system receives the scene trigger tag and a trigger value (e.g., r2_STOP) indicating the stop of the second reel 31*b*, in a third set of rows including a plurality of rows that are next to the second set of rows (S4435). Further, the processor of the gaming machine development system receives commands for controlling the lighting of the symbol of the second reel 31*b*, the sound, and/or the image at the third set of rows (S4440). Accordingly, the gamine machine can simultaneously perform the commands of the third set of rows when the second reel 31*b* is stopped. Next, the processor of the gaming machine development system receives the scene trigger tag and a trigger value (e.g., r3_STOP) indicating the stop of the third reel 31*c*, in a fourth set of rows including a plurality of rows that are next to the third set of rows (S4445). Further, the processor of the gaming machine development system receives commands for controlling the lighting of the symbol of the third reel 31*c*, the sound, and/or the image at the fourth set of rows (S4450). Accordingly, the gamine machine can simultaneously perform the commands of the fourth set of rows when the third reel 31*c* is stopped. Next, the processor of the gaming machine development system receives the scene trigger tag and a trigger value (e.g., r4_STOP) indicating the stop of the fourth reel 31*d*, in a fifth set of rows including a plurality of rows that are next to the fourth set of rows (S4455). Further, the processor of the gaming machine development system receives commands for controlling the lighting of the symbol of the fourth reel 31*d*, the sound, and/or the image at the fifth set of rows (S4460). Accordingly, the gamine machine can simultaneously perform the commands of the fifth set of rows when the fourth reel 31*d* is stopped. Next, the processor of the gaming machine development system receives the scene trigger tag and a trigger value (e.g., r5_STOP) indicating the stop of the fifth reel 31*e*, in a sixth set of rows including a plurality of rows that are next to the fifth set of rows (S4465). Further, the processor of the gaming machine development system receives data for controlling the lighting of the symbol of the fifth reel 31*e*, the sound, and/or the image at the sixth set of rows (S4470). Accordingly, the gamine machine can simultaneously perform the commands of the sixth set of rows when the fifth reel 31*e* is stopped.

When a rendering effect is rendered in an end of the first scene, the processor of the gaming machine development system may receive a scene end tag for the end of the first scene in a seventh set of rows including a plurality of rows that are next to the sixth set of rows. Further, the processor of the gaming machine development system may receive commands for controlling the lighting of the symbols, the sound, and/or the image at the seventh set of rows. Further, the gaming machine can sequentially perform the commands of the first to seventh sets according to the order of the sets or the tags and the triggering conditions. Next, the processor of the gaming machine development system stores the data sheet (S4480). The stored data sheet is converted into a game program such that the game program is provided to the gaming machine 1 (S4485).

Figure 45:
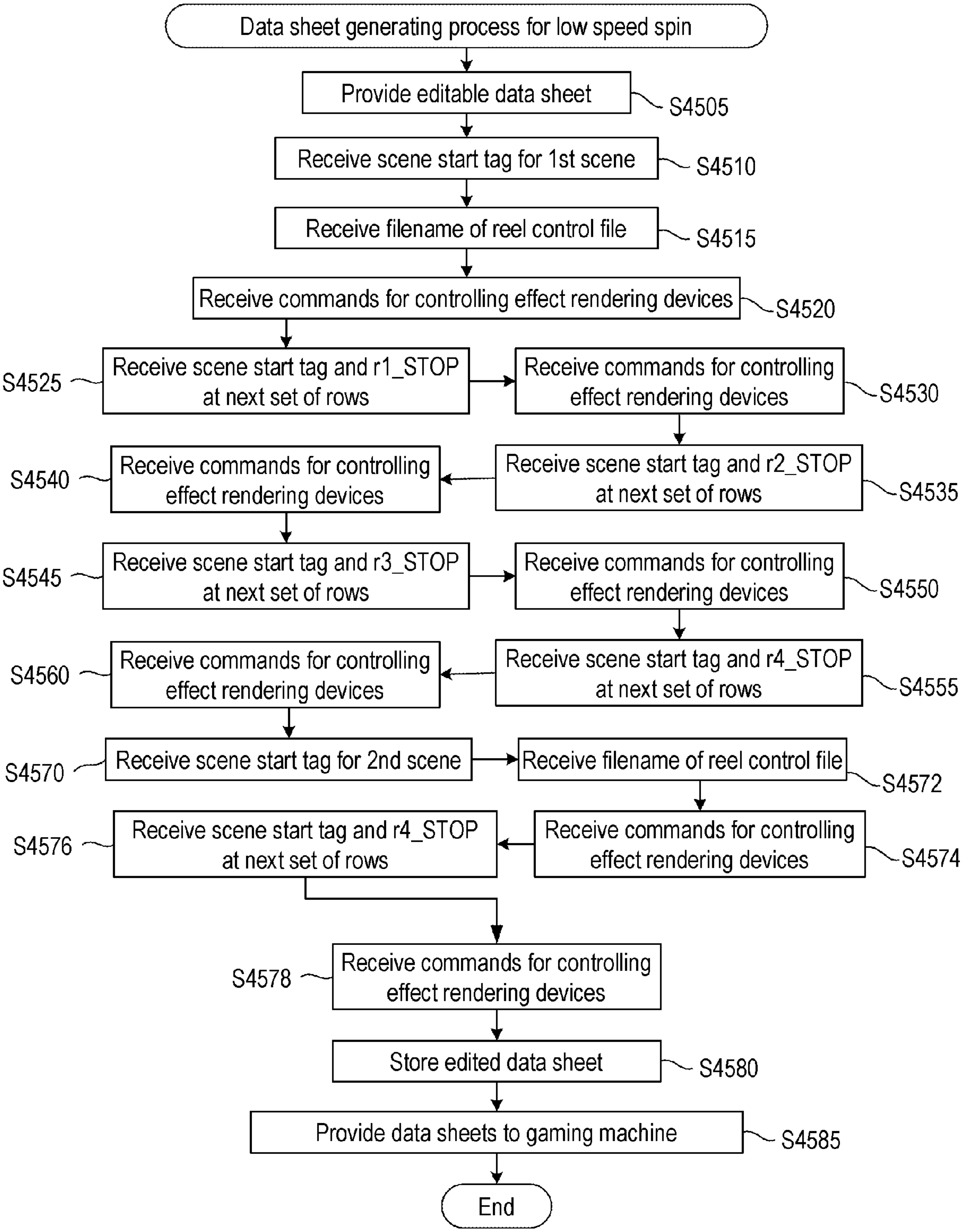
FIG. 45 is a flowchart of a generating method of an example data sheet for a rendering mode of a low speed spin in a development tool according to an embodiment of the present invention.

FIG. 45 is a flowchart of a generating method of an example data sheet for a rendering mode of a low speed spin in a development tool according to an embodiment of the present invention.

Referring to FIG. 45, a processor of a gaming machine development system, through a development tool, provides a user with an editable data sheet (S4505).

First, as described in the steps S4410 to S4420 of FIG. 44, the processor of the gaming machine development system receives, in a first set of rows including a plurality of rows, a scene start tag, a filename of a reel control file, commands for controlling the lighting of symbols of each of the plurality of reels 31*a* to 31*e*, and commands for controlling the sound and/or the image (S4510 to S4520).

In the rendering mode of the low speed spin, the first to fourth reels 31*a* to 31*d* are sequentially stopped at the first scene, and then a second scene where the fifth reel 31*e* is rotated at a low speed starts. Accordingly, as described in the steps S4425 to S4460 of FIG. 44, the processor of the gaming machine development system receives a scene trigger tag, a trigger value (e.g., r1_STOP) indicating the stop of the first reel 31*a* and commands in the second set of rows (S4525 and S4530), receives the scene trigger tag, a trigger value (e.g., r2_STOP) indicating the stop of the second reel 31*b* and commands in the third set of rows (S4535 and S4540), receives the scene trigger tag, a trigger value (e.g., r3_STOP) indicating the stop of the third reel 31*c* and commands in the fourth set of rows (S4545 and S4550), and receives the scene trigger tag, a trigger value (e.g., r4_STOP) indicating the stop of the fourth reel 31*d* and commands in the fifth set of rows (S4555 and S4560).

Next, the processor of the gaming machine development system receives a scene start tag for indicating an event that occurs at a start of the second scene, in a sixth set of rows including at least one row that is next to the fifth set of rows (S4570). Further, the development may receive a scene number of the second scene in a corresponding column (e.g., a scene number field) among the plurality of columns of the sixth set of rows. The processor of the gaming machine development system receives a filename of a reel control file for controlling the movement of the plurality of reels 31*a* to 31*e* in a corresponding column (e.g., a reel filename field) among the plurality of columns of the sixth set of rows (S4572). The reel control file may include information for maintaining of the stops of the first to fourth reels 31*a* to 31*d* and rotating the fifth reel 31*e* at the low speed. Further, the processor of the gaming machine development system receives commands for controlling the lighting of at least one symbol of at least one of the plurality of reels 31*a* to 31*e* (e.g., the fifth reel 31*e*) at the sixth set of rows (S4574). Accordingly, the gamine machine can simultaneously perform the reel control file and the commands of the sixth rows, thereby rendering an event of the fifth reel 31*e* that is spinning at the low speed.

Next, the processor of the gaming machine development system receives the scene trigger tag and a trigger value (e.g., r5_STOP) indicating the stop of the fifth reel 31*e*, in a seventh set of rows including a plurality of rows that are next to the sixth set of rows (S4576). Further, the processor of the gaming machine development system receives data for controlling the lighting of the symbol of the fifth reel 31*e*, the sound, and/or the image at the seventh set of rows (S4578).

When a rendering effect is rendered in an end of the second scene, the processor of the gaming machine development system may receive a scene end tag for the end of the second scene in an eighth set of rows including a plurality of rows that are next to the seventh set of rows. Further, the processor of the gaming machine development system may receive commands for controlling the lighting of the symbols, the sound, and/or the image at the eighth set of rows. Next, the processor of the gaming machine development system stores the data sheet (S4580). The stored data sheet is converted into a game program such that the game program is provided to the gaming machine 1 (S4585).

Next, a gaming method of a gaming machine using a data sheet is described with reference to FIG. 46 to FIG. 49.

Figure 46:
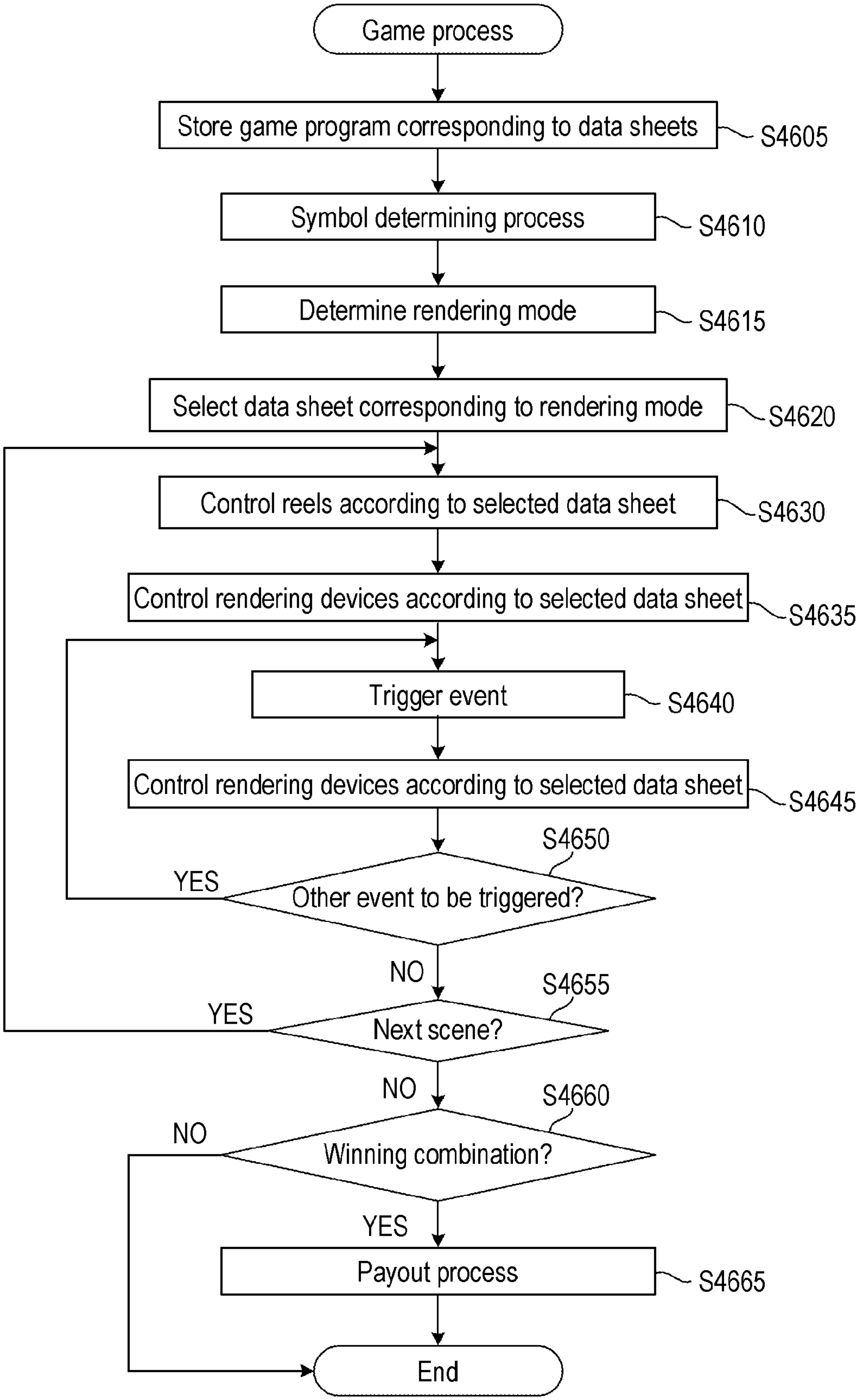
FIG. 46 is a flowchart of a game process using a data sheet according to an embodiment of the present invention.

FIG. 46 is a flowchart of a game process using a data sheet according to an embodiment of the present invention.

According to an embodiment of the present invention, a controller of the gaming machine performs the game process to execute a game.

Referring to FIG. 46, the gaming machine 1 receives a game program corresponding to a plurality of data sheets generated by a development tool and stores the game program corresponding to the plurality of data sheets to a memory (S4605). Next, if credits are bet and a game is started by the player, the controller executes a symbol determining process (S4610). In other words, the controller generates a random number for each of a plurality of reels 31*a* to 31*e*, and determines symbols to be appeared on each of the reels 31*a* to 31*e* based on the generated random number and a symbol code determination table for the game.

Further, the controller determines a rendering mode according to a result of the symbol determining process (S4615). In this case, the controller may determine the rendering mode based on a random number and a rendering mode lottery table. Furthermore, the controller selects a data sheet corresponding to the determined rendering mode among the plurality of data sheets included in the game program (S4620). In this case, the controller may select one or more data sheets modes when the determined rendering mode includes one or more modes. The controller controls reel drivers 32*t* to control movements of the reels 31*a* to 31*e* by information included in a reel control file of a reel field in a set of rows including at least one row corresponding to a start of a first scene (S4630). The set of rows corresponding to the start of the first scene may be identified by a scene start tag. Alternatively, the set of rows corresponding to the start of the first scene may be identified by no triggering condition of a trigger field. Further, the controller controls the backlight driver 34*t* to control lighting of at least one symbol, a sound to be output from a speaker (17 of FIG. 12) and an image to be displayed in a secondary display (70 of FIG. 2) by a command of reel light fields, a command of a sound field and a command of an image field in the set of rows corresponding to the start of the first scene (S4635). In this case, the reel field, the reel light fields, the sound field, and the image field are predefined to be associated with the reels 31*a* to 31*e*, backlight units (34 of FIG. 13), the speaker 17, and the secondary display 70, respectively.

When a certain time period elapses after spinning of the reels 31*a* to 31*e* is started, an event of the first scene is triggered in at least one of the reels 31*a* to 31*e* (S4640). For example, the event may be a stop of the spinning of at least one reel. If the event is triggered, the controller controls the backlight driver 34*t* to control lighting of at least one symbol, a sound to be output from the speaker 17 and an image to be displayed in the secondary display 70 by a command of reel light fields, a command of a sound field and a command of an image field in a set of rows including a plurality of rows corresponding to the triggered event (S4645). The set of rows corresponding to the triggered event may be identified by a scene trigger tag and a triggering condition. Alternatively, the set of rows corresponding to the triggered event may be identified by the triggering condition without the scene trigger tag. If the other event is triggered in the first scene exists (S4650: Yes), the controller controls rendering devices of the gaming machine by commands of a set of rows corresponding to the triggered event (S4645).

If no event to be triggered exists (S4650: No), the controller determines whether the other scene exists in the selected data sheet (S4655). The other scene may be identified by a scene number (i.e., a priority). That is, if commands having the next scene number exist, it may be determined that the other scene exists in the selected data sheet. If the other scene exists in the selected data sheet (S4655: Yes), the controller performs the process of the steps S4630 to S4645 for the other scene. If the other scene does not exist in the selected data sheet (S4655: No), the controller performs a payout process based on the rearranged symbols the symbols rearranged on a symbol matrix of the reels 31*a* to 31*e* (S4660 and S4665). That is, on the basis of the combination of symbols stopped on paylines, the controller determines whether the combination of symbols is a winning combination or not (S4660). If the combination is the winning combination (S4660: Yes), a payout process is executed (S4665). In other words, if the combination is the winning combination, the controller provides credits or provides a bonus game according to a type of the winning combination.

As such, according to an embodiment of the present invention, the gamine machine can simultaneously perform the commands of the set of rows by controlling the objects predefined to be associated with the columns of the data sheet. Further, the gamine machine can sequentially perform the commands of the set of rows having the different triggering conditions, by controlling the objects predefined to be associated with the columns of the data sheet.

Figure 47:
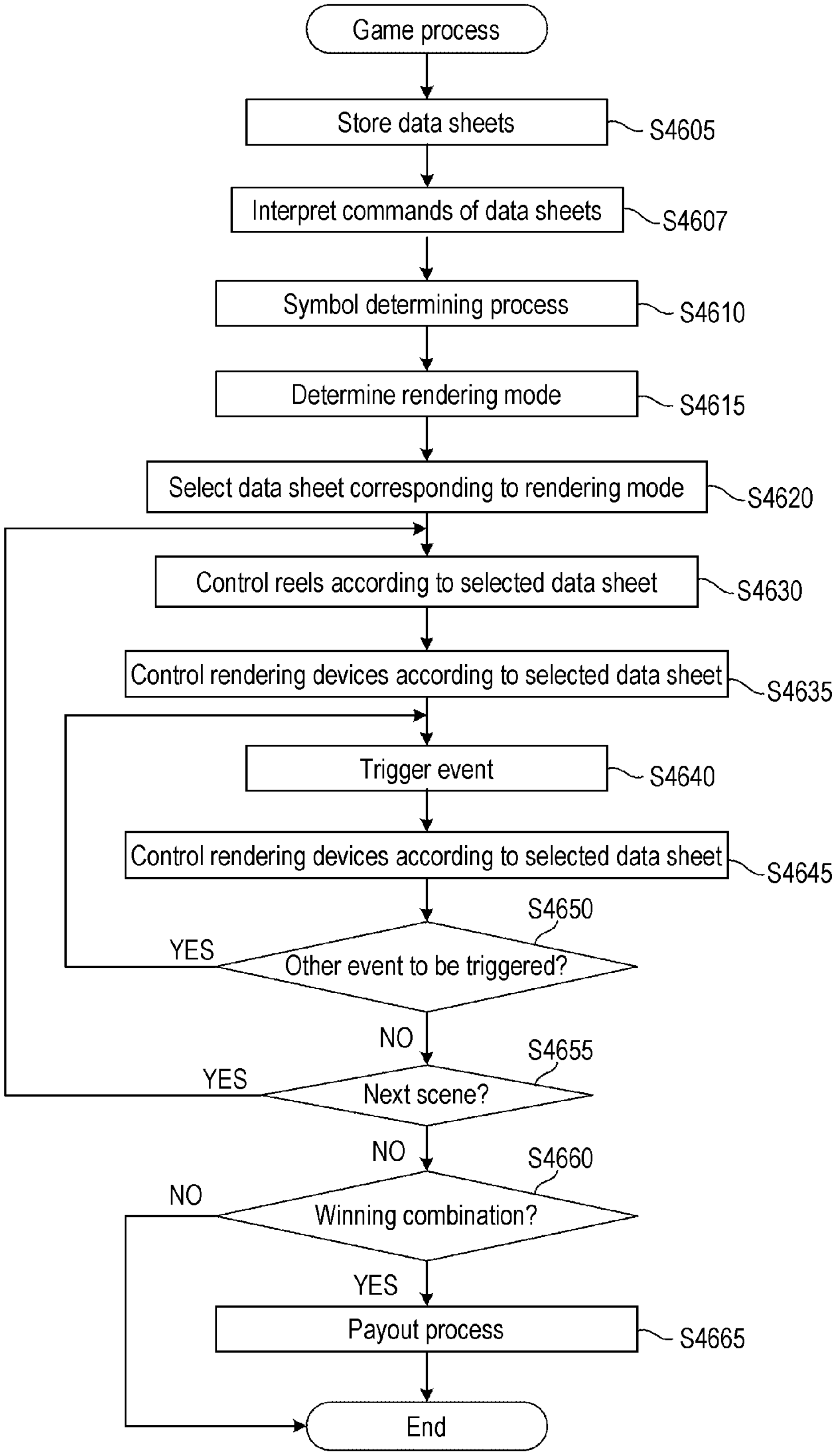
FIG. 47 is a flowchart of a game process using a data sheet according to another embodiment of the present invention.

FIG. 47 is a flowchart of a game process using a data sheet according to another embodiment of the present invention.

Referring to FIG. 47, after receiving a plurality of data sheets generated by a development tool and storing the plurality of data sheets to a memory (S4605), the controller of the gaming machine 1 continuously interprets data such as commands of the data sheets by a background process (S4607). That is, the controller interprets the commands of the data sheets, and operates the game process using the game program and the interpreted commands. Accordingly, the controller can perform an operation for a triggered event without delay when an event is triggered.

Figure 48:
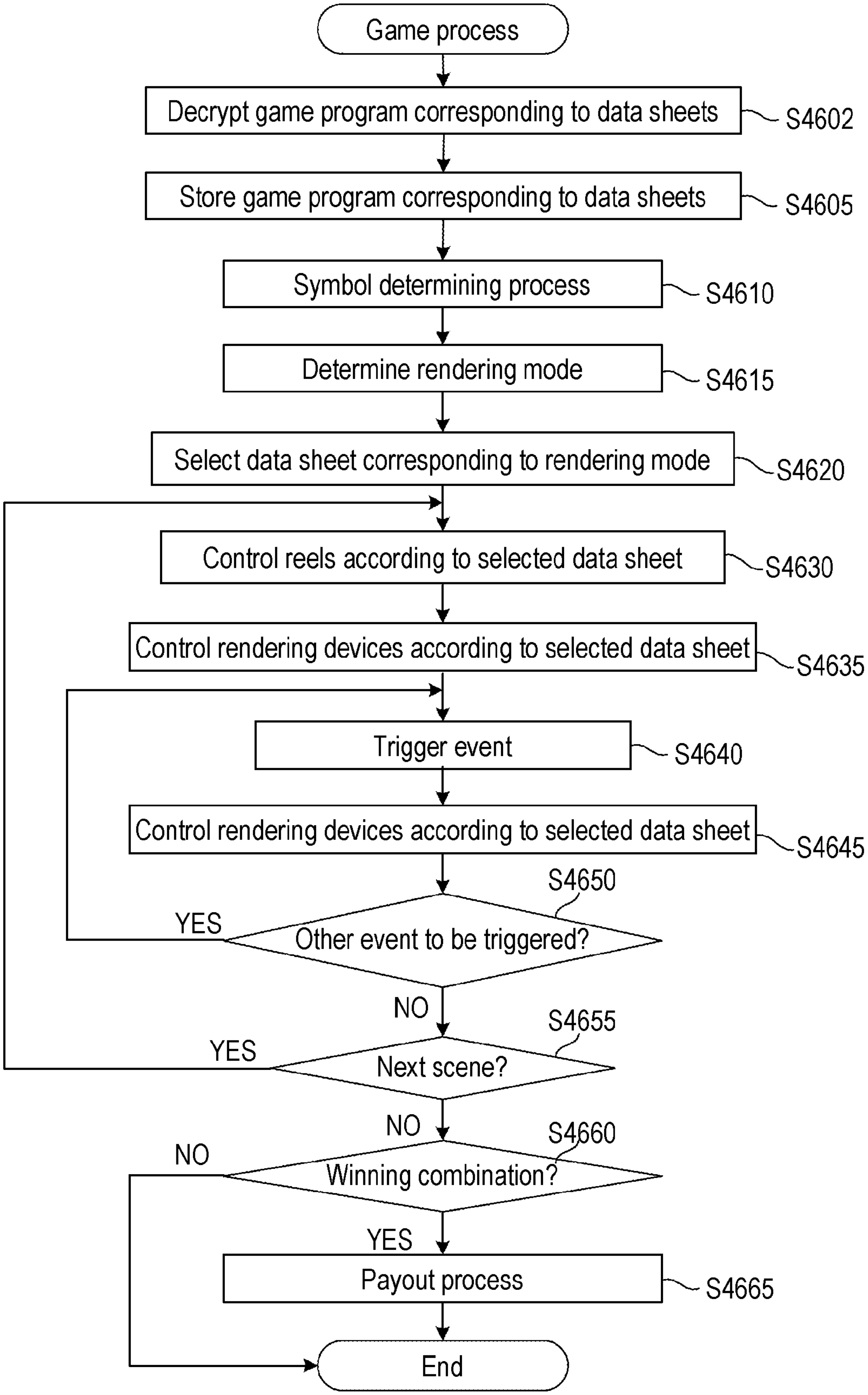
FIG. 48 is a flowchart of a game process using a data sheet according to yet another embodiment of the present invention.

FIG. 48 is a flowchart of a game process using a data sheet according to yet another embodiment of the present invention.

Referring to FIG. 48, before storing the game program corresponding to the plurality of data sheets to a memory (S4605), the controller of the gaming machine 1 decrypts the game program (S4602). That is, the controller determines whether an identification key that is input by a user is a correct identification key corresponding to the identification key that is used to encrypt the data sheets, and decrypts the data sheets when the identification key is the correct identification key. Accordingly, even though the data sheets are illegally distributed, the data sheets can be used in only the gaming machine having the correct identification key.

Figure 49:
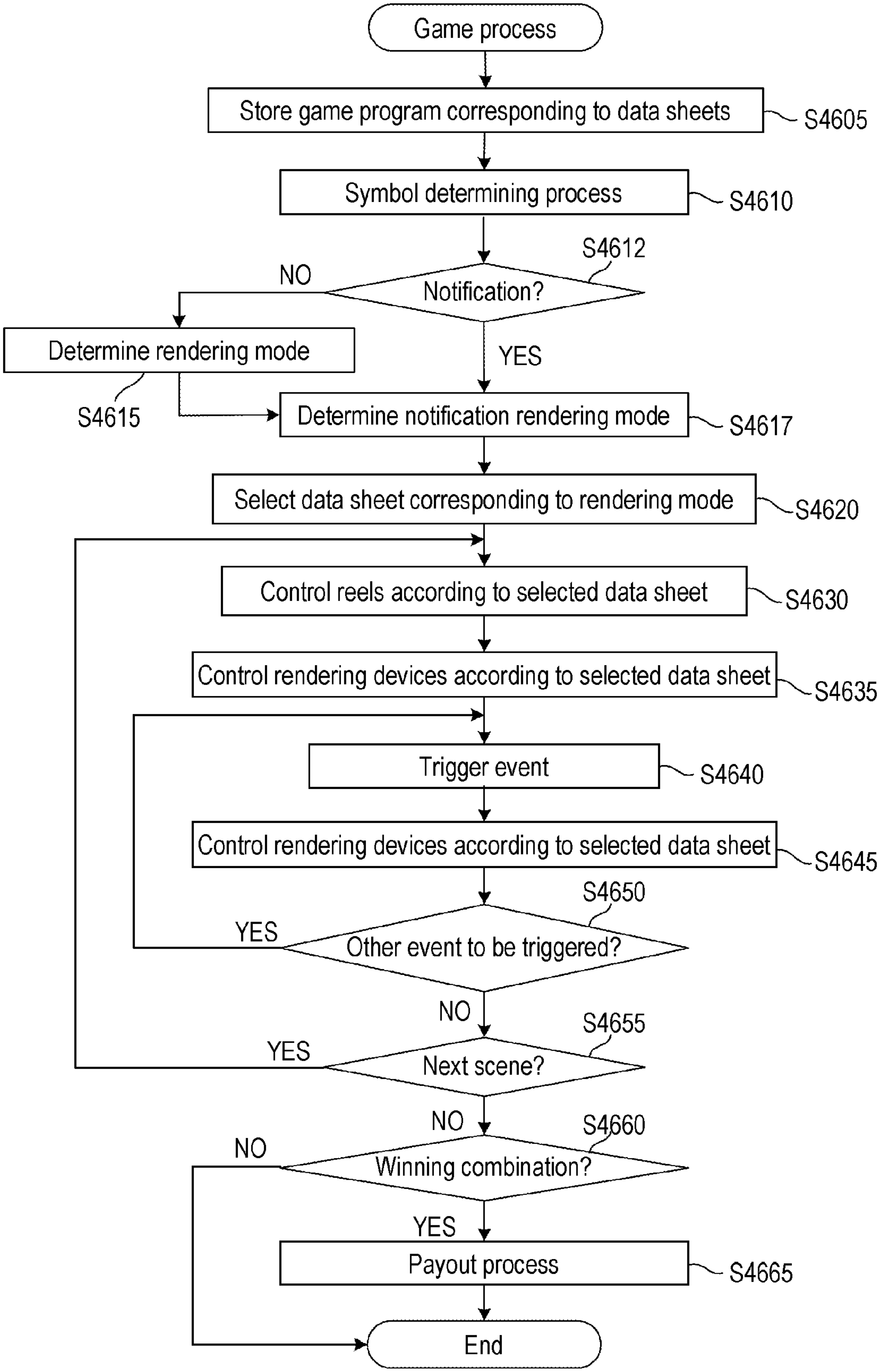
FIG. 49 is a flowchart of a game process using a data sheet according to yet another embodiment of the present invention.

FIG. 49 is a flowchart of a game process using a data sheet according to yet another embodiment of the present invention.

Referring to FIG. 49, after executing the symbol determining process (S4610), the controller of the gamine machine 1 randomly determines whether to notify a prize according to a magnitude of the prize (S4612). When it is determined that the prize is notified to the player (S4612: Yes), the controller determines a rendering mode among a plurality of notification rendering modes according to a result of the symbol determining process (S4617). When it is determined that the prize is not notified to the player (S4612: No), the controller determines a rendering mode among a plurality of rendering modes that are not the notification rendering modes, according to a result of the symbol determining process (S4615). Next, the controller selects a data sheet corresponding to the determined rendering mode among the plurality of data sheets included in the game program (S4620).

Next, a gaming method of a gaming machine using a data sheet is described with reference to FIG. 50 to FIG. 55.

Figure 50:
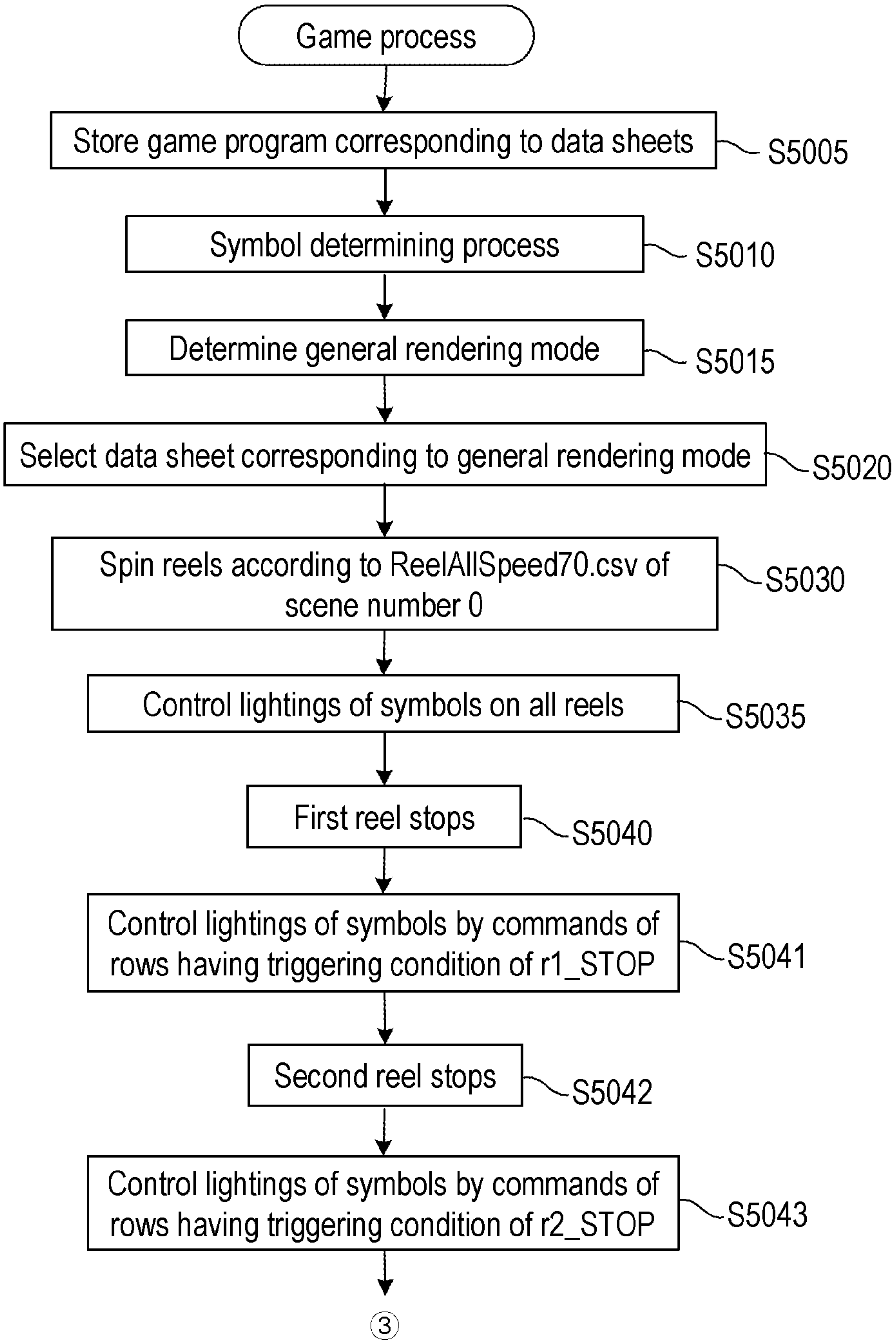
FIG. 50 and FIG. 51 are a flowchart of a game process using a data sheet for a general rendering mode according to an embodiment of the present invention.
Figure 51:
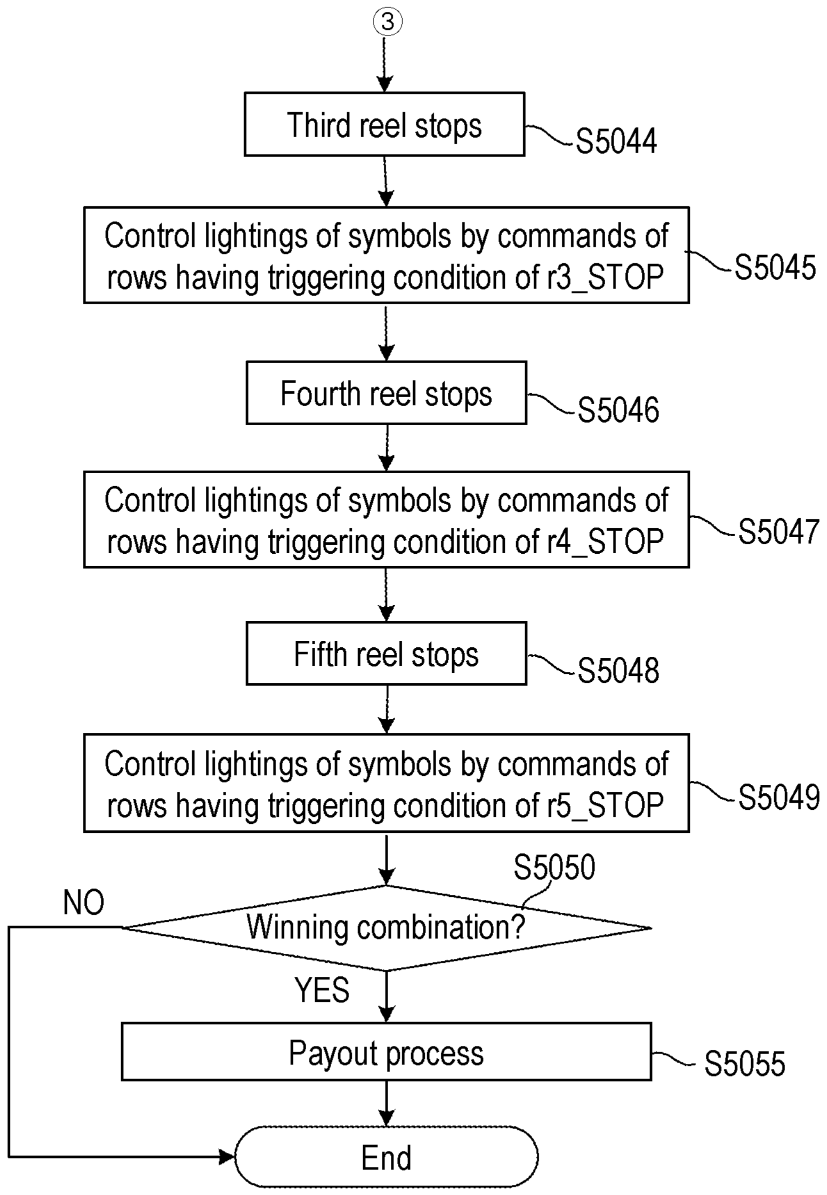

FIG. 50 and FIG. 51 are a flowchart of a game process using a data sheet for a general rendering mode according to an embodiment of the present invention.

According to an embodiment of the present invention, a controller of the gaming machine 1 performs the game process to execute a game.

Referring to FIG. 50 and FIG. 51, the gaming machine 1 receives a game program corresponding to a plurality of data sheets generated by a development tool and stores the game program corresponding to the plurality of data sheets to a memory (S5005). Next, if credits are bet and a game is started by the player, the controller executes a symbol determining process (S5010). In other words, the controller generates a random number for each of a plurality of reels 31*a* to 31*e*, and determines symbols to be appeared on each of the reels 31*a* to 31*e* based on the generated random number and a symbol code determination table for the game.

Further, the controller determines a rendering mode among a plurality of rendering modes according to a result of the symbol determining process (S5015). In this case, the controller determines the general rendering mode. Furthermore, the controller selects a data sheet corresponding to the determined rendering mode, i.e., the general rendering mode among the plurality of data sheets compiled to the game program (S5020). The data sheet for the general rendering mode may be the data sheet shown in FIG. 38A to FIG. 38D.

The controller controls the reel driver 34*t* to spin the reels 31*a* to 31*e* by included in a reel control file (ReelAllSpeed70.csv of FIG. 38B and FIG. 39) of a reel field in a row to which a scene start tag (#SCENE_ST) of a first scene (Scene No=0) is input (S5030). Further, the controller controls the backlight drivers 34*t* to control lightings of symbols by commands (W.csv, B1.csv, and B2.csv having "START" attribute of FIG. 38B and FIG. 38C) of reel light fields in the four rows to which the scene start tag (#SCENE_ST) is input (S5035). In addition, the controller may control a sound to be output from a speaker 17 and an image to be displayed in a secondary display 70 by a command of a sound field and a command of an image field in the four rows to which the scene start tag is input.

In another embodiment, the controller may extract the reel control file (ReelAllSpeed70.csv) and the other commands without using the scene start tag (#SCENE_ST). The controller can extract the reel control file and the other commands, in the row having the scene number (Scene No=0) of the first scene and no triggering condition.

When a certain time period elapses after spinning of the reels 31*a* to 31*e* is started, the controller sequentially stops the reels 31*a* to 31*e* by commands of the reel control file (ReelAllSpeed70.csv of FIG. 38B and FIG. 39), based on the result of the symbol determining process. When the first reel 31*a* is stopped (S5040), the controller controls the backlight drivers 34*t* to control lighting of symbols on the first reel 31*a* by commands (W.csv, B1.csv, and N.csv having "START" attribute of FIG. 38B) of a reel light field (Reel Light of Reel 1 of FIG. 38B) in four rows to which a scene trigger tag (#SCENE_TR) and "r1_STOP" are input (S5041). Next, when the second reel 31*b* is stopped (S5042), the controller controls the backlight drivers 34*t* to control lighting of symbols on the second reel 31*b* by commands (W.csv and N.csv having "START" attribute of FIG. 38B) of a reel light field (Reel Light of Reel 2 of FIG. 38B) in four rows to which a scene trigger tag (#SCENE_TR) and "r2_STOP" are input (S5043). Next, when the third reel 31*c* is stopped (S5044), the controller controls the backlight drivers 34*t* to control lighting of symbols on the third reel 31*c* by commands (W.csv, B1.csv, and N.csv having "START" attribute of FIG. 38C) of a reel light field (Reel Light of Reel 3 of FIG. 38C) in four rows to which a scene trigger tag (#SCENE_TR) and "r3_STOP" are input (S5045). Next, when the fourth reel 31*d* is stopped (S5046), the controller controls the backlight drivers 34*t* to control lighting of symbols on the fourth reel 31*d* by commands (W.csv and N.csv having "START" attribute of FIG. 38C) of a reel light field (Reel Light of Reel 4 of FIG. 38C) in four rows to which a scene trigger tag (#SCENE_TR) and "r4_STOP" are input (S5047). Next, when the fifth reel 31*e* is stopped (S5048), the controller controls the backlight drivers 34*t* to control lighting of symbols on the fifth reel 31*e* by commands (W.csv, B1.csv, B2.csv, and N.csv having "START" attribute of FIG. 38C) of a reel light field (Reel Light of Reel 5 of FIG. 38C) in four rows to which a scene trigger tag (#SCENE_TR) and "r5_STOP" are input (S5049).

In another embodiment, the controller may extract the commands for controlling the lighting of the symbols on each of the reels 31*a* to 31*e* and the other commands without using the scene start tag (#SCENE_TR) when each of the reels 31*a* to 31*e* is stopped. The controller can extract the relevant commands in the rows having the triggering condition corresponding to the stop of each of the reels 31*a* to 31*e*.

When the first scene ends after all of the reels 31*a* to 31*e* are stopped, the controller performs a payout process based on the result of the symbol determining process (S5050 and S5055). That is, on the basis of the combination of symbols stopped on pay lines, the controller determines whether the combination of symbols is a winning combination or not (S5050). If the combination is the winning combination (S5060: Yes), a payout process is executed (S5055). In other words, if the combination is the winning combination, the controller provides credits or a bonus game according to a type of the winning combination.

Figure 52:
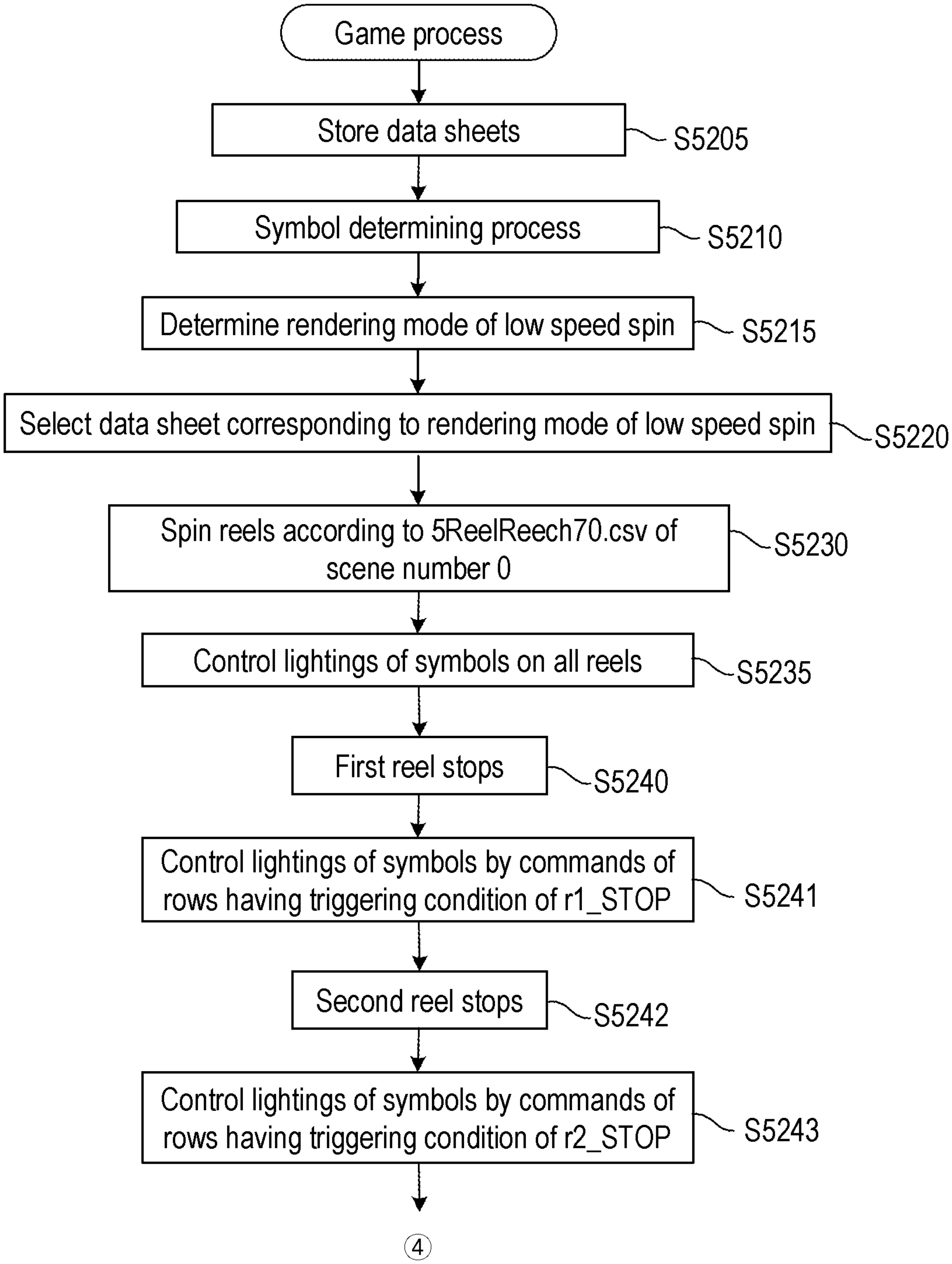
FIG. 52 and FIG. 53 are a flowchart of an example game process using a data sheet for a rendering mode of a low speed spin according to an embodiment of the present invention.
Figure 53:
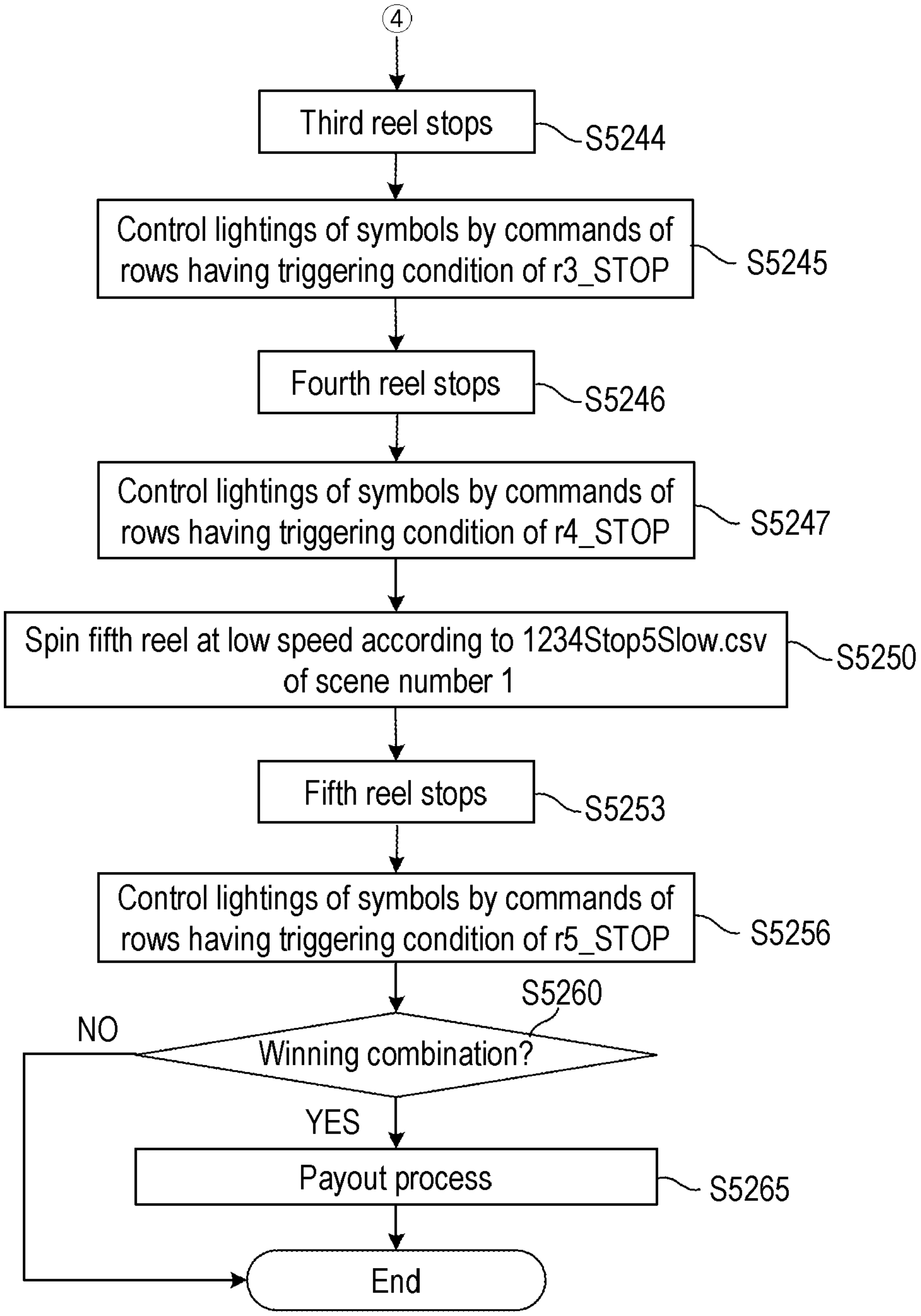

FIG. 52 and FIG. 53 are a flowchart of an example game process using a data sheet for a rendering mode of a low speed spin according to an embodiment of the present invention. The rendering mode of the low speed spin may be used as a notification rendering mode for notifying the prize.

Referring to FIG. 52 and FIG. 53, the gaming machine 1 receives a game program corresponding to a plurality of data sheets generated by a development tool and stores the game program corresponding to the plurality of data sheets to a memory (S5205). Next, if credits are bet and a game is started by the player, the controller executes a symbol determining process (S5210).

Further, the controller determines a rendering mode among a plurality of rendering modes according to a result of the symbol determining process (S5215). In this case, the controller determines the rendering mode of the low speed spin shown in FIG. 33. Furthermore, the controller selects a data sheet corresponding to the determined rendering mode among the plurality of data sheets included in the game program (S5220). The data sheet for the rendering mode of the low speed spin may be the data sheet shown in FIG. 40A to FIG. 40D.

The controller controls the reel driver 32*t* to spin the reels 31*a* to 31*e* by commands included in a reel control file (5ReelReech70.csv of FIG. 40B) of a reel field in a row to which a scene start tag (#SCENE_ST) of a first scene (Scene No=0) is input (S5230). Further, the controller controls the backlight drivers 34*t* to control lightings of symbols by commands (W.csv, B1.csv, and B2.csv having "START" attribute of FIG. 39B and FIG. 39C) of reel light fields in the four rows to which the scene start tag (#SCENE_ST) is input (S5235). In addition, the controller control a sound to be output from a speaker 17 by commands that have been interpreted commands (bgm.ogg and se.ogg of FIG. 40D) of a sound field and a command (Fadeout of FIG. 40D) of an image field in the four rows to which the scene start tag (#SCENE_ST) is input.

In another embodiment, the controller may extract the reel control file (5ReelReech70.csv) and the other commands without using the scene start tag (#SCENE_ST). The controller can extract the reel control file and the other commands, in the row having the scene number (Scene No=0) of the first scene and no triggering condition.

When a certain time period elapses after spinning of the reels 31*a* to 31*e* is started, the controller sequentially stops the reels 31*a* to 31*d* by commands of the reel control file (5ReeReech70.csv of FIG. 40B), based on the result of the symbol determining process. When the first reel 31*a* is stopped (S5240), the controller controls the backlight drivers 34*t* to control lighting of symbols on the first reel 31*a* by commands (W.csv, B1.csv, and N.csv having "START" attribute of FIG. 40B) of a reel light field (Reel Light of Reel 1 of FIG. 40B) in four rows to which a scene trigger tag (#SCENE_TR) and "r1_STOP" are input (S5241). Next, when the second reel 31*b* is stopped (S5242), the controller controls the backlight drivers 34*t* to control lighting of symbols on the second reel 31*b* by commands (W.csv and N.csv having "START" attribute of FIG. 40B) of a reel light field (Reel Light of Reel 2 of FIG. 40B) in four rows to which a scene trigger tag (#SCENE_TR) and "r2_STOP" are input (S5243). Next, when the third reel 31*c* is stopped (S5244), the controller controls the backlight drivers 34*t* to control lighting of symbols on the third reel 31*c* by commands (W.csv, B1.csv, and N.csv having "START" attribute of FIG. 40C) of a reel light field (Reel Light of Reel 3 of FIG. 40C) in four rows to which a scene trigger tag (#SCENE_TR) and "r3_STOP" are input (S5245). Next, when the fourth reel 31*d* is stopped (S5246), the controller controls the backlight drivers 34*t* to control lighting of symbols on the fourth reel 31*d* by commands (W.csv and N.csv having "START" attribute of FIG. 40C) of a reel light field (Reel Light of Reel 4 of FIG. 40C) in four rows to which a scene trigger tag (#SCENE_TR) and "r4_STOP" are input (S5247).

In another embodiment, the controller may extract the commands for controlling the lighting of the symbols on each of the reels 31*a* to 31*d* and the other commands without using the scene start tag (#SCENE_TR) when each of the reels 31*a* to 31*d* is stopped. The controller can extract the relevant commands in the rows having the triggering condition corresponding to the stop of each of the reels 31*a* to 31*d* and the scene number (Scene No=j) of the first scene.

After the firth to fourth reels 31*a* to 31*d* are stopped, the first scene ends and the second scene starts. In the second scene, the controller controls the reel drivers 32*t* to control movements of the reels 31*a* to 31*e* by commands included in a reel control file (1234Stop5Slow.csv of FIG. 40B) of a reel field in a row to which a scene start tag (#SCENE_ST) and a scene number (Scene No=1) of a second scene is input (S5250). That is, the controller controls the reel driver 32*t* to maintain the stops of the first to fourth reels 31*a* to 31*d* and spin the fifth reel 31*e* at the low speed, as shown in FIG. 33. Further, the controller controls the backlight drivers 34*t* to control lighting of a symbol on the fifth reel 31*e* by a command (W.csv having "START" attribute of FIG. 40C) of a reel light field (Reel Light of Reel 5 of FIG. 40C) in the row to which the scene start tag (#SCENE_ST) and the scene number of the second scene are input. Furthermore, the controller controls the speaker to output a sound by commands (slw.ogg, SE, 1, and ONCE of FIG. 40D) of a sound field in the row to which the scene start tag (#SCENE_ST) and the scene number of the second scene are input.

In another embodiment, the controller may extract the reel control file (1234Stop5Slow.csv) and the other commands without using the scene start tag (#SCENE_ST). The controller can extract the reel control file and the other commands, in the row having the scene number (Scene No=1) of the second scene and no triggering condition.

When a certain time period elapses after the reel 31*e* starts to be rotated at the low speed, the fifth reel 31*e* is stopped (S5253). Then, the controller controls the backlight drivers 34*t* to control lighting of symbols on the fifth reel 31*e* by commands (W.csv, B1.csv, B2.csv, and N.csv having "START" attribute of FIG. 40C) of a reel light field (Reel Light of Reel 5 of FIG. 40C) in four rows to which a scene trigger tag (#SCENE_TR) and "r5_STOP" are input (S5256). Furthermore, the controller controls the speaker to stop outputting the sound by commands (slw.ogg, SE, 1, and STOP of FIG. 40D) of the sound field in the four rows to which the scene trigger tag (#SCENE_TR) and "r5_STOP" are input.

In another embodiment, the controller may extract the commands for controlling the lighting of the symbols on the fifth reel 31*e* and the other commands without using the scene start tag (#SCENE_TR) when the fifth reel 31*e* is stopped. The controller can extract the relevant commands in the rows having the triggering condition corresponding to the stop of the fifth reel 31*e* and the scene number (Scene No=1) of the second scene.

When the second scene ends after all of the reels 31*a* to 31*e* are stopped, the controller performs a payout process based on the result of the symbol determining process (S5260 and S5265).

Figure 54:
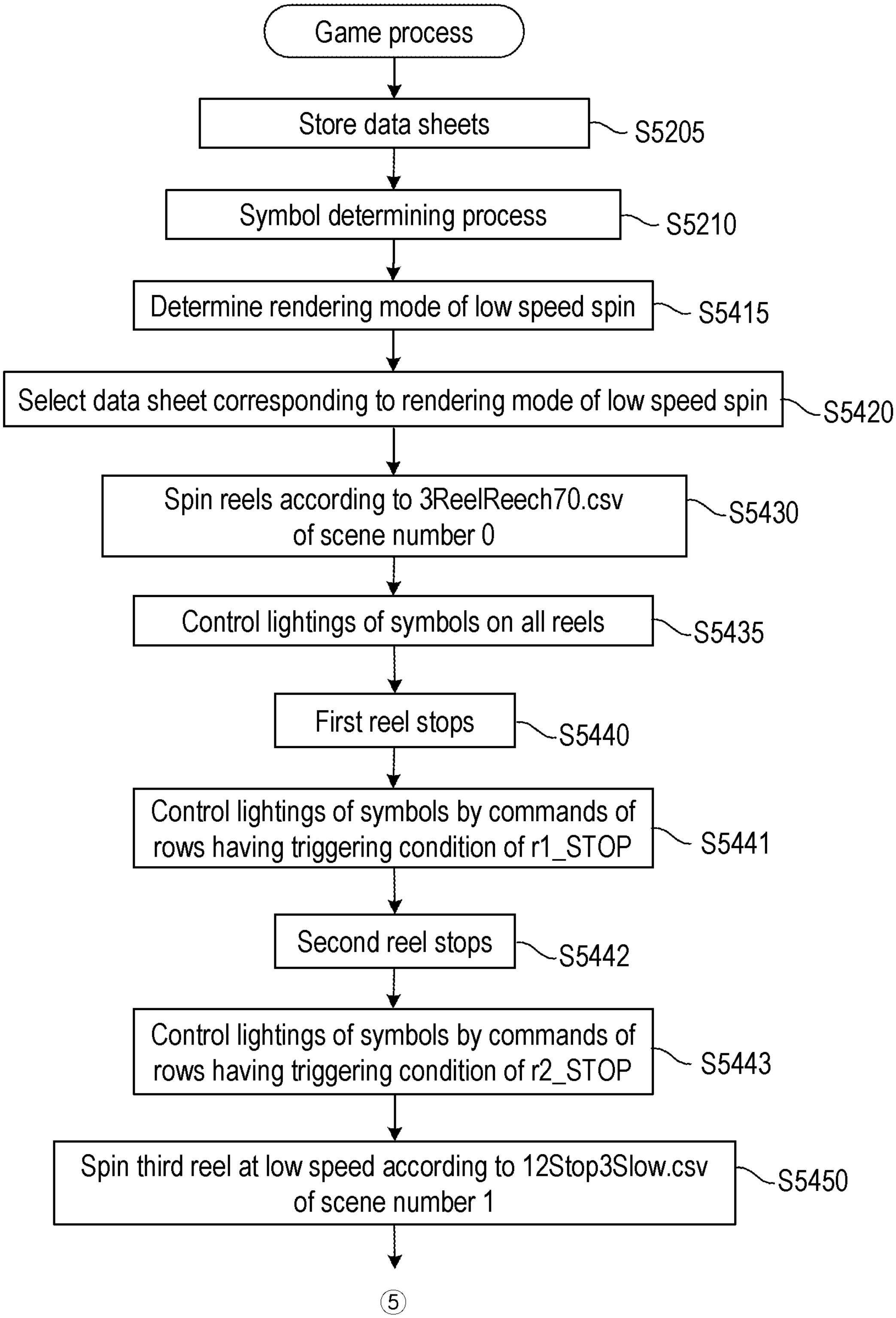
FIG. 54 and FIG. 55 are a flowchart of an example game process using a data sheet for another rendering mode of a low speed spin according to an embodiment of the present invention.
Figure 55:
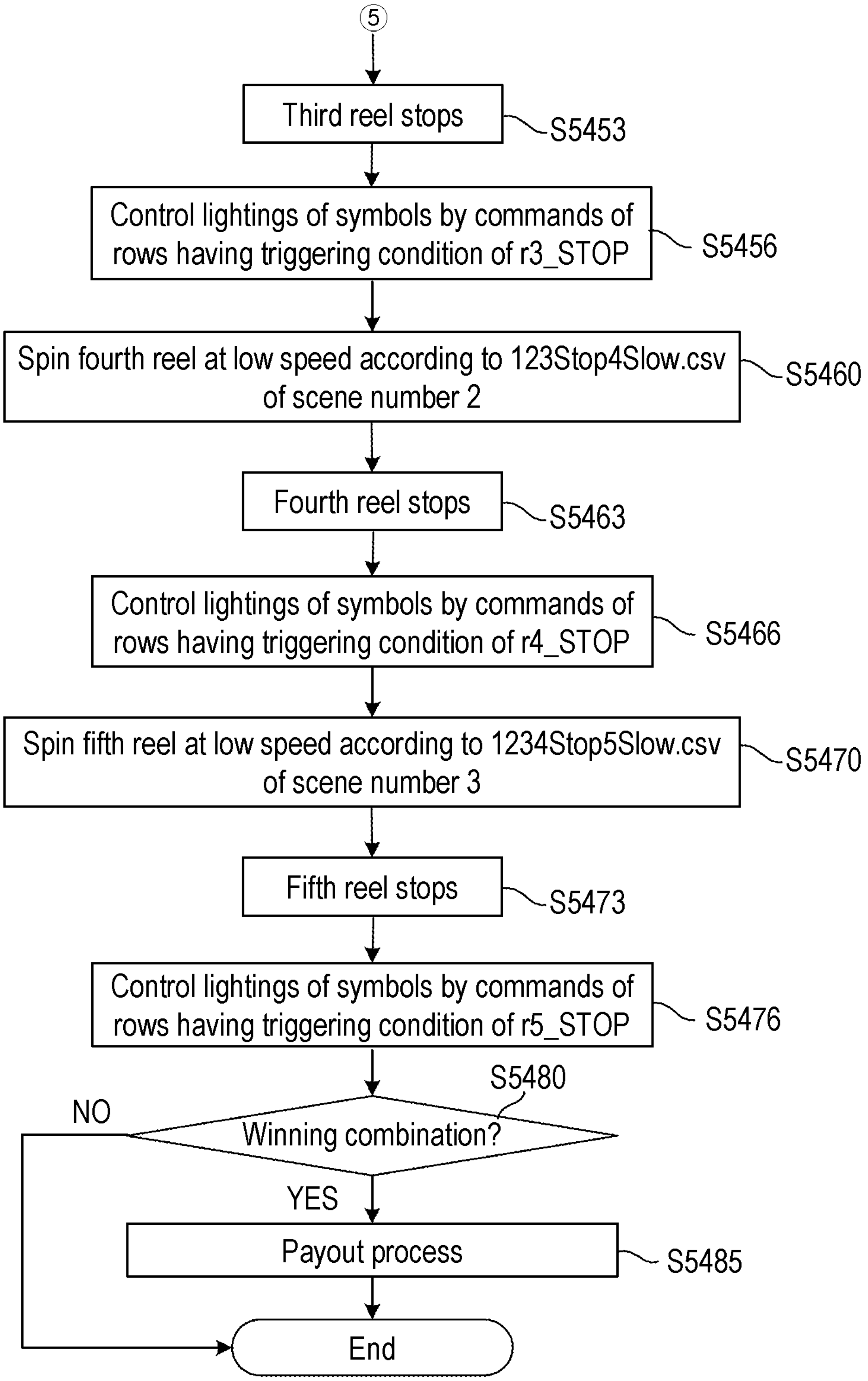

FIG. 54 and FIG. 55 are a flowchart of an example game process using a data sheet for another rendering mode of a low speed spin according to an embodiment of the present invention. The rendering mode of the low speed spin may be used as a notification rendering mode for notifying the prize.

Referring to FIG. 54 and FIG. 55, the gaming machine 1 stores a game program corresponding to a plurality of data sheets to a memory (S5405), and executes a symbol determining process (S5410). When determining a rendering mode among a plurality of rendering modes according to a result of the symbol determining process (S5415), the controller determines the rendering mode of the low speed spin shown in FIG. 34. Furthermore, the controller selects a data sheet corresponding to the determined rendering mode among the plurality of data sheets included in the game program (S5420). The data sheet for the rendering mode of the low speed spin shown in FIG. 34 may be the data sheet shown in FIG. 41A to FIG. 41D.

The controller controls the reel driver 32*t* to spin the reels 31*a* to 31*e* by information included in a reel control file (3ReelReech70.csv of FIG. 41B) of a reel field in a row to which a scene start tag (#SCENE_ST) of a first scene (Scene No=0) is input (S5430). Next, the controller controls the rendering devices to render the rendering effects by commands of the four rows to which the scene start tag (#SCENE_ST) is input (S5435). The controller sequentially stops the reels 31*a* and 31*b* by commands of the reel control file (3ReeReech70.csv of FIG. 41B), based on the result of the symbol determining process (S5440 and S5442). Further, the controller controls the rendering devices to render the rendering effects by commands of the rows to which the scene trigger tag (#SCENE_TR) is input (S5435 and S5444) when each of the first and second reels 31*a* and 31*b* is stopped.

In another embodiment, the controller may extract the reel control file (3ReelReech70.csv) and the other commands without using the scene start tag (#SCENE_ST). The controller can extract the reel control file and the other commands, in the row having the scene number (Scene No=0) of the first scene and no triggering condition. Further, the controller may extract the commands for controlling the lighting of the symbols on each of the reels 31*a* and 31*b* and the other commands without using the scene start tag (#SCENE_TR) when each of the reels 31*a* and 31*b* is stopped. The controller can extract the relevant commands in the rows having the triggering condition corresponding to the stop of each of the reels 31*a* and 31*b* and the scene number (Scene No=0) of the first scene.

After the second reel 31*b* is stopped (S5442), the second scene starts. In the second scene, the controller controls the reel drivers 32 to control movements of the reels 31*a* to 31*e* by commands included in a reel control file (12Stop3Slow.csv of FIG. 41B) of a reel field in a row to which a scene start tag (#SCENE_ST) and a scene number (Scene No=1) of the second scene is input (S5450). That is, the controller controls the reel drivers 32*t* to maintain the stops of the first and second reels 31*a* and 31*b* and spin the third reel 31*c* at the low speed, as shown in FIG. 34. Further, the controller controls the backlight drivers 34*t* to control lighting of a symbol on the third reel 31*c* by a command (W.csv having "START" attribute of FIG. 41C) of a reel light field (Reel Light of Reel 3 of FIG. 41C) in the row to which the scene start tag (#SCENE_ST) and the scene number (Scene No=1) of the second scene are input.

In another embodiment, the controller may extract the reel control file (12Stop3Slow.csv) and the other commands without using the scene start tag (#SCENE_ST). The controller can extract the reel control file and the other commands, in the row having the scene number (Scene No=1) of the second scene and no triggering condition.

When a certain time period elapses after the third reel 31*c* starts to be rotated at the low speed, the third reel 31*c* is stopped (S5453). Then, the controller controls the backlight drivers 34*t* to control lighting of symbols on the third reel 31*c* by commands (W.csv, B1.csv, and N.csv having "START" attribute of FIG. 41C) of a reel light field (Reel Light of Reel 3 of FIG. 41C) in four rows to which a scene trigger tag (#SCENE_TR) and "r3_STOP" are input (S5456). In the second scene, the controller may control the speaker to start or stop outputting a sound by commands of the sound field for the second scene.

In another embodiment, the controller may extract the commands for controlling the lighting of the symbols on the third reels 31*c* and the other commands without using the scene start tag (#SCENE_TR) when the third reel 31*c* is stopped. The controller can extract the relevant commands in the rows having the triggering condition corresponding to the stop of the third reel 31*c* and the scene number (Scene No=1) of the second scene.

After the third reel 31*c* is stopped, the third scene starts (S5460). In the third scene, the controller controls the reel drivers 32*t* to control movements of the reels 31*a* to 31*e* by commands included in a reel control file (123Stop4Slow.csv of FIG. 41B) of a reel field in a row to which a scene start tag (#SCENE_ST) and a scene number (Scene No=2) of the third scene is input (S5460). That is, the controller controls the reel drivers to maintain the stops of the first to third reels 31*a* to 31*c* and spin the fourth reel 31*d* at the low speed, as shown in FIG. 34. Further, the controller controls the backlight drivers 34*t* to control lighting of a symbol on the fourth reel 31*d* by a command (W.csv having "START" attribute of FIG. 41C) of a reel light field (Reel Light of Reel 4 of FIG. 41C) in the row to which the scene start tag (#SCENE_ST) and the scene number (Scene No=2) of the third scene are input.

In another embodiment, the controller may extract the reel control file (123Stop4Slow.csv) and the other commands without using the scene start tag (#SCENE_ST). The controller can extract the reel control file and the other commands, in the row having the scene number (Scene No=2) of the third scene and no triggering condition.

When a certain time period elapses after the fourth reel 31*d* starts to be rotated at the low speed, the fourth reel 31*d* is stopped (S5463). Then, the controller controls the backlight drivers 34*t* to control lighting of symbols on the fourth reel 31*d* by commands (W.csv and N.csv having "START" attribute of FIG. 41C) of a reel light field (Reel Light of Reel 4 of FIG. 41C) in four rows to which a scene trigger tag (#SCENE_TR) and "r4_STOP" are input (S5466). In the third scene, the controller may control the speaker to start or stop outputting a sound by commands of the sound field for the third scene, as shown in FIG. 34.

In another embodiment, the controller may extract the commands for controlling the lighting of the symbols on the fourth reels 31*d* and the other commands without using the scene start tag (#SCENE_TR) when the fourth reel 31*d* is stopped. The controller can extract the relevant commands in the rows having the triggering condition corresponding to the stop of the fourth reel 31*d* and the scene number (Scene No=2) of the third scene.

After the fourth reel 31*d* is stopped, the fourth scene starts (S5470). In the fourth scene, the controller controls the reel drivers 32*t* to control movements of the reels 31*a* to 31*e* by commands included in a reel control file (1234Stop5Slow.csv of FIG. 41B) of a reel field in a row to which a scene start tag (#SCENE_ST) and a scene number (Scene No=3) of the fourth scene is input (S5470). That is, the controller controls the reel drivers 32*t* maintain the stops of the first to fourth reels 31*a* to 31*d* and spin the fifth reel 31*e* at the low speed. Further, the controller controls the backlight drivers 34*t* to control lighting of a symbol on the fifth reel 31*e* by a command (W.csv having "START" attribute of FIG. 41C) of a reel light field (Reel Light of Reel 5 of FIG. 41C) in the row to which the scene start tag (#SCENE_ST) and the scene number (Scene No=3) of the fourth scene are input.

In another embodiment, the controller may extract the reel control file (1234Stop5Slow.csv) and the other commands without using the scene start tag (#SCENE_ST). The controller can extract the reel control file and the other commands, in the row having the scene number (Scene No=3) of the fourth scene and no triggering condition.

When a certain time period elapses after the fifth reel 31*e* starts to be rotated at the low speed, the fifth reel 31*e* is stopped (S5473). Then, the controller controls the backlight drivers 34*t* to control lighting of symbols on the fifth reel 31*e* by commands (W.csv, B1.csv, B2.csv, and N.csv having "START" attribute of FIG. 41C) of a reel light field (Reel Light of Reel 5 of FIG. 41C) in four rows to which a scene trigger tag (#SCENE_TR) and "r5_STOP" are input (S5476). In the fourth scene, the controller may control the speaker to start or stop outputting a sound by commands of the sound field for the fourth scene.

In another embodiment, the controller may extract the commands for controlling the lighting of the symbols on the fifth reels 31*e* and the other commands without using the scene start tag (#SCENE_TR) when the fifth reel 31*e* is stopped. The controller can extract the relevant commands in the rows having the triggering condition corresponding to the stop of the fifth reel 31*e* and the scene number (Scene No=3) of the fourth scene.

When the fourth scene ends after all of the reels 31*a* to 31*e* are stopped, the controller performs a payout process based on the result of the symbol determining process (S5480 and S5485).

As described above, according to an embodiment of the present invention, the gamine machine can render a rendering effect corresponding to the determined rendering mode by selecting the data sheet corresponding to the determined rendering mode and interpreting commands of the selected data sheet.

Further, a gaming machine can be easily developed by using a data generating method according to an embodiment of the present invention. Now, a gaming machine development method according to an embodiment of the present invention is described with reference to FIG. 56.

Figure 56:
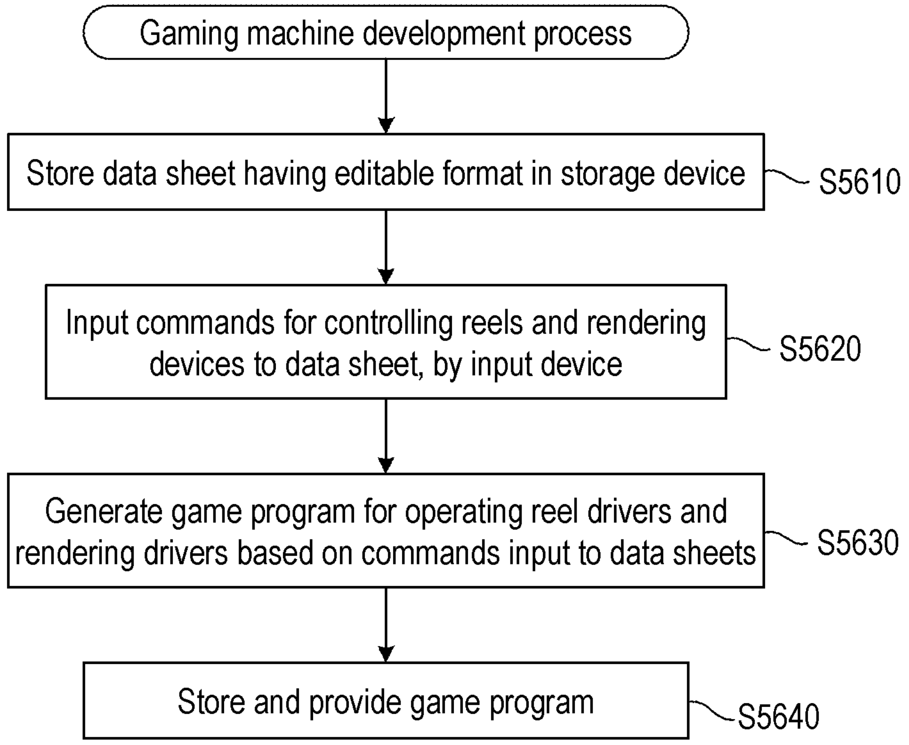
FIG. 56 is a flowchart of a game machine development method according to an embodiment of the present invention.

FIG. 56 is a flowchart of a game machine development method according to an embodiment of the present invention.

Referring to FIG. 56 and FIG. 1B, a storage device 230 of a gaming machine development system stores and provides a data sheet having an editable format (S5610). A monitor 220 of the gaming machine development system displays the data sheet stored in the storage device 230 through an interface for a development tool. An input device 210 of the gaming machine development system inputs commands for controlling a plurality of reels (31*a* to 31*e* of FIG. 2) and a plurality of rendering devices to corresponding rows and columns of the data sheet stored in the storage device 230 (S5620). The plurality of rendering devices renders at least one of a visual effect or a sound effect, and includes, for example, as backlight units (34 of FIG. 10), a speaker (17 of FIG. 12), and a secondary display (70 of FIG. 2).

As described above, since the columns are predefined to be associated with the reels 31*a* to 31*e* (i.e., a plurality of reel drivers 32*t* for driving the reels 31*a* to 31*e*) and the plurality of rendering devices (i.e., a plurality of rendering drivers for driving the plurality of rendering devices), and an execution order of row is defined based on a scene number (a priority) and a triggering condition, the user can easily synchronize operations of the reels 31*a* to 31*e* and rendering effect such as the visual effect and the sound effect even though the user is not a programming expert. An operation of the rendering effect can be quickly checked and modified after the rendering effect is generated. Further, the user can easily and quickly debug the data sheet by checking the commands input to the rows and columns such that reliability of the data sheet can be improved. Furthermore, since some of the commands include a control file such as a reel control file, a sound control file, a symbol control file, a background control file, a line control file, or an image control file, the control file can be reused for other data sheets or other gaming machines.

In addition, the processor 240 generates a game program for controlling the reel drivers 32*t* for driving the reels 31*a* to 31*e* and the rendering drivers for driving the plurality of rendering devices, based on the data sheets (S5630). For example, the processor 240 may compile the commands of the data sheets using a basic program having a plurality of subroutines. Since the commands can be simply input to the data sheet, the game program can be easily generated to operate the reel drivers 32*t* and the rendering drivers. As shown in FIG. 12, since a body PCB 97 that directly exchanges control signals with a main CPU 91 controls the reel drivers 32*t* and the rendering drivers, the reel drivers 32*t* and the rendering drivers can quickly process the commands.

In some embodiments, when compiling the commands of the data sheets, the process 240 may not read tags such as a scene start tag, a scene trigger tag, and a scene end tag of the data sheet. In this case, the processor 240 can identify an execution order of command based on a priority, i.e., a scene number and a triggering condition. In other words, the processor 240 identify that the commands of rows having a scene number of "N" are executed earlier than the commands of rows having a scene number of "N+1". Further, the processor 240 identify that the commands of rows having no triggering condition are executed earlier than the commands having a triggering condition, in the same scene number.

Next, the processor 240 stores the generated game program in a storage device 230 of the gaming machine development system, and provides the game program to the gaming machine 1 (S5640). When controlling the reel drivers and the rendering drivers, the game program may extract commands of the cells of the data sheet based on the index set to each cell or each column, and may control the reel drivers and the rendering drivers according an order of execution.

Embodiments of the present invention can also be embodied as a computer readable program on a computer-readable recording medium. The computer readable recording medium is any data storage device that can store data that can be read thereafter by a computer. Examples of the computer readable recording medium include ROMs, RAMs, CD-ROMs, magnetic tapes, floppy disks, and optical data storage devices. The computer readable recording medium can also be distributed over a network coupled computer system so that the computer readable code is stored and executed in a distributed fashion.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method of performing, by a controller of a gaming machine, a game, the gaming machine including a reel assembly having a mechanical reel, a first driver for driving the mechanical reel, a rendering device for rendering a rendering effect, and a second driver for driving the rendering device, the method comprising:

receiving a program generated based on a plurality of data sheets, each of the plurality of data sheets including a plurality of rows and a plurality of columns for defining a plurality of cells, at least some of the plurality of cells receiving commands, and the plurality of columns including a trigger field having a triggering condition, a reel field being predefined to be associated with the first driver, and an effect field being predefined to be associated with the second driver;

determining symbols to be rearranged in the mechanical reel;

selecting at least one of the plurality of data sheets according to the symbols to be rearranged;

controlling the first driver by a first command of the reel field, in a first set of rows including at least one row corresponding to a start of a first scene among the plurality of rows of the selected data sheet;

controlling the second driver by at least one second command of the effect field in the first set of rows, the second command being executed in synchronization with the first command;

when an event of the first scene is triggered in the mechanical reel, controlling the second driver by at least one third command of the effect field, in a second set of rows including at least one row to which the triggering condition of the event is input among the plurality of rows of the selected data sheet; and rearranging the symbols of the mechanical reel, wherein the commands are input to the data sheet based on an order of execution, the order of execution is defined by a priority for each of the commands and the triggering condition for each of the commands, and the commands are executed in the order of execution.

2. The method of claim 1, wherein commands of a same set of rows are simultaneously executed.

3. The method of claim 1, wherein the commands of the plurality of data sheets are defined as data types of a programming language for generating the program.

4. The method of claim 1, further comprising determining at least one row having a scene number of the first scene and no triggering condition as the first set of rows.

5. The method of claim 1, wherein the gaming machine further includes a body printed circuit board (PCB) configured to the control the first driver and the second driver according to the commands and the program.

6. A gaming machine comprising:

a reel assembly having a mechanical reel;

a first driver configured to drive the mechanical reel;

a rendering device configured to render a rendering effect;

a second driver configured to drive the rendering device;

a memory configured to store a program generated based on a plurality of data sheets, each of the plurality of data sheets including a plurality of rows and a plurality of columns for defining a plurality of cells, at least some of the plurality of cells receiving commands, and the plurality of columns including a trigger field having a triggering condition, a reel field being predefined to be associated with the first driver, and an effect field being predefined to be associated with the second driver; and a controller configured to execute a game process using the program, wherein the controller is configured to simultaneously execute commands of a same set of rows, and wherein the controller is further configured to:

determine symbols to be rearranged in the mechanical reel;

select at least one of the plurality of data sheets according to the symbols to be rearranged;

control the first driver by a first command of the reel field, in a first set of rows including at least one row corresponding to a start of a first scene among the plurality of rows of the selected data sheet;

control the second driver by at least one second command of the effect field in the first set of rows, the second command being executed in synchronization with the first command;

when an event of the first scene is triggered in the mechanical reel, control the second driver by at least one third command of at least one of the effect field, in a second set of rows including at least one row to which the triggering condition of the event is input among the plurality of rows of the selected data sheet; and rearrange symbols of the mechanical reel, wherein the commands are input to the data sheet based on an order of execution, the order of execution is defined by a priority for each of the commands and the triggering condition for each of the commands, and the controller executes the commands in the order of execution.

7. The game machine of claim 6, wherein the controller is configured to determine at least one row having a scene number of the first scene and no triggering condition as the first set of rows.

8. The game machine of claim 6, further comprising a printed circuit board (PCB) configured to the control the first driver and the second driver according to the commands and the program.

9. A gaming machine comprising:

a reel assembly having a mechanical reel;

a first driver configured to drive the mechanical reel;

a rendering device configured to render a rendering effect;

a second driver configured to drive the rendering device, respectively;

a memory configured to store a program generated based on a plurality of data sheets, each of the plurality of data sheets including a plurality of rows and a plurality of columns for defining a plurality of cells, at least some of the plurality of cells receiving commands, and the plurality of columns including a trigger field having a triggering condition, a reel field being predefined to be associated with the first driver, and an effect field being predefined to be associated with the second driver; and a controller configured to randomly determine a position where the mechanical reel is to be stopped when a game is started, determine a magnitude of a prize to be provided according to the determined position, select at least one of the plurality of data sheets according to the determined position, control the first driver to move the mechanical reel, by a first command of the reel field in a first set of rows including at least one row corresponding to a start of a scene among the plurality of rows of the selected data sheet, control the second driver to render an effect for notifying a player of the prize according to the magnitude of the prize, by at least one second command of the effect field in the first set of rows, the second command being executed in synchronization with the first command, rearrange symbols of the mechanical reel according to the determined position, and when the mechanical reel is stopped, control the second driver, by at least one third command of the effect field in a second set of rows including at least one row among the plurality of rows of the selected data sheet, the second set of rows including a stop of the mechanical reel as the triggering condition of an event in the trigger field, wherein the commands are input to the data sheet based on an order of execution, the order of execution is defined by a priority for each of the commands and the triggering condition for each of the commands, and the controller executes the commands in the order of execution.

10. The gaming machine of claim 9, wherein the rendering device includes at least one of a backlight unit corresponding to the mechanical reel, a speaker for outputting an effect sound, or a display for displaying an effect image, and wherein the backlight unit includes a plurality of light sources partitioned by a plurality of partitions corresponding to the symbols.

* * * * *